US012761442B2

(12) United States Patent
Park

(10) Patent No.: US 12,761,442 B2
(45) Date of Patent: Oct. 13, 2026

(54) LENS DRIVING APPARATUS, AND CAMERA MODULE AND OPTICAL DEVICE COMPRISING SAME

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 784 days.

(21) Appl. No.: 18/014,402

(22) PCT Filed: Aug. 24, 2021

(86) PCT No.: PCT/KR2021/011260
§ 371 (c)(1),
(2) Date: Jan. 4, 2023

(87) PCT Pub. No.: WO2022/045721
PCT Pub. Date: Mar. 3, 2022

(65) Prior Publication Data
US 2023/0341650 A1 Oct. 26, 2023

(30) Foreign Application Priority Data
Aug. 31, 2020 (KR) ........................ 10-2020-0109985
Sep. 11, 2020 (KR) ........................ 10-2020-0117202
Sep. 16, 2020 (KR) ........................ 10-2020-0118825

(51) Int. Cl.
*G02B 7/09* (2021.01)
*G03B 13/36* (2021.01)

(52) U.S. Cl.
CPC ............... *G02B 7/09* (2013.01); *G03B 13/36* (2013.01)

(58) Field of Classification Search
CPC .......... G02B 7/09; G02B 7/08; G02B 27/646; G03B 13/36; G03B 30/00; G03B 2205/0069; G03B 3/10; H04N 23/55
See application file for complete search history.

(56) References Cited

U.S. PATENT DOCUMENTS

2011/0211821 A1 9/2011 Park et al.
2017/0139225 A1* 5/2017 Lim .................... G02B 27/646
2020/0050084 A1 2/2020 Lim et al.

FOREIGN PATENT DOCUMENTS

CN 204101866 U 1/2015
EP 3 667 408 A1 6/2020
JP 2013-76910 A 4/2013
JP 2015-84003 A 4/2015
KR 10-2010-0066678 A 6/2010
KR 10-2010-0103297 A 9/2010
(Continued)

*Primary Examiner* — Charles S Chang
(74) *Attorney, Agent, or Firm* — Birch, Stewart, Kolasch & Birch, LLP

(57) ABSTRACT

An embodiment comprises: a base; a housing disposed on the base; a bobbin disposed inside the housing; a first magnet disposed on the bobbin; a coil facing the first magnet and disposed on the housing; a second magnet spaced apart from the first magnet and disposed on the bobbin; a yoke disposed on the housing, facing the second magnet; a ball member disposed between the bobbin and the housing; and a position sensor facing the first magnet or the second magnet in an optical axis direction, and disposed on the base.

20 Claims, 51 Drawing Sheets

(56) References Cited

FOREIGN PATENT DOCUMENTS

| | | | |
|---|---|---|---|
| KR | 10-2016-0010201 | A | 1/2016 |
| KR | 10-2016-0057721 | A | 5/2016 |
| KR | 10-2016-0060219 | A | 5/2016 |
| KR | 10-1765281 | B1 | 8/2017 |
| KR | 10-2018-0004423 | A | 1/2018 |
| KR | 10-2018-0007841 | A | 1/2018 |
| KR | 10-2018-0116965 | A | 10/2018 |
| KR | 10-2019-0061439 | A | 6/2019 |
| KR | 10-2020-0017763 | A | 2/2020 |
| KR | 10-2020-0044488 | A | 4/2020 |
| KR | 10-2020-0079056 | A | 7/2020 |
| KR | 10-2020-0088729 | A | 7/2020 |
| KR | 10-2020-0092924 | A | 8/2020 |

* cited by examiner

LENS DRIVING APPARATUS, AND CAMERA MODULE AND OPTICAL DEVICE COMPRISING SAME

CROSS REFERENCE TO RELATED APPLICATIONS

This application is the National Phase of PCT International Application No. PCT/KR2021/011260, filed on Aug. 24, 2021, which claims priority under 35 U.S.C. 119(a) to Patent Application No. 10-2020-0109985, filed in the Republic of Korea on Aug. 31, 2020, Patent Application No. 10-2020-0117202, filed in the Republic of Korea on Sep. 11, 2020 and Patent Application No. 10-2020-0118825, filed in the Republic of Korea on Sep. 16, 2020, all of which are hereby expressly incorporated by reference into the present application.

TECHNICAL FIELD

Embodiments relate to a lens moving apparatus and a camera module and an optical device each including the same.

BACKGROUND ART

It is difficult to apply technology of a voice coil motor (VCM) used in existing general camera modules to a subminiature, low-power camera module, and therefore research related thereto has been actively conducted.

Demand for and production of electronic products, such as smartphones and mobile phones equipped with cameras have increased. Cameras for mobile phones are trending toward increased resolution and miniaturization. As a result, an actuator has also been miniaturized, increased in diameter, and been made multifunctional. In order to realize a high-resolution camera for mobile phones, improvement in performance of the camera for mobile phones and additional functions thereof, such as autofocusing, handshake correction, and zooming, are required.

DISCLOSURE

Technical Problem

Embodiments provide a lens moving apparatus and a camera module and an optical device including the lens moving apparatus, which enables easy and free design of the frictional force between a bobbin and/or a housing and a ball member to stably support an AF moving unit.

Furthermore, embodiments are able to reduce influence of a magnetic field of a coil on a position sensor and to assure reliability of AF operation.

In addition, embodiments provide a lens moving apparatus, a camera module, and an optical device capable of maintaining constant frictional force in the total stroke range of a movable unit for autofocus, regardless of heavy weight of the movable unit.

Technical Solution

A lens moving apparatus according to an embodiment includes a base; a housing disposed on the base; a bobbin disposed in the housing; a first magnet disposed on the bobbin; a coil disposed on the housing so as to face the first magnet; a second magnet disposed on the bobbin so as to be spaced apart from the first magnet; a yoke disposed on the housing so as to face the second magnet; a ball member disposed between the bobbin and the housing; and a position sensor disposed on the base so as to face the first magnet or the second magnet in an optical-axis direction.

The second magnet may be disposed between the yoke and the first magnet, and the first magnet may be disposed between the second magnet and the coil.

The lens moving apparatus may further include a circuit board disposed on the housing, and the coil may be conductively connected to the circuit board.

The lens moving apparatus may further include a conductive member conductively connected to the position sensor.

The position sensor may not overlap the first magnet or the second magnet in a direction perpendicular to the optical-axis direction.

The position sensor may not overlap the yoke in a direction perpendicular to the optical-axis direction.

The first magnet may be disposed on a first side portion of the bobbin and the second magnet may be disposed on a second side portion of the bobbin opposite the first side portion of the bobbin, and the coil may be disposed on a first side portion of the housing and the yoke may be disposed on a second side portion of the housing opposite the first side portion of the housing.

The ball member may be disposed between a side portion of the bobbin on which the second magnet is disposed and a side portion of the housing on which the yoke is disposed.

The ball member may be disposed between a side portion of the bobbin on which the first magnet is disposed and a side portion of the housing on which the coil is disposed, and a repulsive force may act between the yoke and the second magnet.

The yoke may be a magnetic body, and a length of the yoke in the optical-axis direction may be different from a length of the second magnet in the optical-axis direction.

A drive signal may be supplied to the coil, and the bobbin may be movable in the optical-axis direction by virtue of the interaction with the first magnet.

The conductive member may be disposed on the base and may include at least one terminal conductively connecting the position sensor to the circuit board.

Alternatively, the conductive member may include a circuit member disposed on the base, and the circuit member may include at least one terminal conductively connected to the position sensor.

The length of the yoke in the optical-axis direction may be greater than the length of the second magnet in the optical-axis direction, and the distance between the upper end of the second magnet and the upper end of the yoke in the optical-axis direction may be one or more times and three or less times the total stroke distance of the bobbin in the optical-axis direction when the bobbin is positioned at the lowest point in the optical-axis direction. Here, the distance between the lower end of the second magnet and the lower end of the yoke in the optical-axis direction may be 0 or greater and may be two or less times the total stroke distance of the bobbin when the bobbin is positioned at the lowest point.

Alternatively, the length of the second magnet in the optical-axis direction may be greater than the length of the yoke in the optical-axis direction, and the distance between the lower end of the second magnet and the lower end of the yoke in the optical-axis direction may be one or more times and three or less times the total stroke distance of the bobbin in the optical-axis direction when the bobbin is positioned at the lowest point in the optical-axis direction. Here, the distance between the upper end of the second magnet and the upper end of the yoke in the optical-axis direction may be 0 or more and may be two or less times the total stroke distance of the bobbin in the optical-axis direction when the bobbin is positioned at the lowest point.

A camera device according to an embodiment includes a housing; a bobbin disposed in the housing; a first magnet disposed on the bobbin; a coil disposed on the housing so as to face the first magnet; a second magnet disposed on the bobbin so as to be spaced apart from the first magnet; a yoke disposed on the housing so as to face the second magnet; a ball member disposed between the bobbin and the housing; a first circuit board disposed below the housing; and a position sensor including an image sensor disposed on the first circuit board and being disposed on the first circuit board so as to face the first magnet or the second magnet in an optical-axis direction.

In the camera device, the second magnet may be disposed between the yoke and the first magnet, and the first magnet may be disposed between the second magnet and the coil.

The camera device may include a second circuit board, which is disposed on the housing and is conductively connected to the first circuit board, and the coil may be conductively connected to the second circuit board.

Advantageous Effects

Since embodiments include a first magnet and a second magnet independent of the first magnet, it is possible to easily and freely design the frictional force between a bobbin and/or a housing and a ball member by virtue of attractive force resulting from the interaction between a yoke and the second magnet and thus to stably support an AF moving unit.

Furthermore, since embodiments are constructed such that a position sensor is disposed so as to be spaced far apart from a coil, it is possible to reduce influence of a magnetic field of the coil on the position sensor and to assure reliability of AF operation.

In addition, embodiments are able to maintain constant frictional force generated during movement of a movable unit for autofocus in the total stroke range of the movable unit, regardless of heavy weight of the movable unit.

DESCRIPTION OF DRAWINGS

FIG. 6A is positioned at the highest point;

BEST MODE

Figure 1:
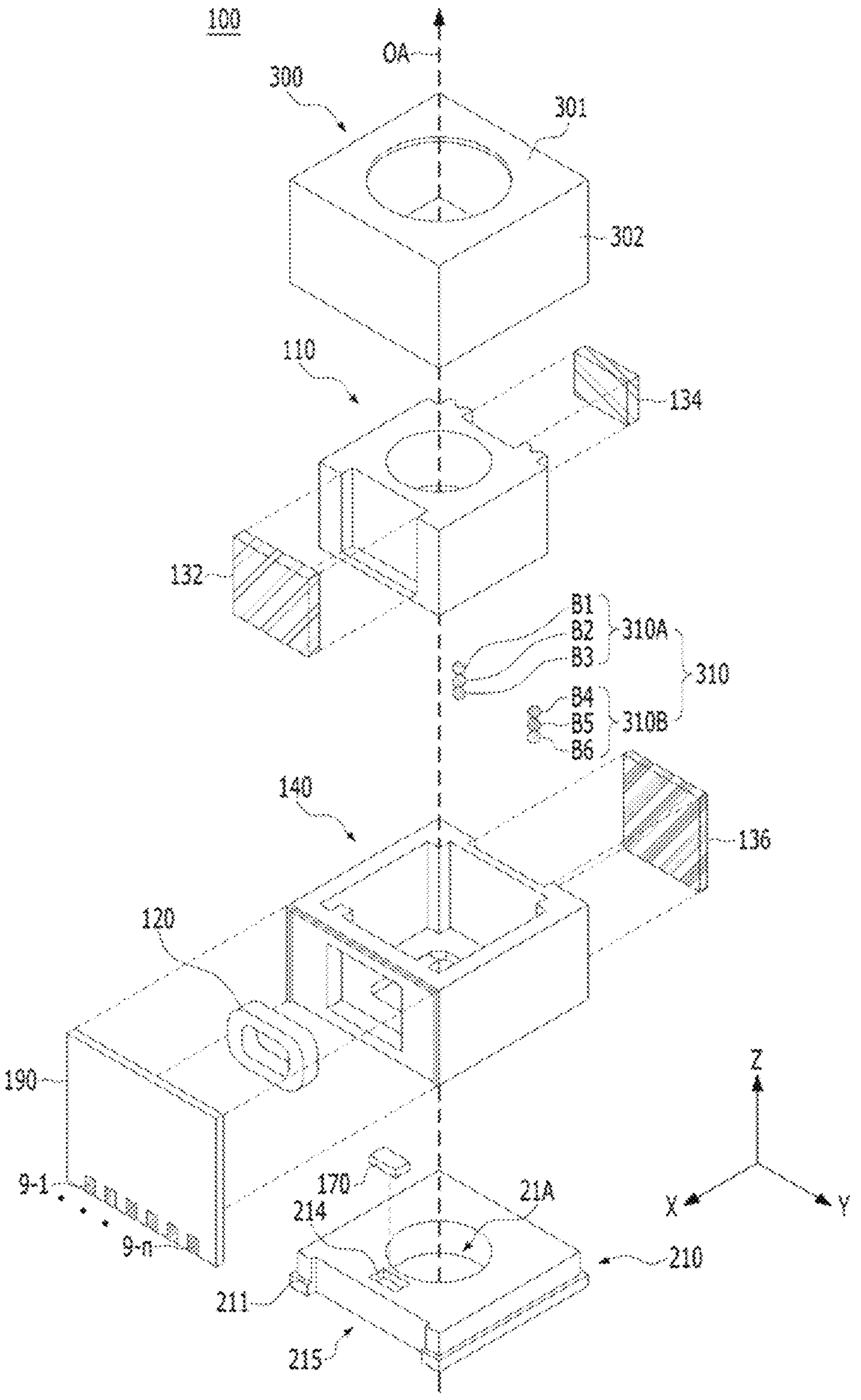
FIG. 1 is an exploded perspective view of a lens moving apparatus according to an embodiment.

Hereinafter, embodiments of the present invention will be described in detail with reference to the accompanying drawings.

The technical idea of the present invention may be embodied in many different forms, and should not be construed as being limited to the following embodiments set forth herein. One or more of components of the embodiments may be selectively combined with each other or replaced without departing from the technical spirit and scope of the present invention.

Unless otherwise particularly defined, terms (including technical and scientific terms) used in the embodiments of the present invention have the same meanings as those commonly understood by one of ordinary skill in the art to which this invention belongs. It will be further understood that commonly used terms, such as those defined in dictionaries, should be interpreted as having meanings consistent with their meanings in the context of the relevant art.

The terminology used in the embodiments of the present invention is for the purpose of describing particular embodiments only, and is not intended to limit the present invention. As used in the disclosure and the appended claims, the singular forms are intended to include the plural forms as well, unless the context clearly indicates otherwise. The phrase "at least one (or one or more) of A, B and C" may be interpreted as including one or more of all combinations of A, B and C.

Furthermore, when describing the components of the present invention, terms such as "first", "second", "A", "B", "(a)" or "(b)" may be used. Since these terms are provided merely for the purpose of distinguishing the components from each other, they do not limit the nature, sequence or order of the components.

It should be understood that, when an element is referred to as being "linked", "coupled" or "connected" to another element, the element may be directly "linked", "coupled" or "connected" to the another element, or may be "linked", "coupled" or "connected" to the another element via a further element interposed therebetween. Furthermore, it will be understood that, when an element is referred to as being formed "on" or "under" another element, it can be directly "on" or "under" the other element, or can be indirectly disposed with regard thereto, with one or more intervening elements therebetween. In addition, it will also be understood that "on" or "under" the element may mean an upward direction or a downward direction based on the element.

Hereinafter, the lens moving apparatus may alternatively be referred to as a lens moving unit, a voice coil motor (VCM), an actuator, or a lens moving device. The term "coil" may interchangeably be used with "coil unit", and the term "elastic member" may interchangeably be used with "elastic unit" or "spring".

In the follow description, the "terminal" may be alternatively referred to as a "pad", "electrode", "conductive layer" or "bonding portion".

For convenience of description, although the lens moving apparatus according to an embodiment is described using a Cartesian coordinate system (x, y, z), the lens moving apparatus may be described using some other coordinate systems, and the embodiments are not limited thereto. In the respective drawings, the X-axis direction and the Y-axis direction mean directions perpendicular to an optical axis, i.e. the Z-axis. The Z-axis direction, which is the direction of the optical axis OA, may be referred to as a "first direction", the X-axis direction may be referred to as a "second direction", and the Y-axis direction may be referred to as a "third direction".

The "auto-focusing function" serves to automatically focus an image of a subject on the surface of an image sensor. The lens moving apparatus according to an embodiment may move an optical module, which is constituted of at least one lens, in the first direction, so as to perform auto-focusing.

Figure 2:
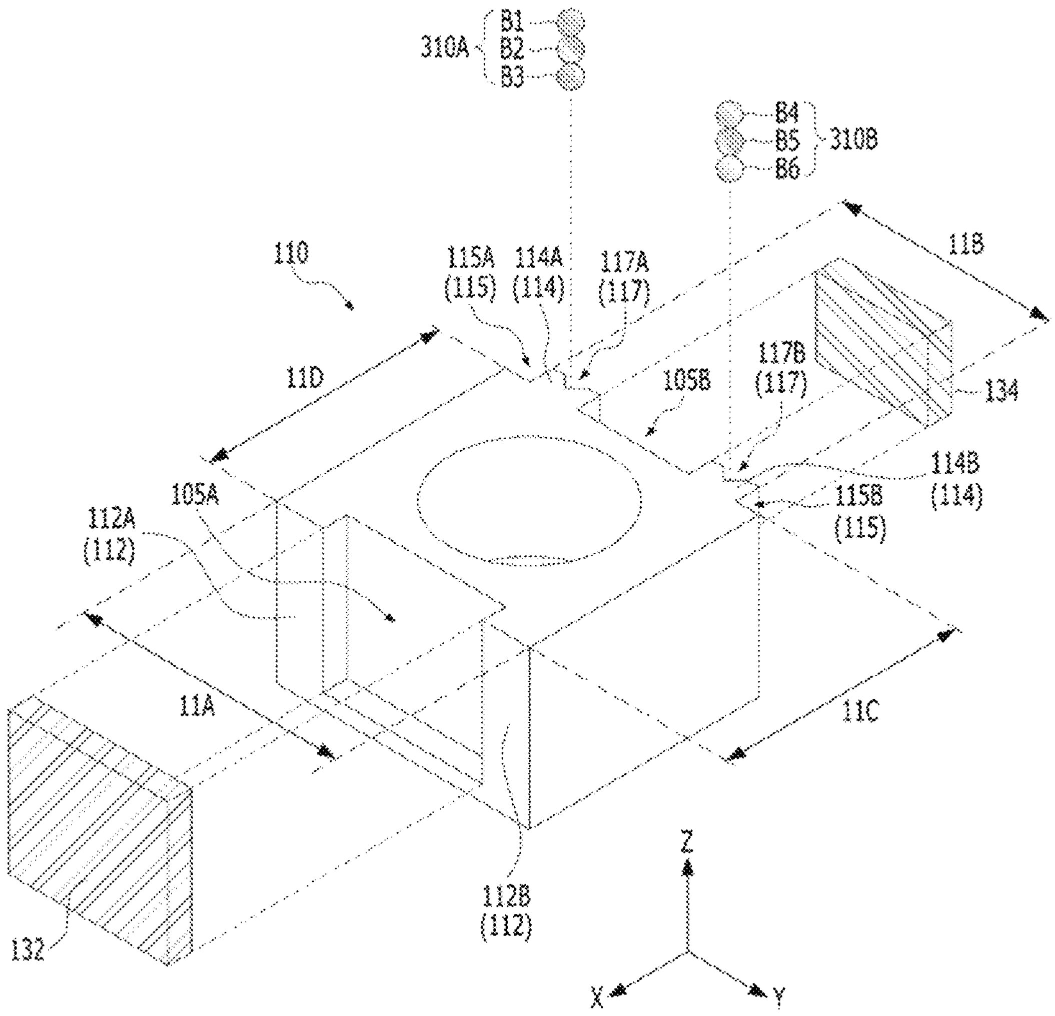
FIG. 2 is an exploded perspective view of the bobbin, the first magnet, and the second magnet shown in FIG. 1.
Figure 3:
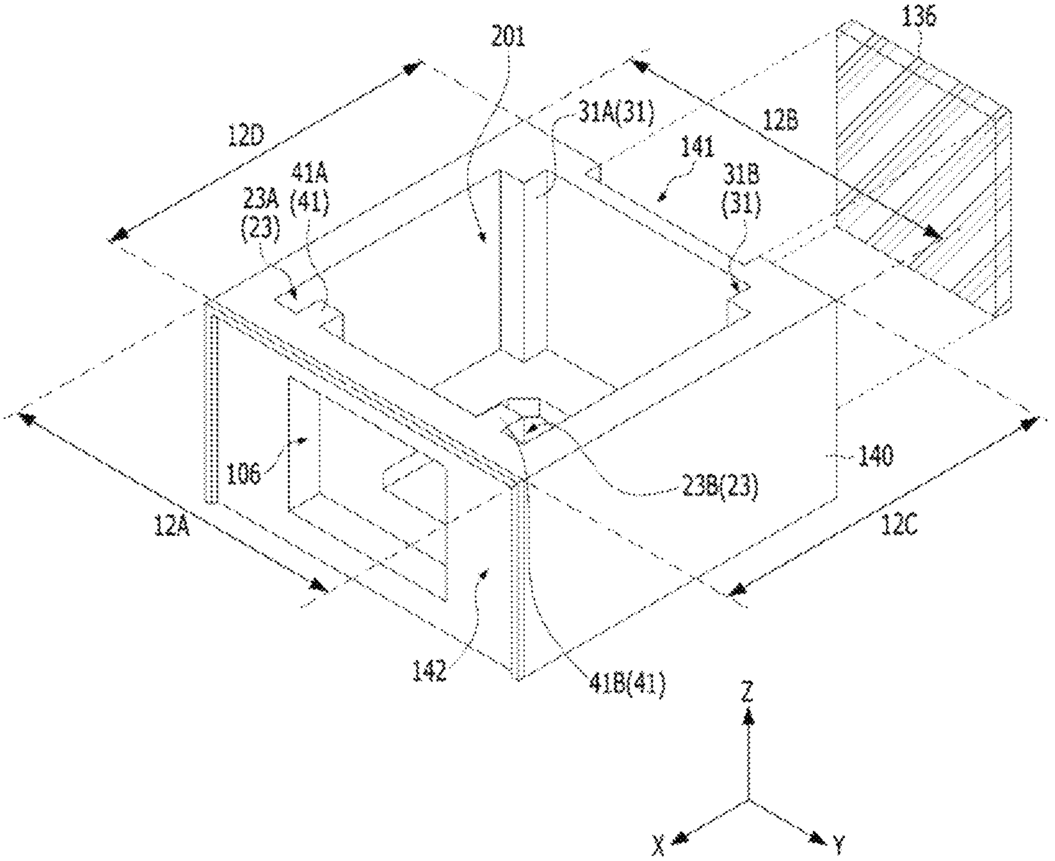
FIG. 3 is an exploded perspective view of the housing and the yoke shown in FIG. 1.
Figure 4A:
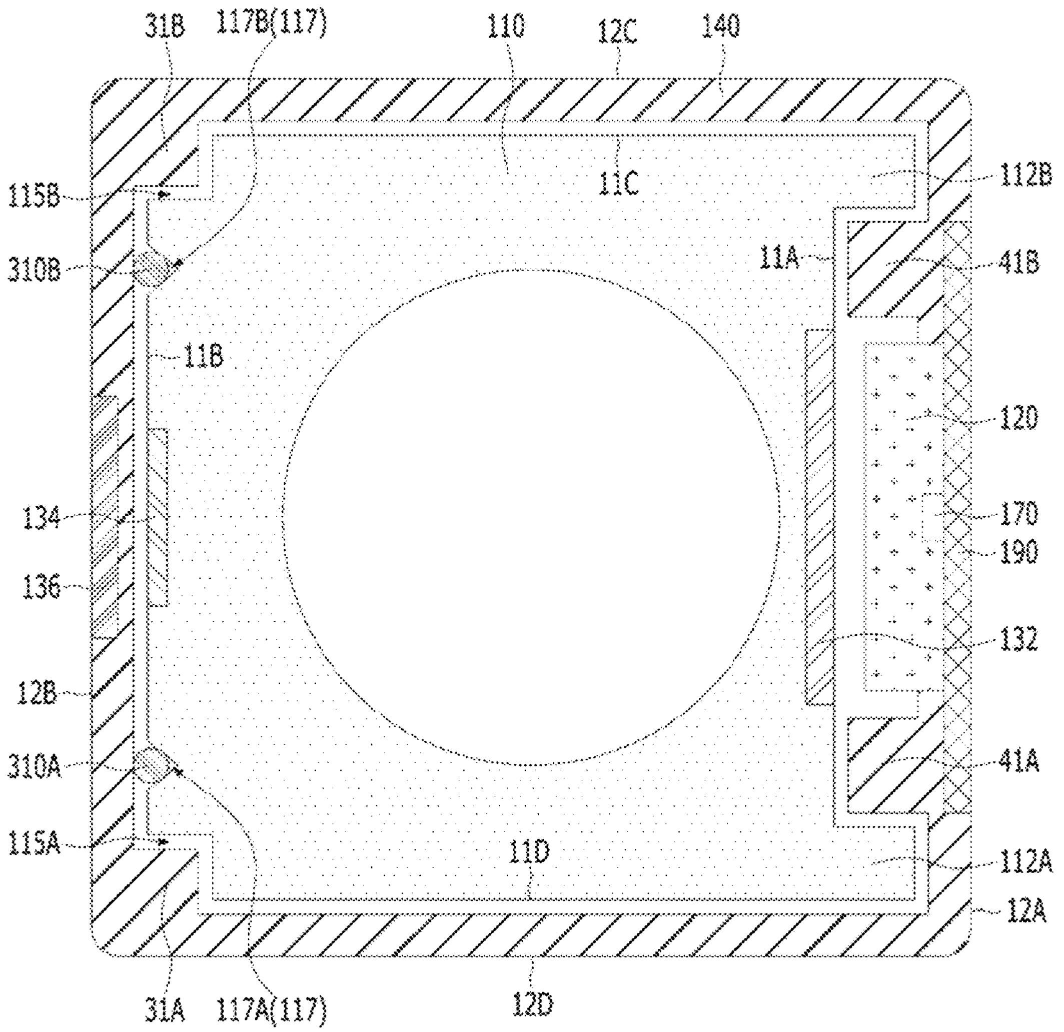
FIG. 4A is a plan view of the lens moving apparatus according to an embodiment shown in FIG. 1, from which a cover member is removed.

FIG. 1 is a exploded view of a lens moving apparatus 100 according to an embodiment. FIG. 2 is an exploded perspective view of a bobbin 110, a first magnet 132, and a second magnet 134, which are shown in FIG. 1. FIG. 3 is an exploded perspective view of a housing 140 and a yoke 136 shown in FIG. 1. FIG. 4A is a plan view of the lens moving apparatus 100 shown in FIG. 1, from which a cover member 300 is removed.

Referring to FIGS. 1 to 4A, the lens moving apparatus 100 may include the bobbin 110, the first magnet 132, the second magnet 134, the housing 140, a coil 120, a ball member 310, the yoke 136, and a position sensor 170.

The lens moving apparatus 100 may further include a base 210, which is disposed under the housing 140. The lens moving apparatus 100 may further include a circuit board 190 configured to provide a drive signal to the coil 120. For example, the position sensor 170 is conductively connected to the circuit board 190, and the circuit board 190 may supply a drive signal to the position sensor 170 and may receive the output of the position sensor 170.

The lens moving apparatus 100 may further include a cover member 300 configured to accommodate the housing 140 therein.

The bobbin 110, which is configured to allow a lens or a lens barrel to be mounted thereon, may be disposed in the housing 140 so as to be movable in the direction of the optical-axis OA or in the first direction (for example, the Z-axis direction) by the electromagnetic interaction between the coil 120 and the first magnet 132. The bobbin 110 may alternatively be referred to as a "lens holder".

The bobbin 110 may have a bore 21 (see FIG. 5A) in which a lens or a lens barrel is mounted. For example, the bore 21 in the bobbin 110 may be a through hole, and may have a circular shape, an elliptical shape or a polygonal shape, without being limited thereto.

Although not shown in FIG. 2, the bobbin 110 may include at least one first stopper formed on the upper surface thereof. For example, the first stopper may protrude from the upper surface of the bobbin 110 in the optical-axis direction or in the upward direction to prevent the upper surface of the bobbin 110 from directly colliding with the inner surface of the upper plate 301 of the cover member 300. Furthermore, the bobbin 110 may include at least one second stopper formed on the lower surface thereof.

The bobbin 110 may include a plurality of side surfaces or outer surfaces.

For example, the bobbin 110 may include a plurality of side portions 11A to 11D. Furthermore, the bobbin 110 may include a corner or a corner portion positioned between two adjacent side portions.

For disposition or seating of the first magnet 132, the bobbin 110 may include a first seating portion 105A, which is formed in or disposed on the first side portion (the first side surface or the first outer surface) among the plurality of side portions (or side surfaces or outer surfaces). The first seating portion 105A may have the form of a groove.

For example, the first seating portion 105A may be a groove having a structure that is depressed from the first side portion 11A (or the first side surface or the first outer surface) of the bobbin 110, and may have an opening formed in at least one of the upper surface or the lower surface of the bobbin 110. For example, the lower portion of the first seating portion 105A may not be open but may be closed at the lower surface of the bobbin 110.

For disposition or seating of the second magnet 134, the bobbin 110 may include a second seating portion 105B, which is formed in or disposed on the second side portion 11B (or the second side surface or the second outer surface) among the plurality of side portions (or the side surfaces or the outer surfaces). The second seating portion 105B may have the form of a groove having a structure that is depressed from the second side portion 11B, and may have an opening formed in at least one of the upper surface and the lower surface of the bobbin 110. For example, the lower portion of the second seating portion 105B may not be open but may be closed at the lower surface of the bobbin 110.

For example, the second side portion 11B (or the second side surface or the second outer surface) of the bobbin 110 may be positioned opposite the first side portion 11A (or the first side surface or the first outer surface) of the bobbin 110.

The third side portion 11C (or the third side surface or the third outer surface) and the fourth side portion 11D (or the fourth side surface or the fourth outer surface) of the bobbin 110 may be disposed between the first and second side portions, and may be positioned opposite each other.

The bobbin 110 may include at least one escape portion 115 in order to avoid spatial interference with a projection 31 of the housing 140. The escape portion 115 may alternatively be referred to as a "groove" or an "escape groove".

For example, the escape portion 115 may be formed in at least one of the corners of the bobbin 110. For example, the escape portion 115 may be formed in at least one of the corners of the bobbin 110 adjacent the second side portion 11B (or the second side surface or the second outer surface) of the bobbin 110.

For example, the escape portion 115 may include a first escape portion 115A, which is formed in one corner of the bobbin 110 adjacent to the second side portion 11B (or the second side surface or the second outer surface), and a second escape portion 115B, which is formed in another corner of the bobbin 110 adjacent to the second side portion 11B (or the second side surface or the second outer surface). The escape portion 115 of the bobbin 110, in conjunction with the projection 31 of the housing 140 to be described later, may serve to suppress rotation of the bobbin 110.

The projection 31 of the housing 140 may serve to suppress the extent to which the bobbin 110 rotates about the optical axis. The projection 31 may also be referred to as a "rotation suppresser", a "stopper", a "catching step", a "shock mitigator", or a "shock absorber".

By virtue of the projection 31, it is possible to suppress or prevent the bobbin 110 from rotating beyond an intended extent due to external shock, to mitigate shock between the bobbin 110 and the housing 140 due to external shock, to reduce generation of foreign substances or particles attributable to shock or collision, and to prevent deformation or breakage of the bobbin 110 and/or the housing 140. Furthermore, the projection 31 may also serve as a stopper in a direction perpendicular to the optical axis.

The bobbin 110 may include at least one groove 117, on or in which a ball member 310 is disposed or received. The groove 117 may alternatively be referred to as a "receiving groove" or a "guide groove". At least a portion of the ball member 310 may be in contact with the groove 117.

For example, the groove 117 may be formed in the second side portion 11B (or the second side surface or the second outer surface) of the bobbin 110. The groove 117 may have a structure that is depressed from the second side portion 11B (the second side surface or the second outer surface) of the bobbin 110.

For example, the groove 117 may be positioned between the second seating portion 105B and the corner of the bobbin 110 adjacent to the second side portion 11B.

For example, the groove 117 may include a first groove 117A and a second groove 117B. For example, the first groove 117A may be positioned between the second seating portion 105B and a corner of the bobbin 110 adjacent to the second side portion 11B. The second groove 117B may be positioned between the second seating portion 105B and the other corner of the bobbin 110 adjacent to the second side portion 11B.

For example, the first groove 117A may be positioned between the second seating portion 105B and the first escape portion 115A, and the second groove 117B may be positioned between the second seating portion 105B and the second escape portion 115B.

For example, the groove 117 may have an opening formed in the upper surface of the bobbin 110. For example, the lower portion of the groove 117 may not be open but may be closed at the lower surface of the bobbin 110. The lower portion of the groove 117 may have a height difference relative to the lower surface of the bobbin 110 in the optical-axis direction. For example, the lower portion of the groove 117 may be positioned higher than the lower surface of the bobbin 110.

For example, the groove 117 may be formed so as to extend in the optical-axis direction. For example, the groove 117 may extend from the upper surface to the lower surface of the bobbin 110, or may extend in the optical-axis direction so as to be formed between the upper surface and the lower surface of the bobbin 110.

For example, although the groove 117 may have a triangular shape when viewed from above, the disclosure is not limited thereto. The groove 117 may have a polygonal shape (for example, a rectangular shape or a pentagonal shape). Alternatively, the groove 117 may have a "V" shape or a "U" shape.

In another embodiment, the bobbin 110 may not be provided with the groove 117, and the housing 140 may be provided in the inner surface thereof with a groove, on or in which the ball member 310 is disposed or received.

For example, the groove 117 may be formed in at least one projection 114 (or protrusion) formed on the outer surface (or the second outer surface) of the second side portion 11B of the bobbin 110. The projection 114 may include a first projection 114A, in which the first groove 117A is formed, and a second projection 114B, in which the second groove 117B is formed.

The first magnet 132 and the second magnet 134 may be disposed on the bobbin 110 so as to be spaced apart from each other. For example, the second magnet 134 may be positioned opposite the first magnet 132.

For example, the first magnet 132 may be disposed on the first side portion 11A (the first side surface or the first outer surface) of the bobbin 110, and the second magnet 134 may be disposed on the first side portion 11A (the first side surface or the first outer surface) of the bobbin 110.

For example, the first magnet 132 may be disposed in the first seating portion 105A in the bobbin 110, and the second magnet 134 may be disposed in the second seating portion 105B in the bobbin 110.

The first magnet 132 may be disposed so as to correspond to or face the coil 120. By virtue of the interaction between the first magnet 132 and the coil 120, electromagnetic force may be generated, and the bobbin 110 may be movable in the optical-axis direction due to the electromagnetic force.

The first magnet 132 may include at least one magnet unit. Although the first magnet 132 includes a single magnet unit in FIG. 1, the disclosure is not limited thereto. In another embodiment, the first magnet 132 may include two or more magnet units.

Although each of the first magnet 132 and the second magnet 134 may have a shape corresponding to a corresponding one of the outer surfaces of the side portions 11A and 11B of the bobbin 110, for example, an overall polyhedral form (for example, a regular hexahedral form or a rectangular parallelepiped form), the disclosure is not limited thereto.

The first magnet 132 may be a monopolar magnetized magnet, which includes two different polarities and an interface plane naturally formed between the two different polarities.

For example, the first magnet 132 may be a monopolar magnetized magnet in which the N pole is separated from the S pole in the optical-axis direction. For example, the first magnet 132 may be a monopolar magnetized magnet in which the first surface thereof that faces the coil 120 includes the N pole and the S pole. Although the N pole of the first magnet 132 may be positioned at a higher level and the S pole of the first magnet 132 may be positioned at a lower level, the disclosure is not limited thereto. In another embodiment, the positions of the N pole and the S pole may be reversed.

In another embodiment, the first magnet 132 may also be a monopolar magnetized magnet in which the N pole is separated from the S pole in a direction perpendicular to the optical-axis direction. Although the first magnet according to another embodiment may, for example, be constructed such that the first surface thereof that faces the coil 120 becomes the N pole and the second surface thereof opposite the first surface becomes the S pole, the disclosure is not limited thereto. In a further embodiment, the positions of the N pole and the S pole may be reversed.

In a further embodiment, the first magnet 132 may also be a tetrapolar or bipolar magnetized magnet in order to increase electromagnetic force.

For example, the first magnet 132 may include a first magnet unit including the N pole and the S pole, a second magnet unit including the S pole and the N pole, and a partition wall disposed between the first magnet unit and the second magnet unit. Here, the partition wall is a portion that is almost completely non-magnetic and which may include a zone having almost no polarity. The partition wall may be filled with air or a non-magnetic material, and may be referred to as a "neutral zone".

For example, the first magnet and the second magnet may face each other in the optical-axis direction, and may be disposed such that different poles thereof face each other.

For example, the first surface of the first magnet that faces the first coil 120 may be the N pole (or the S pole), and the first surface of the second magnet that faces the first coil 120 may be the S pole (or the N pole). For example, the first surface of the first magnet that faces the first coil 120 and the first surface of the second magnet may have opposite polarities.

In another embodiment, for example, the first magnet and the second magnet may face each other in a direction perpendicular to the optical-axis direction, and the first magnet and the second magnet may be disposed such that different poles thereof face each other in a direction perpendicular to the optical-axis direction.

Although the first surface of the first magnet 132 may have a flat surface, the disclosure is not limited thereto. The first surface of the first magnet 132 may have a curved surface, a sloped surface, or a tapered surface. For example, the first surface of the first magnet 132 may be the surface that faces the coil 120.

The second magnet 134 may include at least one magnet unit. Although the second magnet 134 includes a single magnet unit in FIG. 1, the disclosure is not limited thereto. In another embodiment, the second magnet 134 may include two or more magnet units.

The second magnet 134 may be a monopolar magnetized magnet or a bipolar magnetized magnet. The description of the monopolar magnetized magnet or the bipolar magnetized magnet of the first magnet 132 may be applied to the second magnet 134 with or without modification.

The intensity of the magnetic force of the second magnet 134 may be different from the intensity of the magnetic force of the first magnet 132. Although the intensity of the magnetic force of the second magnet 132 may, for example, be less than the intensity of the magnetic force of the first magnet 132, the disclosure is not limited thereto. In another embodiment, the intensity of the magnetic force of the second magnet 134 may be equal to or greater than the intensity of the magnetic force of the first magnet 132.

For example, the second magnet 134 may be made of a material different from that of the first magnet 132. The second magnet 134 may include an component different from that of the first magnet 132.

For example, the second magnet 134 may be made of a material that has magnetic force lower than the magnetic force of the material of the first magnet 132. For example, the first magnet 132 may be made of a first material, and the second magnet 134 may be made of a second material different from the first material. Herein, the magnetic force of the first material may be higher than the magnetic force of the second material. The second magnet 134 may include at least one of neodymium (NdFeB) or samarium-cobalt.

In another embodiment, the second magnet 134 may be made of the same material as that of the first magnet 132.

The housing 140 may be disposed in the cover member 300, and may receive at least a portion of the bobbin 110 therein.

Referring to FIG. 3, the housing 140 may support the coil 120, the circuit board 190, and the yoke 136, and may receive therein the bobbin 110 such that an AF moving unit (or an AF operation unit) is movable in the optical-axis direction.

For example, the AF moving unit may include the bobbin 110 and components coupled or mounted to the bobbin 110. For example, the AF moving unit may include the bobbin 110, the first magnet 132, and the second magnet 134. Alternatively, the AF moving unit may include a lens module 400 (see FIG. 14) coupled or mounted to the bobbin 110.

Alternatively, in another embodiment in which the yoke 136 is disposed on the bobbin 110 and the second magnet 132 is disposed on the housing 140, the AF moving unit may include the bobbin 110, the first magnet 132, and the yoke 136.

Alternatively, in a further embodiment in which the coil 120 is disposed on the bobbin 110 and the first magnet 132 is disposed on the housing, the AF moving unit may include the bobbin 110, the coil 120, and the second magnet 134. In still a further embodiment, the AF moving unit may include the yoke 136 in place of the second magnet 134.

The housing 140 may have a bore 201, a hole, or a cavity configured to receive the bobbin 110 therein. Here, the bore 201 in the housing 140 may be positioned at the center or the central region of the housing 140. For example, the bore in the housing 140 may be a through hole, which is formed through the housing 140 in the optical-axis direction. Although the bore 201 in the housing 140 may have a shape corresponding to the shape of the bobbin 110, for example, a polygonal shape (for example, a quadrilateral shape or an octagonal shape) or a circular shape (or an elliptical shape), the disclosure is not limited thereto. The bore 201 in the housing 140 may have various shapes.

The housing 140 may include a plurality of side portions 12A to 12D. The housing 140 may include a corner or a corner portion positioned between two adjacent side portions.

The housing 140 may include a first side portion 12A corresponding to the first side portion 11A of the bobbin 110, a second side portion 12B corresponding to the second side portion 11B of the bobbin 110, a third side portion 12C corresponding to the third side portion 11C of the bobbin 110, and a fourth side portion 12D corresponding to the fourth side portion 11D of the bobbin 110. The first side portion 12A (or the first side surface or the first outer surface) of the housing 140 may be positioned opposite the second side portion 12B (or the second side surface or the second outer surface) of the housing 140, and the third side portion 12C (or the third side surface or the third outer surface) of the housing 140 may be positioned opposite the fourth side portion 12D (or the fourth side surface or the fourth outer surface) of the housing 140.

Each of the first to fourth side portions 12A to 12D of the housing 140 may be disposed parallel to a corresponding one of the side plates of the cover member 300.

For the purpose of disposition or seating of the yoke 136, the housing 140 may include a first seating portion 141 formed in the second side portion 12B of the housing 140. The first seating portion 141 may have the form of a hole, a groove, or a seating groove. For example, the first seating portion 141 may be a groove having a structure that is depressed from the second side portion 12B (or the second side surface or the second outer surface) of the housing 140, and may have an opening formed in at least one of the upper surface and the lower surface of the housing 140. For example, the lower portion of the first seating portion 141 may not be open but may be closed at the lower surface of the housing 140.

The first side portion 12A (or the first side surface or the first outer surface) of the housing 140 may have formed therethrough an opening or hole 106. At least a portion of the coil 120 may be disposed in the hole 106 in the housing 140. The hole 106 may be a through hole, which is formed through the first side portion 12A.

In another embodiment, the housing 140 may include a groove or a recess in place of the hole 106 for disposition of the coil 120.

For disposition or seating of the circuit board 190, the first side portion 12A (or the first side surface or the first outer surface) of the housing 140 has formed therein a second seating portion 142.

For example, the second seating portion 142 may be a groove having a structure that is depressed from the first side portion 12A (or the first side surface or the first outer surface) of the housing 140, and may have an opening formed in at least one of the upper surface and the lower surface of the housing 140. For example, the hole 106 may be formed in the bottom surface of the second seating portion 142 of the housing 140.

In another embodiment, the second seating portion 142 may include a protrusion to be coupled to the circuit board, and the circuit board may have a hole to be coupled to the protrusion of the housing.

The housing 140 may include the projection 31, which corresponds to or faces the escape groove 115 in the bobbin 110. The projection 31 may project toward the bobbin 110 from the inner surface or the internal surface of the housing 140.

For example, the projection 31 may be formed between two adjacent side portions of the housing 140. For example, the projection 31 may include a first projection 31A, which corresponds to or faces the first escape portion 115A in the bobbin 110, and a second projection 31B, which corresponds to or faces the second escape portion 115B in the bobbin 110.

For example, the first projection 31A may be formed between the inner surface of the second side portion 12B and the inner surface of the fourth side portion 12D of the housing 140, and the second projection 31B may be formed between the inner surface of the second side portion 12B and the inner surface of the third side portion 12C of the housing 140.

Although the projection 31 is formed so as to extend to the lower surface from the upper surface of the housing 140 in FIG. 3, the disclosure is not limited thereto. In another embodiment, one end (for example, the upper end or the upper surface) of the projection 117 may be spaced apart from the upper surface of the housing 140, and may be positioned below the upper surface of the housing 140. In a further embodiment, the other end (for example, the lower end or the lower surface) of the projection 117 may be spaced apart from the lower surface of the housing 140, and may be positioned above the lower surface of the housing 140.

Although the escape portion 115 is formed so as to extend to the lower surface from the upper surface of the bobbin 110 in FIG. 2, the disclosure is not limited thereto. In another embodiment, one end (for example, the upper end) of the escape portion 115 may be spaced apart from the upper surface of the bobbin 110, and may be positioned below the upper surface of the bobbin 110. In a further embodiment, the other end (for example, the lower end or the lower surface) of the projection 117 may be spaced apart from the lower surface of the bobbin 110, and may be positioned above the lower surface of the bobbin 110.

Although not shown in FIG. 3, the housing 140 may include a first stopper formed on the upper portion, the upper surface, or the upper end thereof, and a second stopper formed on the lower portion, the lower surface, or the lower end thereof. Each of the first and second stoppers of the bobbin 110 and the housing 140 may alternatively be referred to as a "boss" or a "protrusion".

The first side portion 11A (or the first side surface or the first outer surface) of the bobbin 110 may be provided thereon with at least one projection 112 (or a protrusion), the inner surface of the first side portion 12A of the housing 140 may be provided therein with at least one groove portion or a groove 23, which corresponds to or faces the projection 112 of the bobbin 110.

For example, the bobbin 110 may include a first projection 112A (or first protrusion), which is disposed on one side of the first side portion 11A (or the first side surface or the first outer surface), and a second projection 112B (or the second protrusion), which is disposed on another side of the first side portion 11A (or the first side surface or the first outer surface).

For example, the first seating portion 105A may be positioned between the first projection 112A and the second projection 112B.

The housing 140 may include at least one groove portion 23, which is formed by projection of the inner surface of the first portion 12A toward the bobbin 110 and corresponds to or faces the at least one projection 112 of the bobbin 110.

For example, the groove portion 23 in the housing 140 may include a first groove portion 23A, which is positioned at one side of the inner surface adjacent to the fourth side portion 12D, and a second groove portion 23B, which is positioned at another side of the inner surface of the first side portion 12A adjacent to the third side portion 12C.

For example, the at least one projection 112 of the bobbin 110 may be disposed in the at least one groove portion 23 in the housing 140.

For example, the first projection 112A of the bobbin 110 may be disposed in the first groove portion 23A in the housing 140, and the second projection 112B of the bobbin 110 may be disposed in the second groove portion 23B in the housing 140.

The projection 112 of the bobbin 110 and the groove portion 23 in the housing 140 may together serve to suppress the extent to which the bobbin 110 rotates about the optical axis. For example, the projection 112 may be referred to as a "rotation suppressor", a "stopper", a "catching step", a "shock mitigator", or a "shock absorber".

By virtue of the projection 112, it is possible to suppress or prevent the bobbin 110 from rotating beyond an intentional extent due to external shock, to mitigate shock between the bobbin 110 and the housing 140 due to external shock, to reduce generation of foreign substances or particles attributable to shock or collision, and to prevent deformation or breakage of the bobbin 110 and/or the housing 140. Furthermore, the projection 31 may also serve as a stopper in a direction perpendicular to the optical-axis direction.

In another embodiment, for prevention of the rotation, a groove portion may be formed in the bobbin 110, in place of the projection 112, and a projection may be formed on the housing 140, in place of the groove portion 23.

The housing 140 may include at least one projection 41 (or a protrusion), which is disposed in the first seating portion 105A in the bobbin 110. The projection 41 may project toward the first side portion 11A of the bobbin 110 from the inner surface of the first side portion 12A of the housing 140.

For example, the projection 41 (or the protrusion) may include a first projection 41A and a second projection 41B.

Next, the coil 120 will be described.

The coil 120 may be positioned so as to correspond to or face the first magnet 132 in a direction perpendicular to the optical-axis direction. For example, the coil 120 may be disposed on the first side portion 12A of the housing 140 so as to correspond to or face the first magnet 132. Alternatively, for example, the coil 120 may be disposed between the first side portion 11A (or the first side surface or the first outer surface) of the bobbin 110 and the first side plate of the cover member 300.

For example, the coil 120 may be a AF drive coil configured to electromagnetically interact with the first magnet 132 disposed at the bobbin 110.

For example, the coil 120 may be disposed on the housing 140. For example, at least a portion of the coil 120 may be disposed in the hole 106 in the housing 140.

In order to create electromagnetic force from the interaction with the first magnet 132, a drive signal (for example, drive current or voltage) may be supplied or applied to the coil 120.

The drive signal applied to the coil 120 may be a DC signal, without being limited thereto. The drive signal may be an AC signal or a signal containing both DC and AC components.

An AF moving unit (or AF operation unit) may be moved in the first direction, for example, in an upward direction (in the +z-axis direction) or in a downward direction (in the −z-axis direction) by virtue of the electromagnetic force resulting from the interaction between the coil 120 and the magnet 130.

By controlling the intensity and/or polarity of a drive signal applied to the first coil 120 (for example, the direction in which current flows) and thus controlling the intensity and/or direction of the electromagnetic force resulting from the interaction between the coil 120 and the first magnet 132, it is possible to control the movement of the AF moving unit in the first direction, thereby performing an autofocus function.

The coil 120 may have a closed-loop shape, for example, a ring shape having a central hole 120A. The coil 120 may be coupled to the circuit board 190 disposed on the housing 140, or may be mounted on the circuit board 190. For example, the coil 120 may be disposed on a first surface of the circuit board 190. For example, the first surface of the circuit board 190 may be a surface that faces the first side portion 11A (or the first side surface or the first outer surface) of the bobbin 110.

For example, the coil 120 may be embodied as a coil ring, which is wound or coiled in a clockwise direction or in a counterclockwise direction about an axis perpendicular to the optical axis.

The coil 120 may be conductively connected to the circuit board 190. For example, the coil 120 may be conductively connected to the terminals of the circuit board 190 using solder or conductive adhesive. For example, the coil 120 may be conductively connected to two of the terminals 9-1 to **9-*n* (n being a natural number greater than 1) of the circuit board 190**.

The circuit board 190 may be disposed on the first side portion 12A (or the first side surface or the first outer surface) of the housing 140. For example, at least a portion of the circuit board 190 may be disposed in the second seating portion 142 formed in the first side portion 12A of the housing 140.

For example, at least a portion of the first surface of the circuit board 190 may be in contact with the bottom surface of the second seating portion 142 in the housing 140.

The circuit board 190 may include a plurality of terminals 9-1 to **9-*n* (n being a natural number greater than 1), which are to be conductively connected to external apparatuses or devices. For example, the plurality of terminals 9-1 to 9-*n* may be disposed on the second surface of the circuit board 190. The second surface of the circuit board 190 may be a surface opposite the first surface of the circuit board 190**.

For example, the circuit board 190 may be a printed circuit board or an FPCB.

Although the plurality of terminals 9-1 to **9-*n* may, for example, be arranged in a row at the lower end of the second surface of the circuit board 190**, the disclosure is not limited thereto.

Although the circuit board 190 according to the embodiment shown in FIG. 1 includes six terminals 9-1 to **9-*n*** (for example, n=6), the number of terminals is not limited thereto.

The circuit board 190 may include a separate circuit pattern, a wire and/or a pad for conductively connecting the position sensor 190 to the terminals 9-1 to **9-*n***.

The yoke 136 may be disposed on the housing 140 so as to correspond to or face the second magnet 134. For example, the yoke 136 may be disposed so as to face the second magnet 134 in a direction perpendicular to the optical-axis direction.

The yoke 136 may be disposed on a side portion of the housing 140 other than the first side portion 12A of the housing 140 on which the coil 120 is disposed. For example, the yoke 136 may be positioned opposite the coil 120. For example, the yoke 136 may be disposed on the second side portion 12B of the housing 140. For example, the second magnet 134 may be disposed between the second side portion 11B of the bobbin 110 and the yoke 136. Alternatively, for example, the second magnet 134 may be disposed between the first magnet 132 and the yoke 136.

The yoke 136 may be disposed so as to be spaced apart from the circuit board 190. For example, the circuit board 190 may be disposed on the first side portion 12A of the housing 140, and the first magnet 132 may be disposed between the circuit board 190 and the yoke 136.

For example, attractive force may act between the yoke 136 and the second magnet 134 in a direction perpendicular to the optical-axis direction. A magnetic circuit may be formed between the yoke 136 and the second magnet 134.

The yoke 136 may be made of a ferromagnetic material. For example, the yoke 136 may be a magnetic body. For example, the yoke 136 may be made of ferromagnetic metal. Alternatively, for example, the yoke 136 may be made of a material having magnetism.

Alternatively, for example, the yoke 136 may be a magnet. Here, the yoke 136 may alternatively be referred to as a “third magnet”.

Because the yoke 136 is disposed on the housing 140, which is a stationary body, the bobbin 110 coupled to the second magnet 134 may be attracted toward the yoke 136 by means of the attractive force acting between the yoke 136 and the second magnet 134.

Because a ball member 310 is pressed by the bobbin 110 and the housing 140 by means of the interaction between the yoke 136 and the second magnet 134, the yoke 136 and the second magnet 134 may be referred to as a “press unit” or a “press member”. When the bobbin 110 is moved in the optical-axis direction by the press unit, the contact between the bobbin 110 and the ball member 310 and the contact between the housing 140 and the ball member 310 may be maintained.

The ball member 310 may be disposed between the bobbin 110 and the housing 140. The ball member 310 may alternatively be referred to as a “rolling member”, a “ball”, or a “ball bearing”.

Since the ball member 310 is in contact with the bobbin 110 and the housing 140 and rolls between the bobbin 110 and the housing 140, the ball member 310 is able to support movement of the bobbin 110 in the optical-axis direction. The ball member 310 is able to reduce the friction between the bobbin 110 and the housing 140 when the bobbin 110 is moved in the optical-axis direction. By virtue of rolling motion of the ball member 310, the bobbin 110 is movable in a sliding manner in the optical-axis direction in the state of being in contact with the ball member 310.

Although the ball member 310 may be made of, for example, a metal material, a plastic material, or a resin material, the disclosure is not limited thereto.

The ball member 310 may have a circular shape, and may have a sufficient diameter to support movement of the bobbin 110 in the optical-axis direction.

For example, the ball member 310 may be disposed between the second side portion 11B (or the second side surface or the second outer surface) of the bobbin 110 and the second side portion 12B of the housing 140. For example, the ball member 310 may be disposed opposite the first magnet 132.

For example, at least a portion of the ball member 310 may be disposed in the groove 117 in the bobbin 110. For example, the ball member 310 may be disposed between the groove 117 in the bobbin 110 and the inner surface of the housing 140, and may be in contact with the groove 117 in the bobbin 110 and the inner surface of the housing 140.

Furthermore, the ball member 310 may include at least one ball member. For example, the ball member 310 may include two or more ball members 310A and 310B.

For example, the ball member 310 may include a first ball member 310A, which is disposed between the first groove 117A in the bobbin 110 and the second side portion 12B of the housing 140, and a second ball member 310B, which is disposed between the second groove 117B in the bobbin 110 and the second side portion 12B of the housing 140.

For example, the first ball member 310A may include a plurality of balls B1 to B3, and the second ball member 310B may include a plurality of balls B4 to B6.

For example, at least a portion of the ball member 310 may be disposed in the first groove 117A in the bobbin 110, and may be in contact with the first groove 17A. At least another portion of the ball member 310 may be in contact with the inner surface of the second side portion 12B of the housing 140.

Figure 4B:
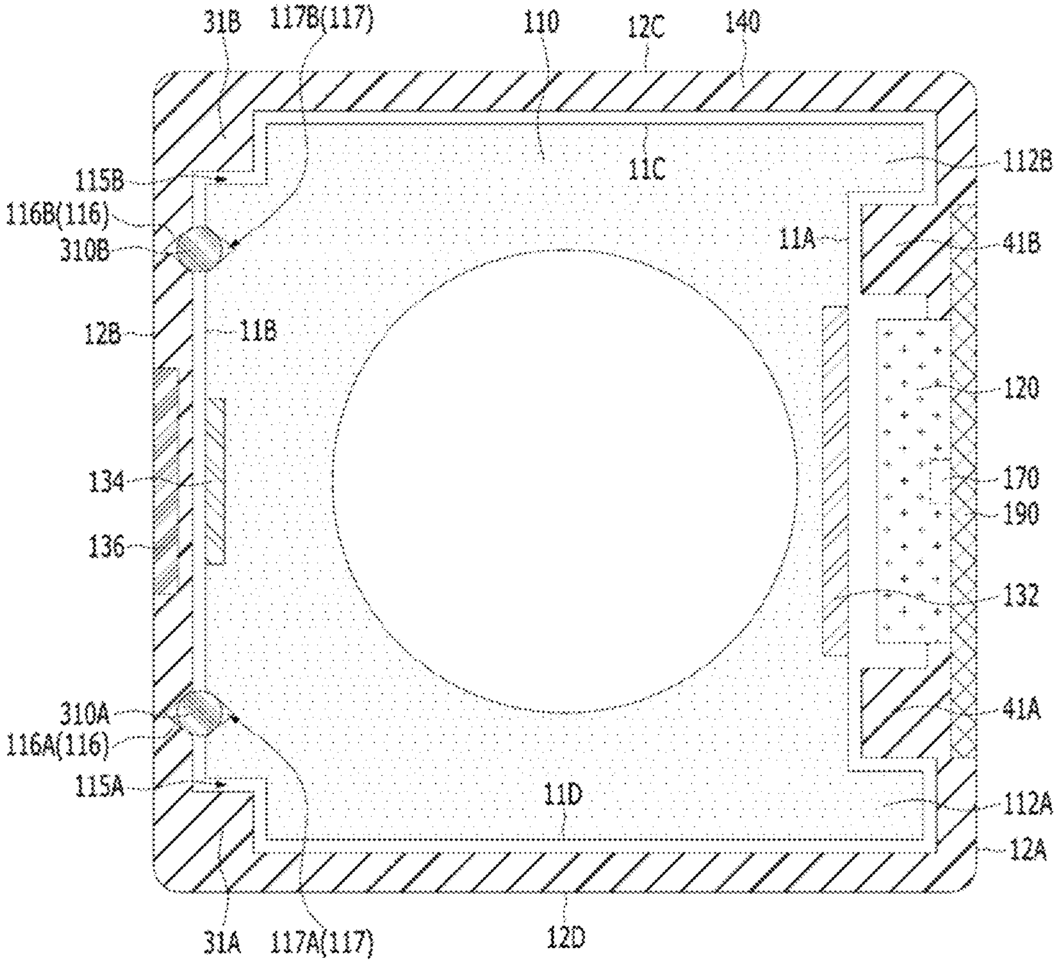
FIG. 4B illustrates a modification of the embodiment shown in FIG. 4A.

FIG. 4B illustrates a modification of the embodiment shown in FIG. 4A.

Referring to FIG. 4B, the housing 140 may have a groove 116, which corresponds to or faces the groove 117 in the bobbin 110.

For example, the groove 116 may be formed in the second side portion 12B of the housing 140. For example, the groove 116 may be formed in the inner surface of the second side portion 12B of the housing 140. The description of the groove 117 in the bobbin 110 may be applied to the groove 116 in the housing 140 with or without modification.

For example, the groove 116 may include a first groove 116A, which corresponds to or faces the first groove 117A in the bobbin 110, and a second groove 116B, which corresponds to or faces the second groove 117B in the bobbin 110.

At least a portion of the ball member 310 may be disposed in the groove 117 in the bobbin 110, and may be in contact with the groove 117 in the bobbin 110. For example, there may be one or more contact point between the at least a portion of the ball member 310 and the groove 117 in the bobbin 110.

At least another portion of the ball member 310 may be disposed in the groove 116 in the housing 140, and may be in contact with the groove 116 in the housing 140. For example, there may be one or more contact points between the at least another portion of the ball member 310 and the groove 116 in the housing 140.

By virtue of the attractive force acting between the yoke 136 and the second magnet 134, the ball member 310 may be pressed by the bobbin 110 and/or the housing 140, and may stably support the bobbin 110.

Although the yoke 136 is disposed on the housing 140 and the second magnet 134 is disposed on the bobbin 110 in the embodiment shown in FIG. 1, the disclosure is not limited thereto. In another embodiment, the yoke 136 may be disposed on the second side portion 11B of the bobbin 110, and the second magnet 134 may be disposed on the second side portion 12B of the housing 140.

The cover member 300 may accommodate therein the housing 140.

The cover member 300 may have the form of a box, which is open at the lower portion thereof and includes an upper plate 301 and side plates 302. The side plates 302 of the cover member 300 may extend downwards from the upper plate 301 of the cover member 300. The upper plate 301 of the cover member 300 may have a polygonal shape, for example, a quadrilateral shape or an octagonal shape, and may have a bore formed therethrough so as to allow a lens or a lens module to be exposed to an external light.

The cover member 300 may be made of a nonmagnetic material such as stainless steel or plastic in order to prevent the cover member 300 from being attracted to the magnets 132 and 134. However, the cover member 300 may alternatively be made of a magnetic material so as to serve as a yoke.

Figure 5A:
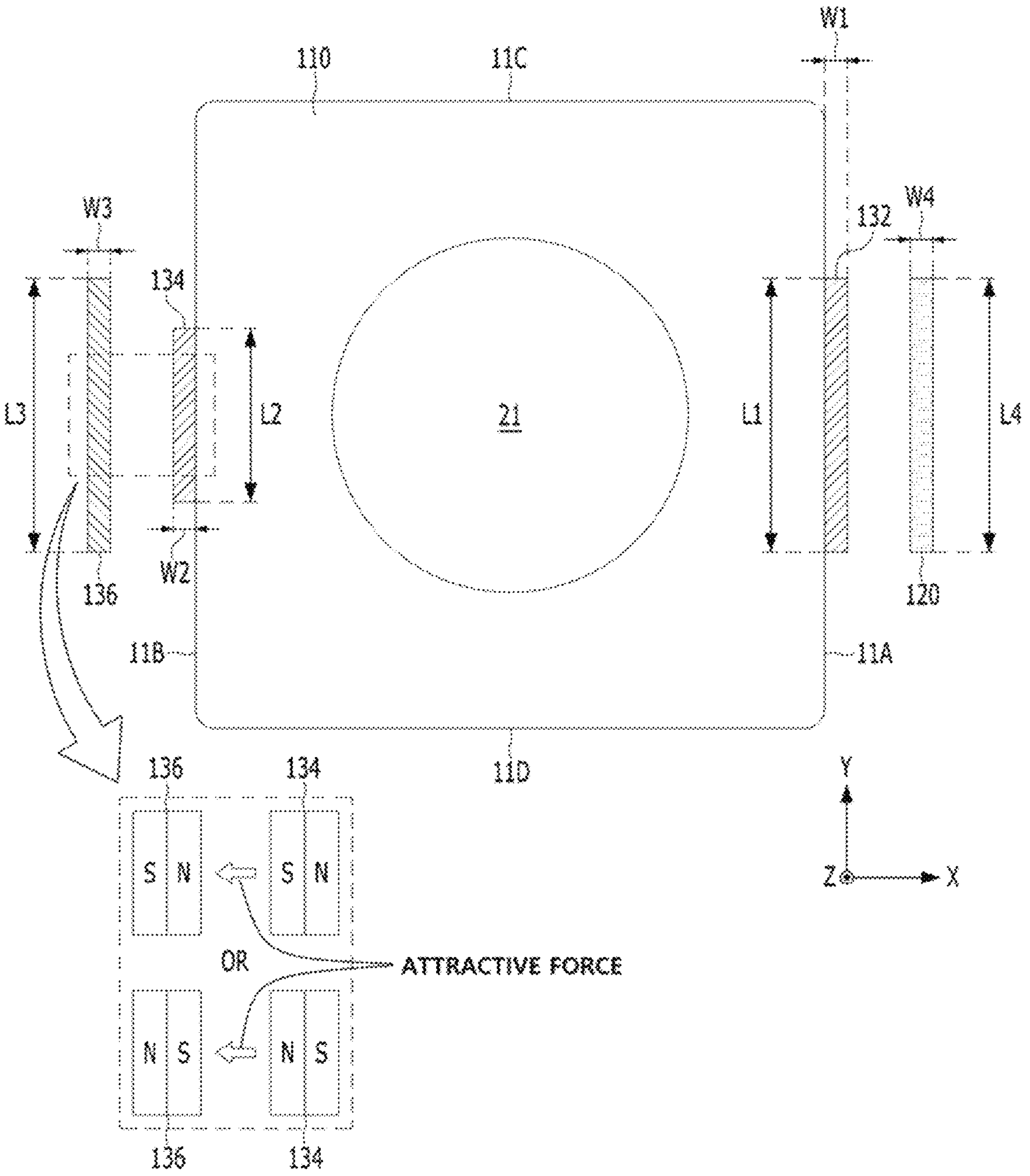
FIG. 5A is a plan view of the first magnet, the coil, the second magnet, and the yoke according to an embodiment.

FIG. 5A is a plan view illustrating an embodiment of the first magnet 132, the coil 120, the second magnet 134, and the yoke 136.

Referring to FIG. 5A, for example, the length L1 of the first magnet 132 in the vertical direction may be greater than the length L2 of the second magnet 134 in the vertical direction. The reason for this is to assure sufficient electromagnetic force for AF operation by increasing the length of the first magnet 132 in the vertical direction because the first magnet 132 is a drive magnet for AF operation.

In another embodiment, the length L1 of the first magnet 132 in the vertical direction may be equal to the length L2 of the second magnet 134 in the vertical direction. In a further embodiment, the length of the first magnet 132 in the vertical direction may be less than the length of the second magnet 134 in the vertical direction.

The length L3 of the yoke 136 in the vertical direction may be greater than the length L2 of the second magnet 134 in the vertical direction.

For example, the surface area of the first surface of the yoke 136, which faces the second magnet 134, may be larger than the surface area of the first surface of the second magnet 134, which faces the yoke 136.

For example, the length L3 of the yoke 136 in the vertical direction may be three or more times the length L2 of the second magnet 134 in the vertical direction. Alternatively, for example, the length L3 of the yoke 136 in the vertical direction may be five or more times and ten or less times the length L2 of the second magnet 134 in the vertical direction.

The reason for this is to increase the attractive force acting between the yoke 136 and the second magnet 134 by increasing the length of the yoke 136 such that the yoke 136 is subjected to a sufficient magnetic force of the second magnet 134.

Here, the "vertical direction" may be a direction, which is perpendicular to the optical-axis direction and is directed toward the fourth side portion 11D from the third side portion 11C of the bobbin 110. Alternatively, the "vertical direction" may be a direction, which is perpendicular to the optical-axis direction and is parallel to the first side portion 11A or the second side portion 11B.

The length W1 of the first magnet 132 in the horizontal direction may be greater than the length W2 of the second magnet 134 in the horizontal direction. The reason for this is to assure a sufficient electromagnetic force for AF operation by increasing the length of the first magnet 132 in the horizontal direction because the first magnet 132 is a drive magnet for AF operation. In another embodiment, the length W1 of the first magnet 132 in the horizontal direction may be equal to the length W2 of the second magnet 134 in the horizontal direction. In a further embodiment, the length W1 of the first magnet 132 in the horizontal direction may be less than the length W2 of the second magnet 134 in the horizontal direction.

For example, the "horizontal direction" may be a direction perpendicular to the "vertical direction".

Alternatively, for example, the "horizontal direction" may be a direction, which is perpendicular to the optical-axis direction and is directed toward the second side portion 11B from the first side portion 11A of the bobbin 110. Alternatively, the "horizontal direction" may be a direction, which is perpendicular to the optical-axis direction and is parallel to the third side portion 11C or the fourth side portion 11D of the bobbin 110.

For example, the length L1 of the first magnet 132 in the vertical direction may be equal to or greater than the length L4 of the coil 120 in the vertical direction. In another embodiment, the length L1 of the first magnet 132 in the vertical direction may be less than the length L4 of the coil 120 in the vertical direction.

Furthermore, for example, the length W1 of the first magnet 132 in the horizontal direction may be equal to or greater than the length W4 of the coil 120 in the horizontal direction. In another embodiment, the length W1 of the first magnet 132 in the horizontal direction may be less than the length W4 of the coil 120 in the horizontal direction.

When the yoke 136 is a magnet, the facing surfaces of the second magnet 134 and the yoke 136 may have different polarities in order to allow an attractive force to act between the yoke 136 and the second magnet 134.

As illustrated in FIG. 5A, for example, the first surface of the second magnet 134 may face the first surface of the yoke 136, the first surface of the second magnet 134 may have S polarity, and the first surface of the yoke 136 may have N polarity. Alternatively, for example, the first surface of the second magnet 134 may have N polarity, and the first surface of the yoke 136 may have S polarity.

Figure 5B:
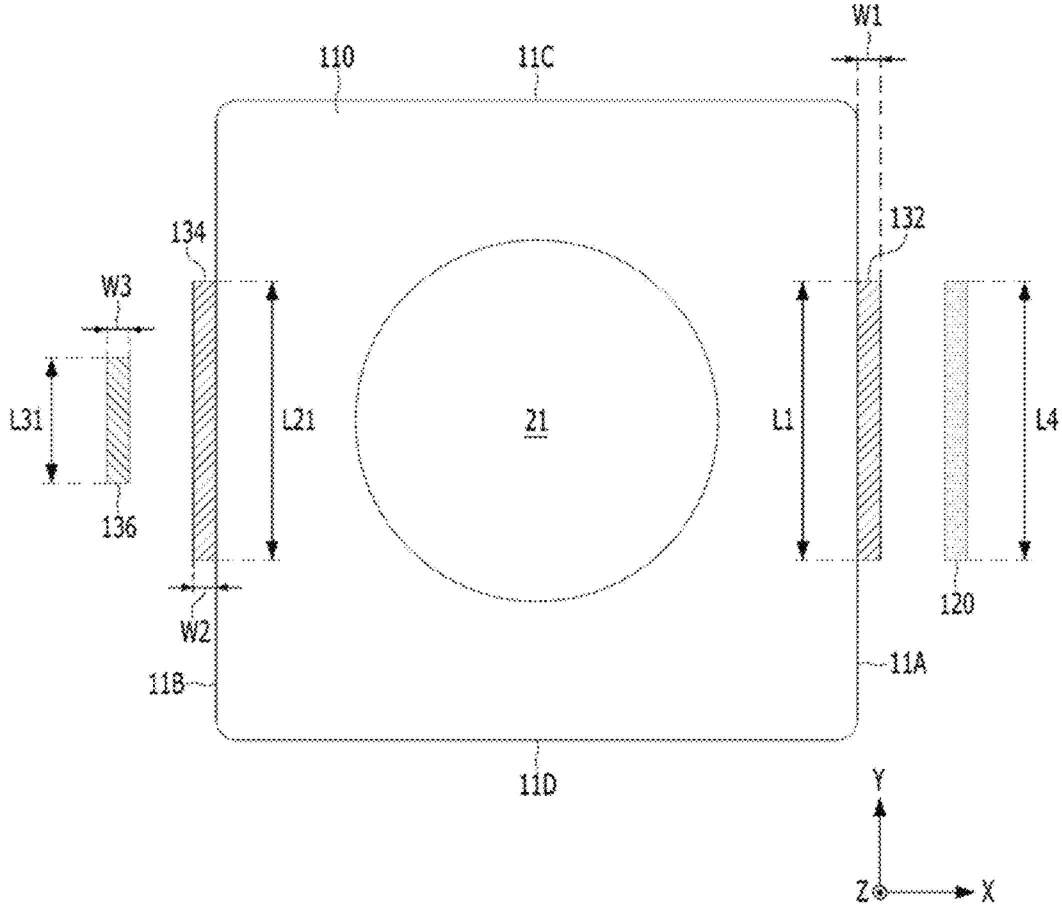
FIG. 5B is a plan view of the first magnet, the coil, the second magnet, and the yoke according to another embodiment.

FIG. 5B is a plan view illustrating another embodiment of the first magnet 132, the coil 120, the second magnet 134, and the yoke 136. The lengths of the second magnet 134 and the yoke 136, shown in FIG. 5B, in the vertical direction may be different from the embodiment shown in FIG. 5A.

Referring to FIG. 5B, the length L21 of the second magnet 134 in the vertical direction may be less than the length L31 of the yoke 136 in the vertical direction (L21<L31).

For example, the surface area of the first surface of the yoke 136, which faces the second magnet 134, may be smaller than the surface area of the first surface of the second magnet 134, which faces the yoke 136.

The length L21 of the second magnet 134 in the vertical direction may be equal to or less than the length L1 of the first magnet 132 in the vertical direction. In another embodiment, the length L21 of the second magnet 134 in the vertical direction may be greater than the length L1 of the first magnet 132 in the vertical direction.

While the yoke 136 shown in FIG. 5B is a magnet, the description of the embodiment shown in FIG. 5A may be applied to the polarities of the second magnet 134 and the yoke 136 shown in FIG. 5B with or without modification.

In order to prevent tilting of the bobbin 110 during AF operation, the length of the second magnet 134 in the optical-axis direction may be different from the length of the yoke 136 in the optical-axis direction.

Furthermore, for example, the entire region of the second magnet 134 may overlap the yoke 136 in a direction perpendicular to the optical-axis direction in the entire zone in which the bobbin 110 moves in the optical-axis direction.

Figure 6A:
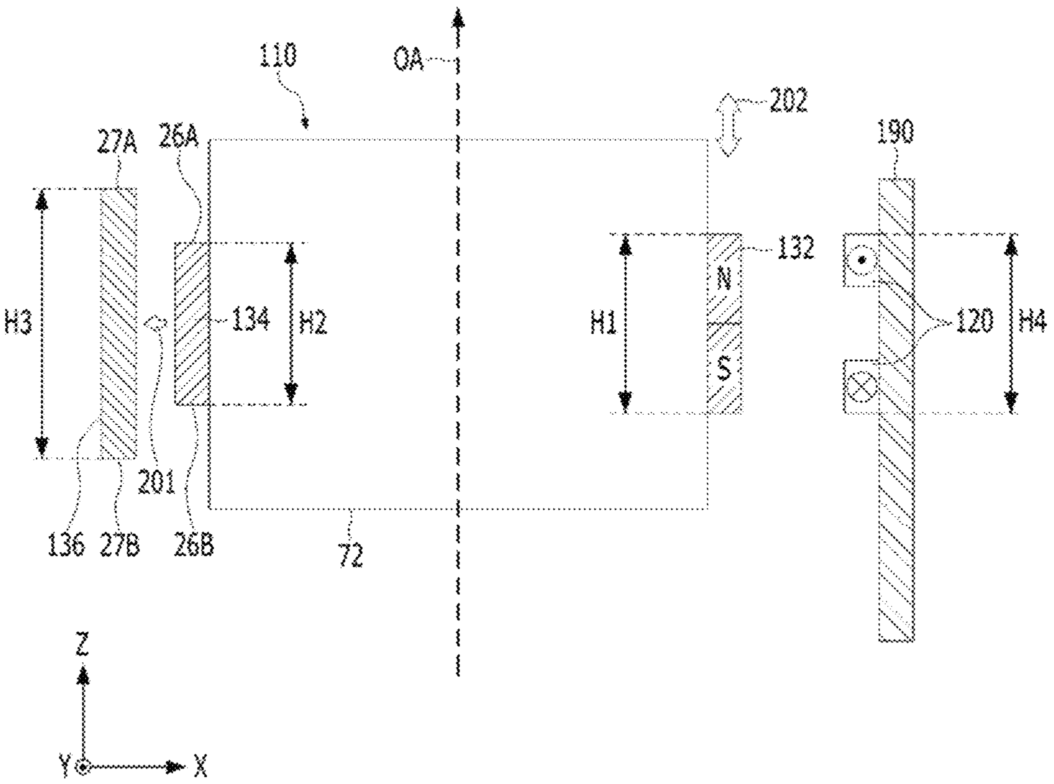
FIG. 6A is a cross-sectional view of the first magnet, the coil, the second magnet, and the yoke according to an embodiment, taken in the optical-axis direction.

FIG. 6A is a cross-sectional view of an embodiment of the first magnet 132, the coil 120, the second magnet 134, and the yoke 136, taken in the direction of the optical axis OA.

Referring to FIG. 6A, the length H1 of the first magnet 132 in the optical-axis direction may be greater than the length H2 of the second magnet 134 in the optical-axis direction. The reason for this is to assure sufficient electromagnetic force for AF operation by increasing the length of the first magnet 132 in the optical-axis direction because the first magnet 132 is a drive magnet for AF operation.

In another embodiment, the length of the first magnet 132 in the optical-axis direction may be equal to the length of the second magnet 134 in the optical-axis direction. In a further embodiment, the length of the first magnet 132 in the optical-axis direction may be less than the length of the second magnet 134 in the optical-axis direction.

At least a portion of the first magnet 132 may overlap at least a portion of the second magnet 134 in a direction perpendicular to the optical axis OA. Here, the direction perpendicular to the optical axis OA may be a direction, which is parallel to a straight line which extends through the optical axis OA and is perpendicular to the optical axis OA.

The length H3 of the yoke 136 in the optical-axis direction may be greater than the length H2 of the second magnet 134 in the optical-axis direction (H3>H2).

For example, the length H3 of the yoke 136 in the optical-axis direction may be 1.5 or more times the length H2 of the second magnet 134 in the optical-axis direction. For example, the length H3 of the yoke 136 in the optical-axis direction may be two or more times and five or less times the length H2 of the second magnet 134 in the optical-axis direction.

The reason why the length H3 is greater than the length H2 is to maintain the attractive force acting between the second magnet 134 and the yoke 136 constant in the zone in which the bobbin 110 moves in the optical-axis direction for AF operation.

The attractive force acting between the second magnet 134 and the yoke 136 may be influenced by the range in which the yoke 136 overlaps the second magnet 134 in a direction perpendicular to the optical-axis direction.

For example, when the entire region of the second magnet 134 overlaps the yoke 136 in a direction perpendicular to the optical-axis direction in the entire zone in which the bobbin 110 moves in the optical-axis direction, it is possible to maintain the attractive force acting between the second magnet 134 and the yoke 136 constant.

In contrast, when at least a portion of the second magnet 134 does not overlap the yoke 136 in a direction perpendicular to the optical-axis direction, the attractive force acting between the second magnet 134 and the yoke 136 may decrease, thereby causing a case in which the bobbin 110 is not brought into close contact with the ball member 310. Hence, the bobbin 110 may be tilted relative to the optical-axis, thereby making it impossible for accurate AF operation to be performed.

Accordingly, in the entire zone in which the bobbin 110 moves in the optical-axis direction, the upper end 26A (or the upper surface or the upper portion) of the second magnet 134 may be positioned lower than the upper end 27A (or the upper surface or the upper portion) of the yoke 136, and the lower end 26B (or the lower surface or the lower portion) of the second magnet 134 may be positioned higher than the lower end 27B (or the lower surface or the lower portion) of the yoke 136. Here, the entire zone for movement of the bobbin may be the position (or the displacement) of the bobbin from the lowest point of the bobbin 110 to the highest point of the bobbin 110.

In another embodiment, the upper end 25A (or the upper surface or the upper portion) of the second magnet 134 may be flush with the upper end 27A (or the upper surface or the upper portion) of the yoke 136 when the bobbin 110 is positioned at the highest point. Meanwhile, the lower end 26B (or the lower surface or the lower portion) of the second magnet 134 may be flush with the lower end 27B (or the lower surface or the lower portion) of the yoke 136 when the bobbin 110 is positioned at the lowest point.

Although the lower end 27B of the yoke 136 is positioned higher than the lowest end 72 of the bobbin 110 in FIG. 6A, the disclosure is not limited thereto. In another embodiment, the lower end 27B of the yoke 136 may be positioned lower than the lowest end 72 of the bobbin 110 or may be positioned at the same level as the lowest end 72 of the bobbin 110 in FIG. 6A. For example, the lowest end 72 of the bobbin 110 may be the lower end or the lower surface of the stopper provided at the lower surface of the bobbin 110 or a lower side of the bobbin 110. For example, the lower end 27B of the yoke 136 may project downwards beyond the lowest end 72 of the bobbin 110.

Figure 6B:
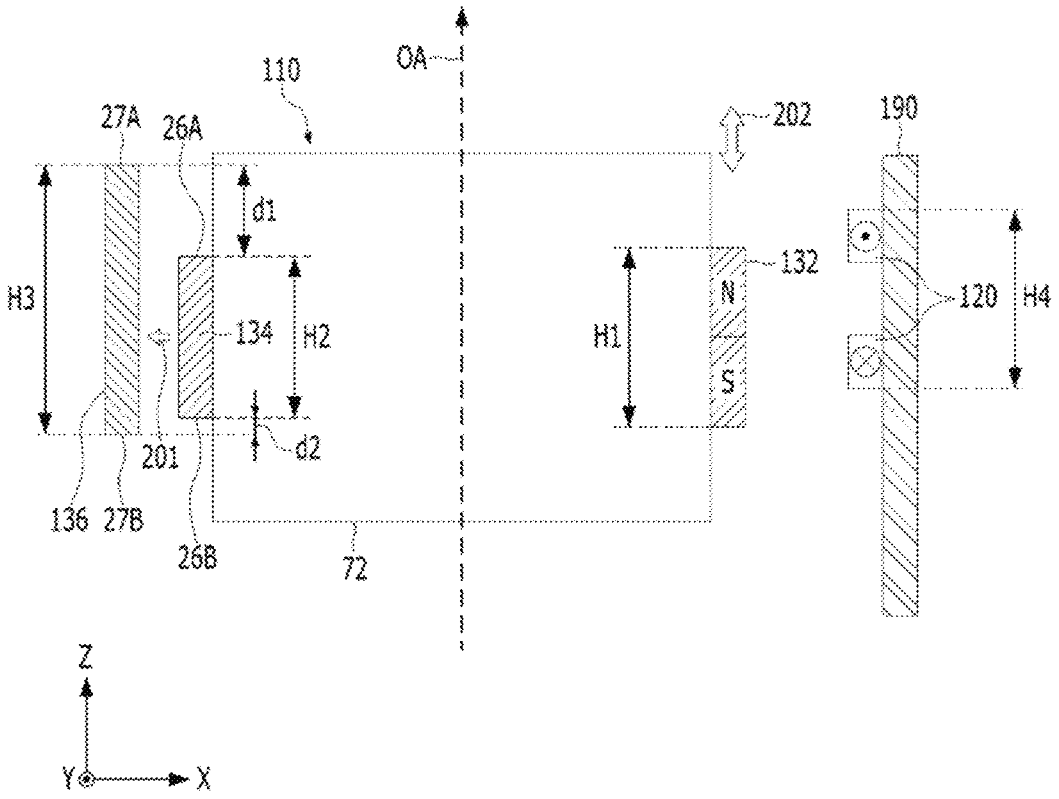
FIG. 6B illustrates the distance between the upper end of the second magnet and the upper end of the yoke when the bobbin shown in FIG. 6A is positioned at the lowest point.

FIG. 6B illustrates the distance between the upper end 26A of the second magnet 134 and the upper end 27A of the yoke 136 when the bobbin 110 shown in FIG. 6A is positioned at the lowest point.

Referring to FIG. 6B, the first distance d1 between the upper end 26A of the second magnet 134 and the upper end 27A of the yoke 136 in the optical-axis direction may be greater than the total stroke distance or the movable distance of the bobbin 110 in the optical-axis direction when the bobbin 110 is positioned at the lowest point.

For example, the total stroke distance of the bobbin 110 may be a distance that the bobbin 110 moves from the lowest point to the highest point thereof.

For example, the lowest point may be the lowest point of the displacement that the bobbin 110 moves in the optical-axis direction for AF operation. For example, the lowest point may be the displacement or the position of the bobbin 110 when the lower end of the bobbin 110 or the lower stopper of the bobbin 110 comes into contact with or collides with the stationary portion (for example, the housing 140).

For example, the highest point may be the highest point of the displacement that the bobbin 110 moves in the optical-axis direction for AF operation. For example, the highest point may be the displacement or the position of the bobbin 110 when the upper end of the bobbin 110 or the upper stopper of the bobbin 110 comes into contact with or collides with the stationary portion (or the housing 140) or the cover member 300.

For example, the first distance d1 may be one or more times and three or less times the total stroke distance of the bobbin 110 in the optical-axis direction. Alternatively, for example, the first distance d1 may be 1.5 to two times the total stroke distance of the bobbin 110 in the optical-axis direction.

In another embodiment, for example, the first distance d1 may be equal to the total stroke distance of the bobbin 110 in the optical-axis direction.

For example, when the bobbin 110 is positioned at the lowest point, the second distance d2 between the lower end 26B of the second magnet 134 and the lower end 27B of the yoke 136 in the optical-axis direction may be 0 or greater and may be two or less times the total stroke distance of the bobbin 110 in the optical-axis direction.

For example, the second distance d2 may be one to two times the total stroke distance of the bobbin 110 in the optical-axis direction. Alternatively, the second distance d2 may be 0 or greater, and may be 1.5 or less times the total stroke distance of the bobbin 110 in the optical-axis direction.

Figure 6C:
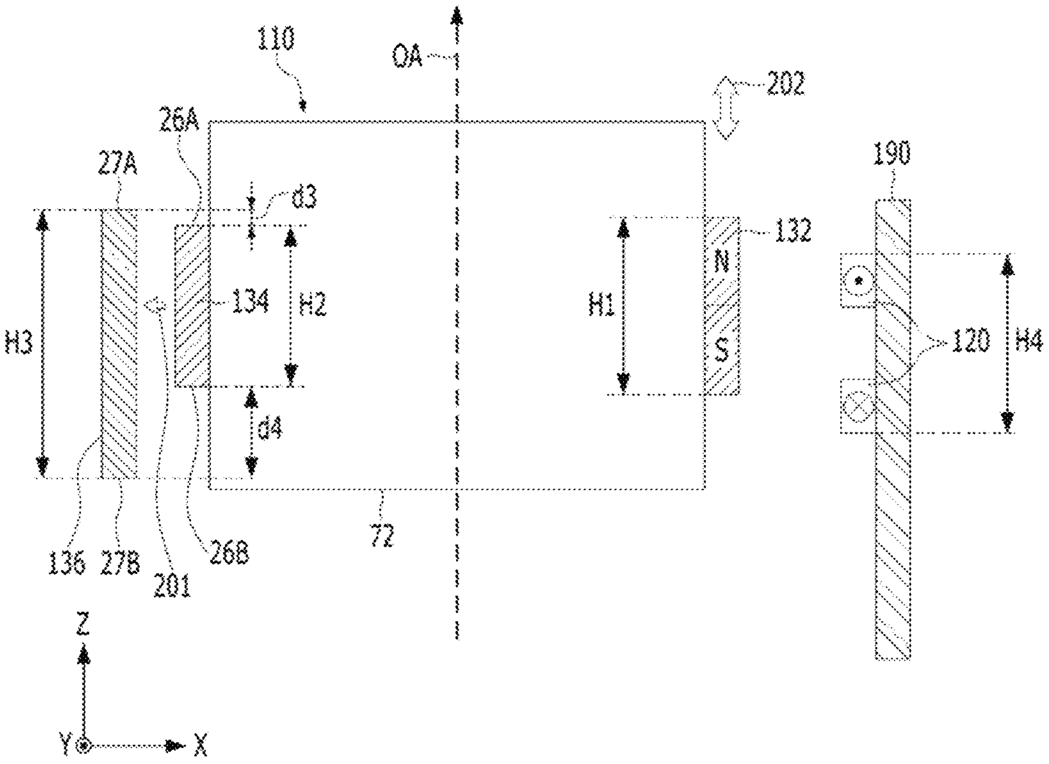
FIG. 6C illustrates the distance between the upper end of the second magnet and the upper end of the yoke when the bobbin shown in FIG.

FIG. 6C illustrates the distance between the upper end 26A of the second magnet 134 and the upper end 27A of the yoke 136 when the bobbin 110 shown in FIG. 6A is positioned at the highest point.

Referring to FIG. 6C, for example, when the bobbin 110 is positioned at the highest point, the third distance d3 between the upper end 26A of the second magnet 134 and the upper end 27A of the yoke 136 in the optical-axis direction may be 0 or greater and may be two or less times the total stroke distance of the bobbin 110 in the optical-axis direction.

For example, the third distance d3 may be one to two times the total stroke distance of the bobbin 110 in the optical-axis direction. Alternatively, for example, the third distance d3 may be 0 or greater, and may be 1.5 or less times the total stroke distance of the bobbin 110 in the optical-axis direction.

When the bobbin 110 is positioned at the highest point, the fourth distance d4 between the lower end 26B of the second magnet 134 and the lower end 27B of the yoke 136 in the optical-axis direction may be greater than the total stroke distance of the movable distance of the bobbin 110 in the optical-axis direction.

For example, the fourth distance d4 may be one or more times and three or less times the total stroke distance of the bobbin 110 in the optical-axis direction. Alternatively, the fourth distance d4 may be 1.5 to two times the total stroke distance of the bobbin 110 in the optical-axis direction.

When the first distance d1 (or the fourth distance d4) is less than the total stroke distance, the attractive force acting between the second magnet 134 and the yoke 136 may not be maintained constant, thereby deteriorating reliability of AF operation. Meanwhile, when the first distance d1 (or the fourth distance d4) is greater than three times the total stroke distance, the size of the yoke 136 may unnecessarily increase, thereby increasing the size of the lens moving apparatus and the total cost.

In another embodiment, for example, the fourth distance d4 may be equal to the total stroke distance of the bobbin 110 in the optical-axis direction.

As described in FIGS. 6B and 6C, since the entire region of the second magnet 134 overlaps the yoke 136 even when the bobbin 110 moves in the optical-axis direction for AF operation, it is possible to maintain pressing force applied to the first ball member 310 constant, and it is possible to suppress tilting of the bobbin 110 and thus to assure reliability of AF operation.

In another embodiment, the region in which the second magnet 134 overlaps the yoke 136 in a direction perpendicular to the optical-axis direction in the entire zone in which the bobbin 110 moves in the optical-axis direction may be 50% or more of the total volume of the second magnet 134.

Figure 7A:
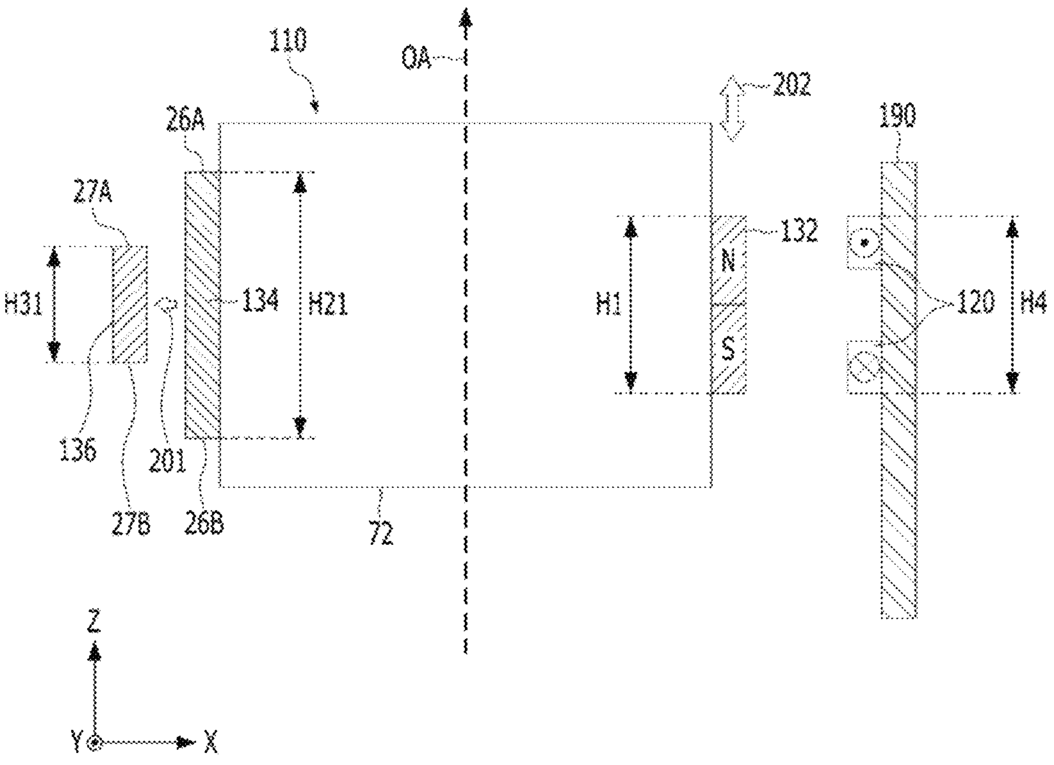
FIG. 7A is a cross-sectional view of the first magnet, the coil, the second magnet, and the yoke according to another embodiment, taken in the optical-axis direction.

FIG. 7A is a cross-sectional view of another embodiment of the first magnet 132, the coil 120, the second magnet 134, and the yoke 136, taken in the direction of the optical axis OA.

Referring to FIG. 7A, the length H21 of the second magnet 134 in the optical-axis direction may be greater than the length H1 of the first magnet 132 in the optical-axis direction (H21>H1).

The length H31 of the yoke 136 in the optical-axis direction may be less than the length H21 of the second magnet 134 in the optical-axis direction. The reason why the length H21 is greater than the length H31 is to maintain the attractive force acting between the second magnet 134 and the yoke 136 in the zone in which the bobbin 110 moves in the optical-axis direction for AF operation, constant.

Accordingly, in the entire zone in which the bobbin 110 moves in the optical-axis direction, the upper end 27A (or the upper surface or the upper portion) of the yoke 136 may be positioned lower than the upper end 26A (or the upper surface or the upper portion) of the second magnet 134, and the lower end 27B (or the lower surface or the lower portion) of the yoke 136 may be positioned higher than the lower end 26B (or the upper surface or the upper portion) of the second magnet 134.

In another embodiment, when the bobbin 110 is positioned at the highest point, the upper end 27A (or the upper surface of the upper portion) of the yoke 136 may be flush with the upper end 26A (or the upper surface or the upper portion) of the second magnet 134. Furthermore, when the bobbin 110 is positioned at the lowest point, the lower end 27B (or the lower surface or the lower portion) of the yoke 136 may be flush with the lower end 26B (or the lower surface or the lower portion) of the second magnet 134.

Figure 7B:
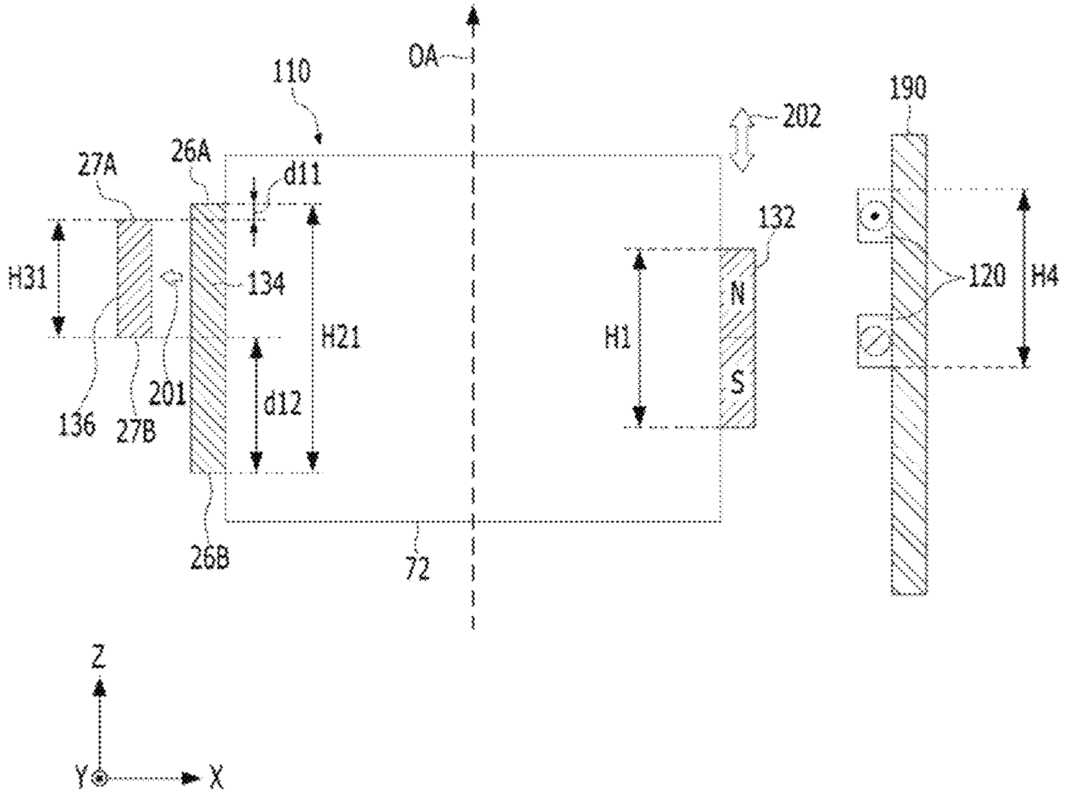
FIG. 7B illustrates the distance between the upper end of the second magnet and the upper end of the yoke when the bobbin shown in FIG. 7A is positioned at the lowest point.

FIG. 7B illustrates the distance between the upper end 26A of the second magnet 134 and the upper end 27A of the yoke 136 when the bobbin 110 is positioned at the lowest point.

Referring to FIG. 7B, when the bobbin 110 is positioned at the lowest point, the first distance d11 between the upper end 26A of the second magnet 134 and the upper end 27A of the yoke 136 in the optical-axis direction may be 0 or greater and may be two or less times the total stroke distance of the bobbin 110 in the optical-axis direction.

For example, the first distance d11 may be one to two times the total stroke distance of the bobbin 110 in the optical-axis direction. Alternatively, for example, the first distance d11 may be 0 or greater and may be 1.5 or less times the total stroke distance of the bobbin 110 in the optical-axis direction.

When the bobbin 110 is positioned at the lowest point, the second distance d12 between the lower end 26B of the second magnet 134 and the lower end 27B of the yoke 136 in the optical-axis direction may be greater than the total stroke distance or the movable distance of the bobbin 110 in the optical-axis direction.

For example, the second distance d12 may be one or more times and three or less times the total stroke distance of the bobbin 110 in the optical-axis direction. Alternatively, for example, the second distance d12 may be 1.5 to two times the total stroke distance of the bobbin 110 in the optical-axis direction.

In another embodiment, for example, the second distance d12 may be equal to the total stroke distance of the bobbin 110 in the optical-axis direction.

Figure 7C:
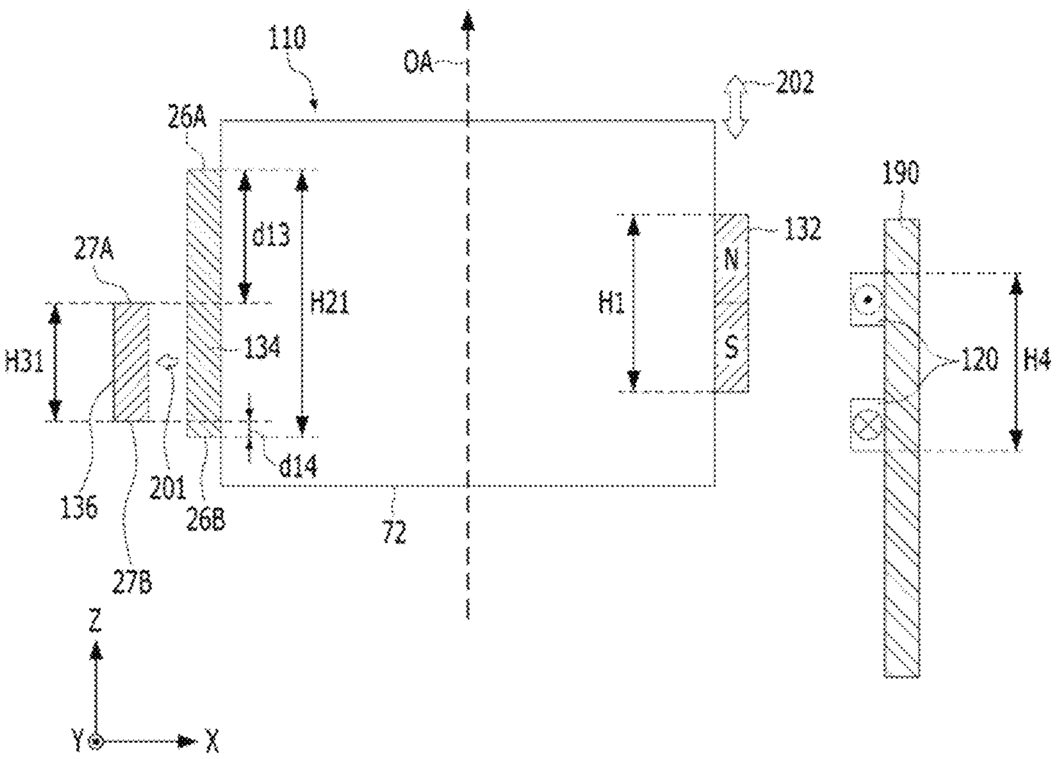
FIG. 7C illustrates the distance between the upper end of the second magnet and the upper end of the yoke when the bobbin shown in FIG. 7A is positioned at the highest point.

FIG. 7C illustrates the distance between the upper end 26A of the second magnet 134 and the upper end 27A of the yoke 136 when the bobbin 110 is positioned at the highest point.

Referring to FIG. 7C, when the bobbin 110 is positioned at the highest point, the third distance d13 between the upper end 26A of the second magnet 134 and the upper end 27A of the yoke 136 in the optical-axis direction may be greater than the stroke range or the movable distance of the bobbin 110 in the optical-axis direction.

For example, the third distance d13 may be one or more times and three or less times the total stroke distance of the bobbin 110 in the optical-axis direction. Alternatively, for example, the third distance d13 may be 1.5 to two times the total stroke distance of the bobbin 110 in the optical-axis direction.

In another embodiment, for example, the third distance d13 may be equal to the total stroke distance of the bobbin 110 in the optical-axis direction.

For example, when the bobbin 110 is positioned at the highest point, the fourth distance d14 between the lower end 26B of the second magnet 134 and the lower end 27A of the yoke 136 in the optical-axis direction may be 0 or greater and may be two or less times the total stroke distance of the bobbin 110 in the optical-axis direction.

For example, the fourth distance d14 may be one to two times the total stroke distance of the bobbin 110 in the optical-axis direction. Alternatively, for example, the fourth distance d14 may be 0 or greater and may be 1.5 or less times the total stroke distance of the bobbin 110 in the optical-axis direction.

When the second distance d12 (or the third distance d13) is less than the total stroke distance, the attractive force acting between the second magnet 134 and the yoke 136 may not be maintained constant, thereby deteriorating reliability of AF operation. When the second distance d12 (or the third distance d13) is greater than three times the total stroke distance, the size of the second magnet 134 may unnecessarily increase, thereby increasing the size of the lens moving apparatus and the total cost.

As described in FIGS. 7B and 7C, since the entirety of the yoke 132 overlaps the second magnet 134 in a direction perpendicular to the optical-axis direction even when the bobbin 110 moves in the optical-axis direction for AF operation, the pressing force applied to the first ball member 310 may be maintained constant, thereby suppressing tilting of the bobbin 110 and assuring reliability of AF operation.

Figure 8A:
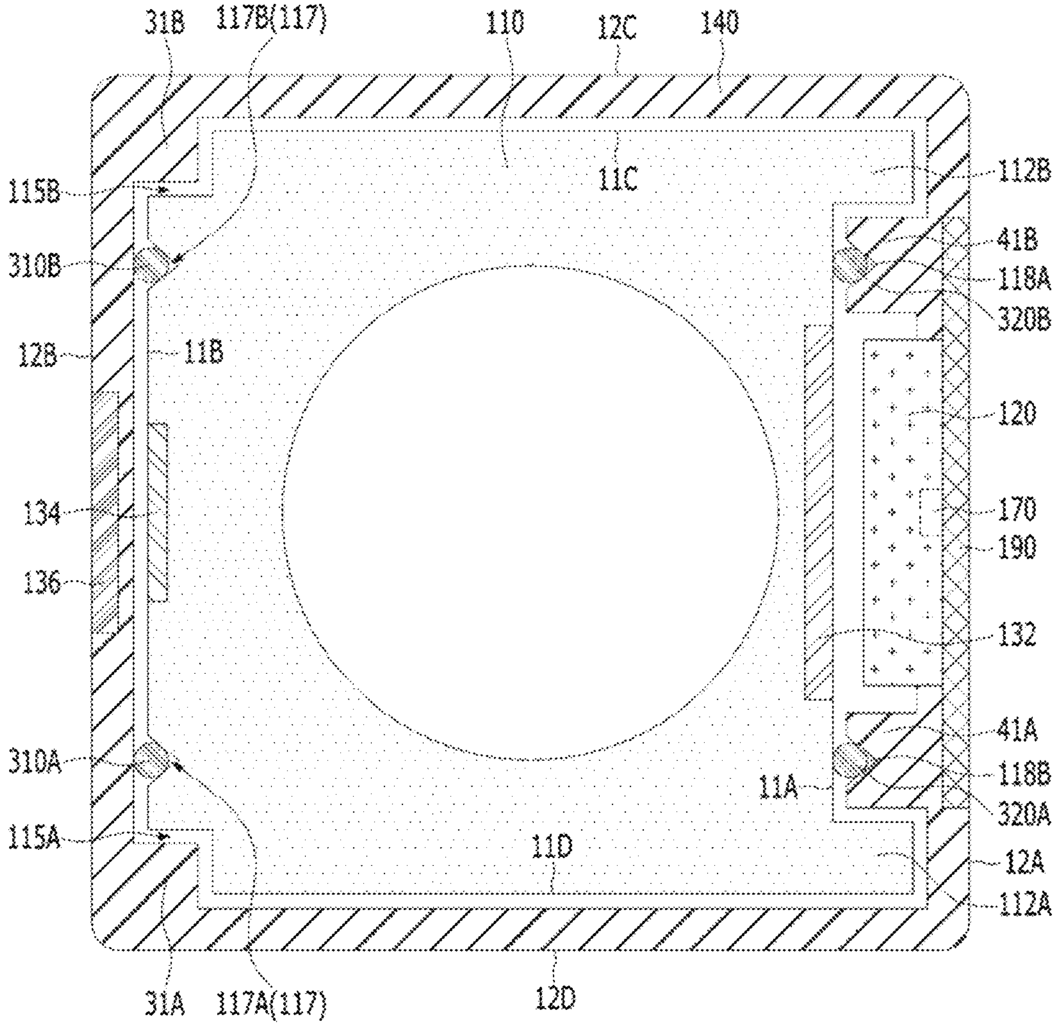
FIG. 8A is a plan view of a lens moving apparatus according to another embodiment.
Figure 8B:
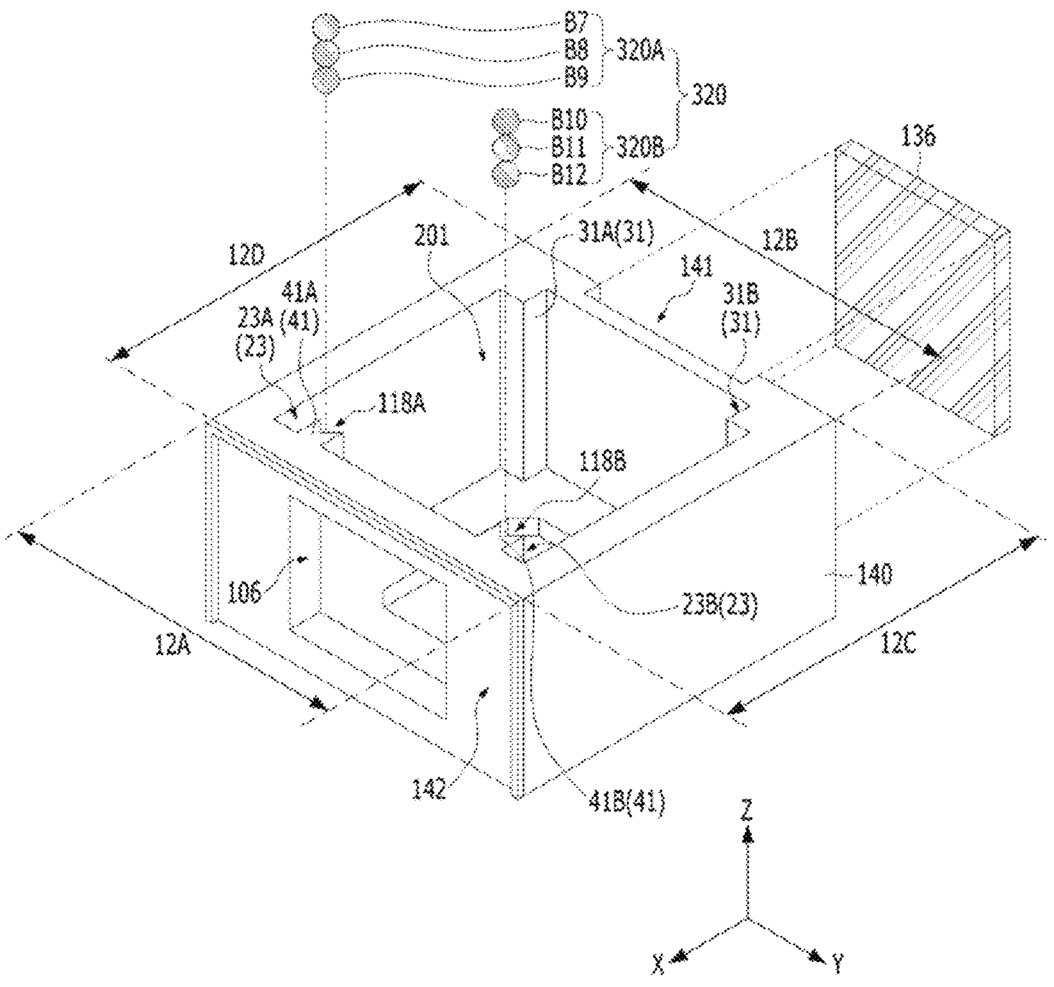
FIG. 8B is a perspective view of the housing, the ball member, and the yoke shown in FIG. 8A.

FIG. 8A is a plan view of the lens moving apparatus according to another embodiment. FIG. 8B is a perspective view of the housing 140, a ball member 320, and the yoke 136, which are shown in FIG. 8A. The embodiment shown in FIGS. 8A and 8B may be a modification of the embodiment shown in FIGS. 3 and 4A.

The lens moving apparatus according to the embodiment shown in FIGS. 8A and 8B may further include the ball member 320 in addition to the embodiment shown in FIGS. 3 and 4A.

The ball member 320 may be disposed between the first side portion 11A of the bobbin 110 and the first side portion 12A of the housing 140. For example, the housing 140 may include one or more grooves 118A and 118B in which the ball member 320 is disposed or received.

For example, the grooves 118A and 118B may be formed in the first side portion 12A of the housing. The grooves 118A and 118B may have a structure that is depressed from the inner surface of the first side portion 12A of the housing 140.

For example, the grooves 118A and 118B may be formed in the projection 41 (or the protrusion) of the housing 140. For example, the grooves 118A and 118B may be formed in the side surface of the projection 41 of the housing 140, which faces the first side portion 11A (or the first side surface or the first outer surface) of the bobbin 110.

For example, the grooves 118A and 118B may be positioned between the coil 120 and the corner of the housing 140 adjacent to the first side portion 12A of the housing 140.

For example, the housing 140 may include a first groove 118A and a second groove 118B. For example, the first groove 118A may be positioned between the coil 120 and a corner of the housing 140 adjacent to the first side portion 12A. Furthermore, the second groove 118B may be positioned between the coil 120 and the other corner of the housing 140 adjacent to the first side portion 12A.

For example, the first groove 118A may be formed in the first projection 41A of the housing 140, and the second groove 118B may be formed in the second projection 41B of the housing 140.

For example, the grooves 118A and 118B may have openings, which are formed in the upper surface of the housing 140. For example, the lower portions of the grooves 118A and 118B may not be open but may be closed at the lower surface of the housing 140. The lower portions of the grooves 118A and 118B may have a height difference relative to the lower surface of the housing 140 in the optical-axis direction. For example, the lower portions of the grooves 118A and 118B may be positioned higher than the lower surface of the housing 140.

Although each of the grooves 118A and 118B may have, for example, a triangular shape when viewed from above, the disclosure is not limited thereto. Each of the grooves 118A and 118B may have a polygonal shape (for example, a quadrilateral shape, a pentagonal shape or the like). For example, each of the grooves 118A and 118B may be a "V"-shaped or "U"-shaped groove.

In another embodiment, the groove may not be formed in the housing 140 but be formed in the first side portion 11A (the first side surface or the first outer surface) of the bobbin 110 to allow the ball member 320 to be disposed or received therein.

The ball member 320 may be disposed between a corresponding one of the grooves 118A and 118B in the housing 140 and the first side portion 11A of the bobbin 110. The ball member 320 may be in contact with a corresponding one of the grooves 118A and 118B in the housing 140 and the first side portion 11A of the bobbin 110.

At least a portion of the ball member 320 may be disposed in and in contact with a corresponding one of the grooves 118A and 118B in the housing 140. There may be one or more contact points between at least a portion of the ball member 320 and a corresponding one of the grooves 118A and 118B in the housing 140.

The ball member 320 may include at least one ball member. For example, the ball member 320 may include two or more ball members 320A and 320B. For example, the ball member 320 may include a third ball member 320A and a fourth ball member 320B.

The third ball member 320A may be disposed or received in the first groove 118A in the housing 140, and the fourth ball member 320B may be disposed or received in the second groove 118B in the housing 140.

The description of the shape and the material of the ball member 320 shown in FIG. 4A may be applied to the ball member 320 shown in FIGS. 8A and 8B with or without modification.

In comparison with the embodiment shown in FIG. 4A, the embodiment shown in FIGS. 8A and 8B is able to further reduce friction between the bobbin 110 and the housing 140 by means of the ball member 320, to reduce driving force required for normal AF operation, and to reduce power consumption.

Figure 9A:
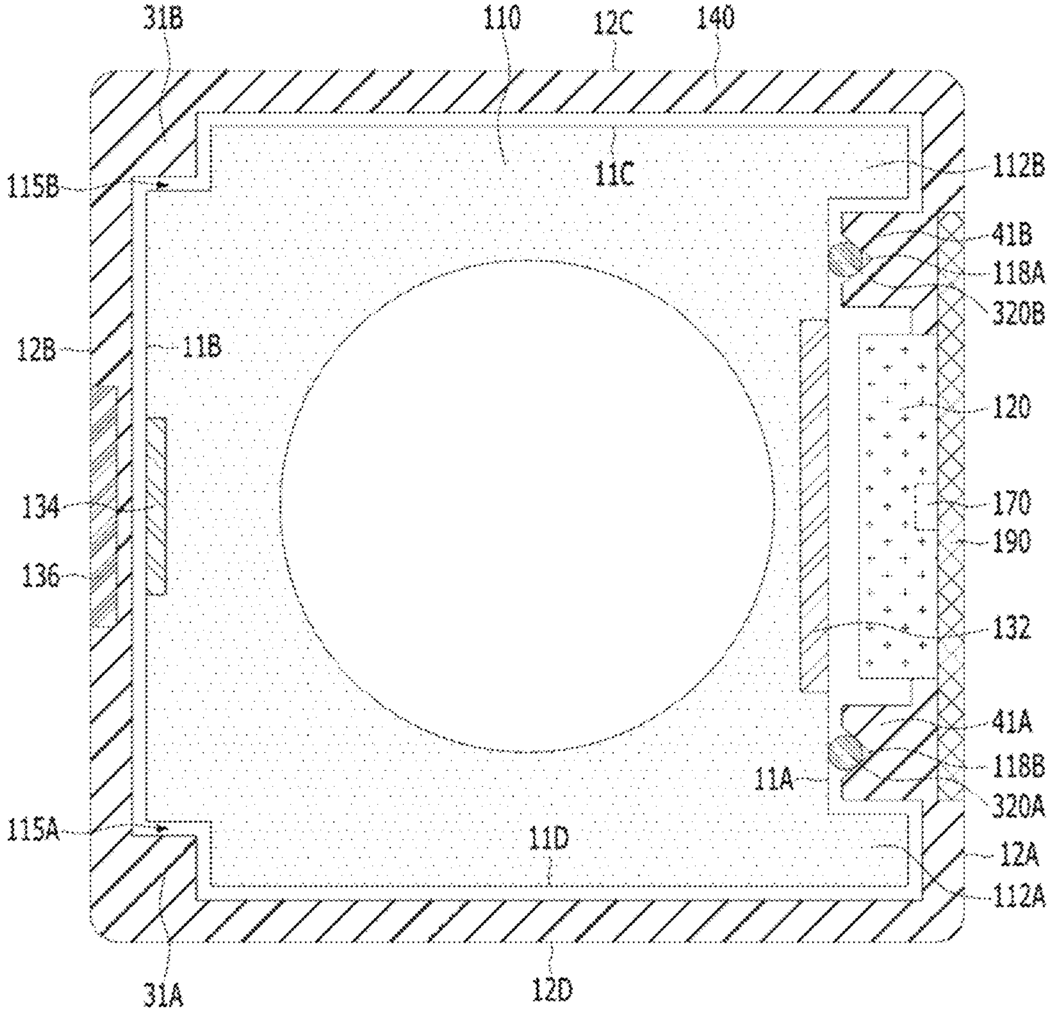
FIG. 9A is a plan view of a lens moving apparatus according to a further embodiment.
Figure 9B:
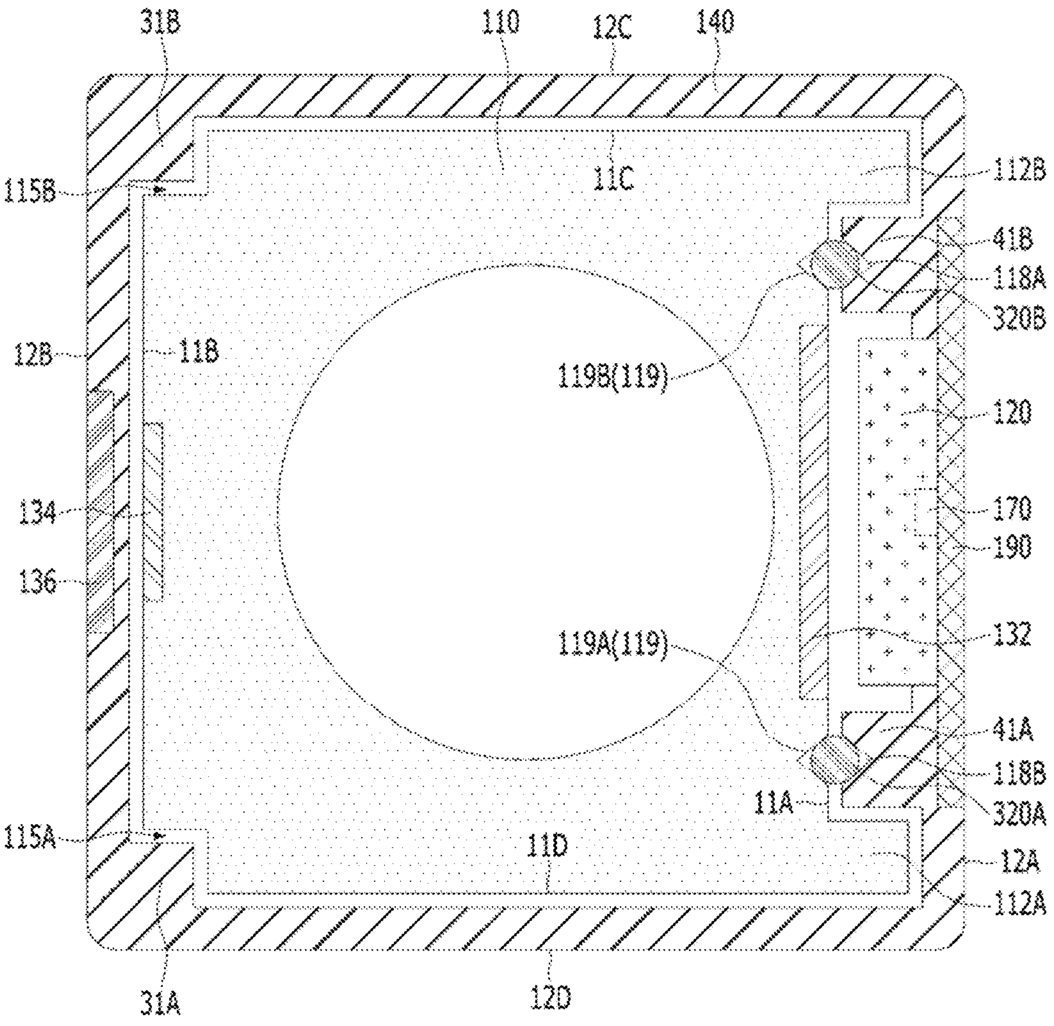
FIG. 9B illustrates a modification of the embodiment shown in FIG. 9A.

In a modification of the embodiment shown in FIG. 8A, the housing 140 may include the groove 116 shown in FIG. 4B, and the bobbin 110 may include the groove 119 shown in FIG. 9B.

Figure 10:
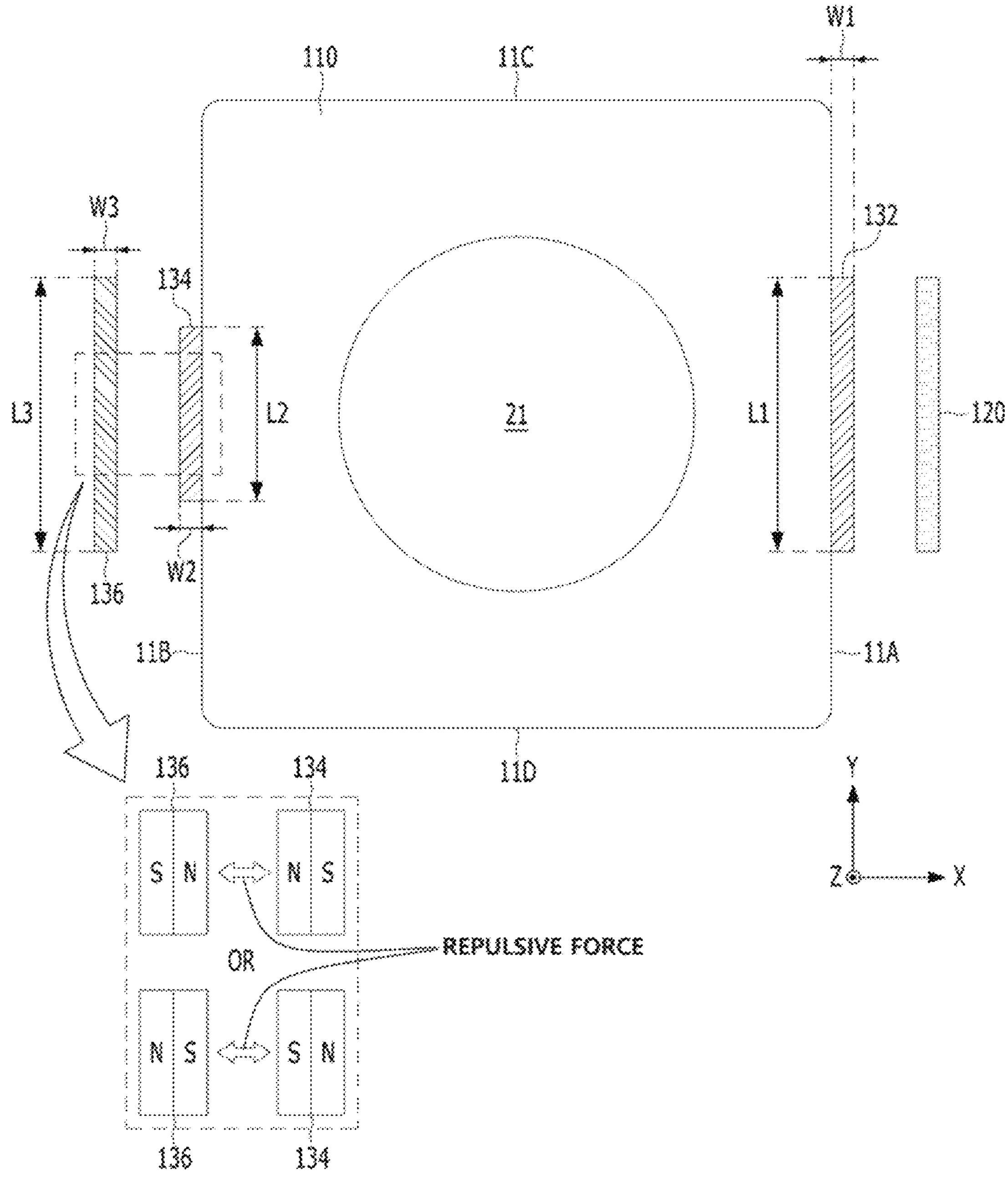
FIG. 10 is a plan view of the first magnet, the coil, the second magnet, and the yoke of the lens moving apparatus shown in FIG. 9A.

FIG. 9A is a plan view of the lens moving apparatus according to a further embodiment. FIG. 10 is a plan view of the first magnet 132, the coil 120, the second magnet 134, and the yoke 136 of the lens moving apparatus shown in FIG. 9.

The lens moving apparatus according to the embodiment shown in FIGS. 9A and 10 may be a modification of the lens moving apparatus shown in FIGS. 4A and 8A. In the lens moving apparatus shown in FIGS. 9A and 10, the ball member 310 shown in FIGS. 4A and 8A may be omitted, the ball member 320 may be disposed between the first side portion 11A of the bobbin 110 and the first side portion 12A of the housing 140, and repulsive force may act between the second magnet 134 and the yoke 136.

For example, by virtue of the repulsive force acting between the second magnet 134 and the yoke 136, the bobbin 110 (and/or the housing 140) may press the ball member 320, and thus the ball member 320 may stably support the bobbin 110.

The yoke 136 may push the second magnet 134 toward the ball member 320. Furthermore, the yoke 136 may push the bobbin 110 toward the ball member 320. Therefore, the bobbin 110 may be in close contact with the ball member 320.

For example, the repulsive force acting between the yoke 136 and the second magnet 134 may be 5[gf] or less. Alternatively, the repulsive force acting between the yoke 136 and the second magnet 134 may be 1[gf] to 3[gf]. Alternatively, the repulsive force acting between the yoke 136 and the second magnet 134 may be 0.1[gf] to 2[gf].

The yoke 136 may overlap the first magnet 132 in a direction parallel to a straight line, which is perpendicular to the optical axis OA and extends through the center of the bobbin 110. For example, when the first magnet 132 is a bipolar magnetized magnet, the yoke 136 may overlap the first magnet 132 in a direction parallel to a straight line, which is perpendicular to the optical axis OA and extends through the center of the bobbin.

With the exception of the description of the polarities of the second magnet 134 and the yoke 136 to which attractive force is applied, the description of the embodiment shown in FIGS. 5A to 7C may be applied to the embodiment shown in FIGS. 9A to 10 with or without modification.

In FIGS. 9A and 10, the yoke 136 may be a "magnet" (for example, a "third magnet"), and the facing surfaces of the second magnet 134 and the yoke 136 may have the same polarity in order to cause repulsive force to act between the yoke 136 and the second magnet 134 shown in FIG. 10.

As illustrated in FIG. 10, for example, the first surface of the second magnet 134 may face the first surface of the yoke 136, the first surface of the second magnet 134 may have N polarity, and the first surface of the yoke 136 may have N polarity. Alternatively, for example, the first surface of the second magnet 134 may have S polarity, and the first surface of the yoke 136 may have S polarity.

For example, the intensity of the magnetic force of the yoke 136, which is a magnet, may be lower than the intensity of the magnetic force of the first magnet 132. Alternatively, in another embodiment, the intensity of the magnetic force of the yoke 136, which is a magnet, may be equal to or higher than the intensity of the magnetic force of the first magnet 132.

For example, the intensity of the magnetic force of the yoke 136, which is a magnet, may be higher than the intensity of the magnetic force of the second magnet 134. Alternatively, in another embodiment, for example, the intensity of the magnetic force of the yoke 136, which is a magnet, may be equal to the intensity of the magnetic force of the second magnet 134. In a further embodiment, for example, the intensity of the magnetic force of the yoke 136, which is a magnet, may be higher than the intensity of the magnetic force of the second magnet 134.

The yoke 136, which is a magnet, and the first magnet 132 may be made of different materials or components. In another embodiment, the yoke 136 and the first magnet 132 may be made of the same material or component.

The second magnet 132 and the yoke 136 may be made of the same material or component. In another embodiment, the second magnet 132 and the yoke 136 may be made of different materials or components.

The description of the embodiment shown in FIGS. 4A to 7C may be applied to the relationship between the intensity of the magnetic force of the first magnet 132 and the intensity of the magnetic force of the second magnet 134 of the embodiment shown in FIG. 10 with or without modification.

In the embodiment shown in FIGS. 9A and 10, because repulsive force acts between the second magnet 134, which is independent of the first magnet 132, and the yoke 136, it is possible to easily and freely design or set the frictional force between the bobbin 110/the housing 140 and the ball member 310.

Accordingly, in the embodiment shown in FIGS. 9A and 10, it is possible to easily and freely design or set the frictional force between the bobbin 110/the housing 140 and the ball member 310, regardless of assurance of the electromagnetic force required for AF operation. Furthermore, since the size of the yoke 136 is not restricted by the first magnet 132, it is possible to freely change the size of the yoke 136 and thus to freely change the design freedom of the lens moving apparatus 100.

With improvement in function of cellular phones and increase in the number of pixels, the size of an image sensor and a lens aperture are increasing. Particularly, there is trend to increase a lens aperture with the aim of realization of high number of pixels and improvement in image quality.

Because the weight of the AF moving unit increases when the lens aperture increases, the AF moving unit must be stably supported and tilting of the AF moving unit relative to the optical axis must be suppressed or reduced in order to assure stable and reliable AF operation. In a ball-type lens moving apparatus including a ball member for supporting a bobbin, there is a need to easily adjust or set the frictional force between the bobbin and/or a housing and the ball member according to the weight of the lens.

FIG. 9B illustrates a modification of the embodiment shown in FIG. 9A.

Referring to FIG. 9B, the bobbin 110 may include the groove 119, which corresponds to or faces a corresponding one of the grooves 118A and 118B in the housing 140.

For example, the groove 119 may be formed in the first side portion 11A of the bobbin 110. For example, the groove 119 may be formed in the side surface or the outer surface of the first side portion 11A of the bobbin 110. The description of the groove 117 in the bobbin 110 may be applied to the groove 119 in the bobbin 110 with or without modification.

For example, the groove 119 may include a first groove 119A, which corresponds to or faces the first groove 118A in the housing 140, and a second groove 119B, which corresponds to or faces the second groove 118B in the housing 140.

At least a portion of the ball members 320A and 320B may be disposed in and in contact with the groove 119 in the bobbin 110. For example, there may be one contact point between at least a portion of the ball member 320 and the groove 119 in the bobbin 110.

At least another portion of the ball members 320A and 320B may be disposed in and in contact with the grooves 118A and 118B in the housing 140. For example, there may be one or more contact points between at least another portion of the ball members 320A and 320B and the grooves 118A and 118B in the housing 140.

Figure 13:
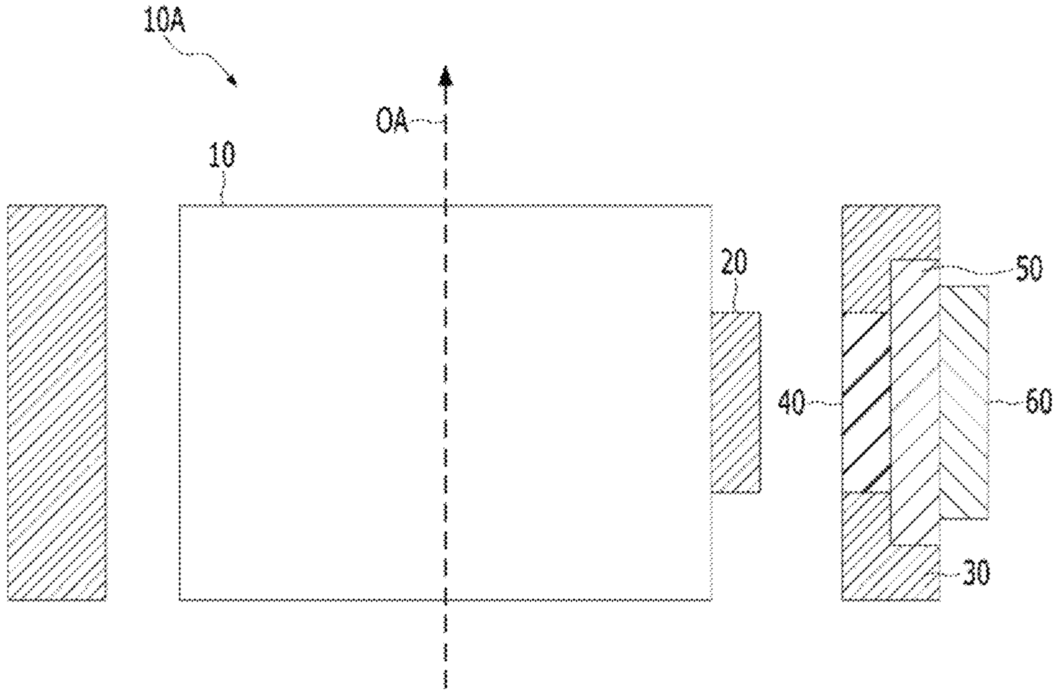
FIG. 13 is a schematic cross-sectional view of a ball-type lens moving apparatus according to a comparative embodiment.

FIG. 13 is a schematic cross-sectional view of a ball-type lens moving apparatus 10A according to a comparative embodiment.

Referring to FIG. 13, in the comparative embodiment 10A, a drive magnet 20 is disposed on or coupled to a first side portion of the bobbin 10, and a coil 40 may be disposed on a first side portion of a housing 30 so as to face the drive magnet 20. A circuit board 50 may be disposed on the first side portion of the housing 30, the coil 40 may be disposed on the front surface of the circuit board 50, and the yoke 60 may be disposed on the rear surface of the circuit board 50. In the comparative embodiment 10A, a ball member (not shown) may be disposed between the first side portion of the bobbin 10 and the first side portion of the housing 140.

Because the drive magnet 20 must serve to move the bobbin 10 in the optical-axis direction by interaction with the coil 40, there is a need to design a size and magnetic force capable of assuring electromagnetic force required for AF operation.

The frictional force between the bobbin 10 and/or the housing 30 and the ball member may be determined depending on the attractive force acting between the drive magnet 20 and the yoke 60. For example, when attractive force increases, the frictional force between the bobbin 10 and/or the housing 30 and the ball member may increase. Meanwhile, when attractive force decreases, the frictional force between the bobbin 10 and/or the housing 30 and the ball member may decrease.

Because the size and magnetic force of the drive magnet 20 for AF operation is previously set in the comparative embodiment, there may be a restriction on the attractive force acting between the drive magnet 20 and the yoke 60 depending on the design of the drive magnet 20. Furthermore, there may also be a restriction on the size of the yoke 60 depending on the design of the drive magnet 20.

In other words, it is impossible to freely design or set the attractive force acting between the drive magnet 20 and the yoke 60 to adjust or control the frictional force between the bobbin 10 and/or the housing 30 and the ball member.

In contrast, in the present embodiment, since attractive force acts between the second magnet 134, which is independent of the first magnet 132, and the yoke 136, it is possible to easily and freely design or set the frictional force between the bobbin 110 and/or the housing 140 and the ball member 310.

Accordingly, in the present embodiment, there is an effect of being capable of easily and freely designing or setting the frictional force between the bobbin 110 and/or the housing 140 and the ball member 310, regardless of assurance of the electromagnetic force required for AF operation.

Furthermore, because the size of the yoke 136 is not restricted by the first magnet 132, it is possible to freely change the size of the yoke 136 and thus to improve design freedom of the lens moving apparatus 100.

Figure 11A:
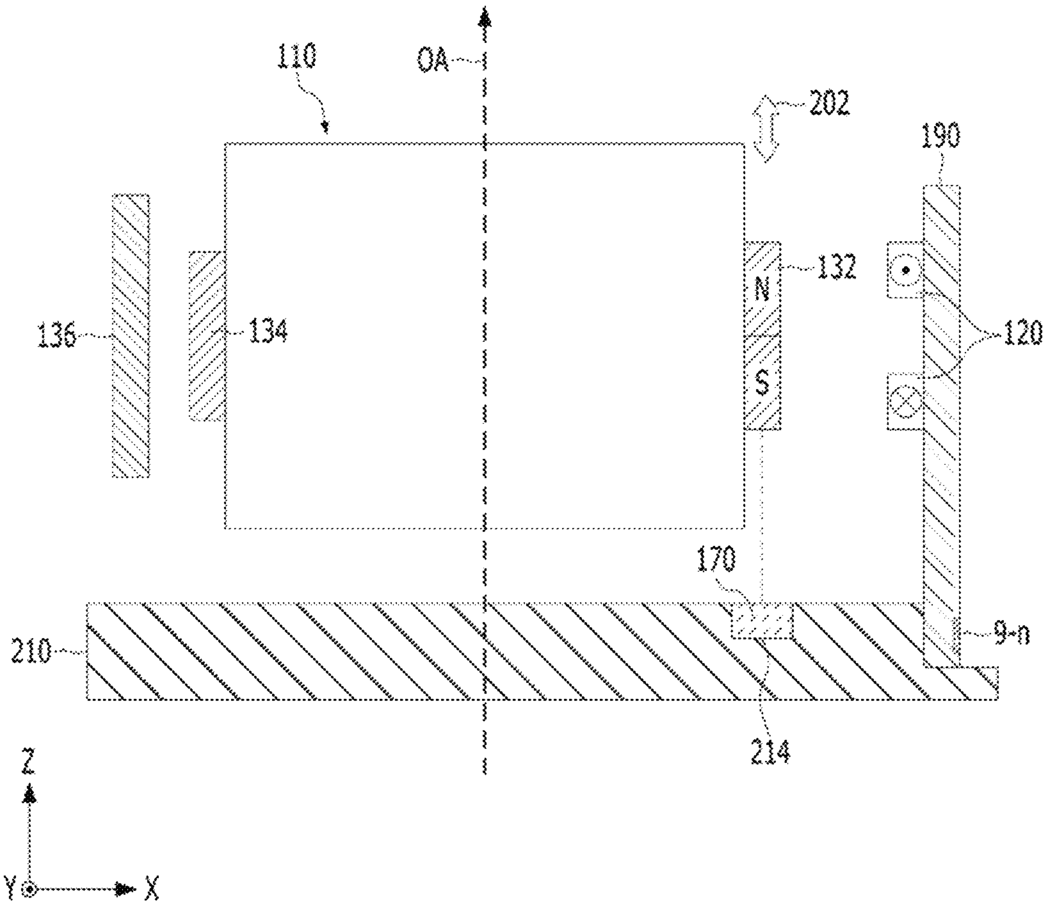
FIG. 11A illustrates disposition of the position sensor according to an embodiment.

FIG. 11A illustrates the position sensor 170 and the base 210 according to the embodiment.

Referring to FIG. 11A, the base 210 may be disposed below the housing 140*d* (or the bobbin 110). The base 210 may have a bore 21A corresponding to the bore 21 in the bobbin 110 and/or the bore 201 in the housing 140, and may have a shape that coincides with or corresponds to the cover member 300, for example, a quadrilateral shape.

A step 211 may be formed at the lower end of the outer surface of the base 210, and adhesive may be applied to the step 211 of the base 210 in order to adhesively secure the cover member 300. Here, the step 211 of the base 210 may guide the lower end of the side plate 302 of the cover member 300, which is coupled to the upper side of the step 211, and may face the lower end of the side plate 302 of the cover member 300. An adhesive member or a sealing member may be disposed or applied between the lower end of the side plate 302 of the base 210 and the step 211 of the base 210.

For example, the base 210 may be coupled to the housing 140 by means of an adhesive member such as epoxy or silicone.

The base 210 may have a groove 215, which is formed in the outer surface thereof corresponding to the circuit board 190 so as to allow at least a portion (for example, the lower end) of the circuit board 190 to be disposed, inserted, or seated therein.

For example, the groove 215 may be formed in the first outer surface of the base 210 corresponding to the first side portion 12A of the housing 140. For example, the terminals 9-1 to **9-*n* of the circuit board 190 may be disposed in the groove 215 in the base 210. In another embodiment, the base 210 may not have the groove 215**.

The base 210 may have a seating groove 214 in which the position sensor 170 is disposed, inserted or seated. For example, the seating groove 214 may have a structure that is depressed from the upper surface of the base 210.

The position sensor 170 may be disposed on the base 210. For example, the position sensor 170 may be disposed on the upper surface (or in the groove 214) of the base 210. For example, the description of the position sensor 170 may be applied to the Hall sensor shown in FIG. 28, to be described later, with or without modification.

For example, the position sensor 170 may be disposed so as to correspond to the first magnet 132.

For example, the position sensor 170 may be disposed at a position corresponding to the first magnet 132 in the optical-axis direction. For example, the position sensor 170 may be disposed on the base 210 to detect the magnetic field of the first magnet 132.

For example, at least a portion of the position sensor 170 may overlap the first magnet 132 in the optical-axis direction. For example, the position sensor 170 may not overlap the second magnet 134 and the yoke 136 in the optical-axis direction. Furthermore, for example, the position sensor 170 may not overlap the first magnet 132 in a direction perpendicular to the optical-axis direction. Furthermore, for example, the position sensor 170 may not overlap the second magnet 134 and the yoke 136 in a direction perpendicular to the optical-axis direction.

In another embodiment, the position sensor 170 may not overlap the first magnet 132 in the optical-axis direction.

For example, the position sensor 170 may be disposed below the first magnet 132. Furthermore, for example, the position sensor 170 may be disposed lower than the coil 120. Furthermore, for example, the position sensor 170 may be positioned lower than the bobbin 110. For example, the position sensor 170 may be positioned lower than the lower end, the lower portion, or the lower surface of the bobbin 110.

The position sensor 170 may detect the intensity of the magnetic field of the first magnet 132 mounted on the bobbin 110 during movement of the bobbin 110, and may output a signal (for example, an output signal) corresponding to the result of the detection. For example, a controller of a camera device 200 or a controller 780 of a terminal 200A may sense or detect the displacement of the bobbin 110 in the optical-axis direction using the output signal from the position sensor 170.

The position sensor 170 may include a Hall sensor, and may be embodied as any sensor, as long as the sensor is able to detect a magnetic field.

The position sensor 170 may be embodied as a Hall sensor alone, or may be embodied as a driver including a Hall sensor. The driver-type position sensor may include a temperature-sensing element.

For example, when the position sensor 170 is embodied as a Hall sensor alone, the position sensor 170 may include two input terminals, to which a drive signal or power is supplied, and two output terminals, through which a sensed voltage (or an output voltage) is output.

For example, when the position sensor 170 is embodied as a Hall sensor alone, the circuit board 190 may include first and second terminals (for example, 9-1 and 9-2), which are conductively connected to the two input terminals of the position sensor 170 so as to provide the two input terminals with power or a drive signal. Here, the circuit board 190 may include third and fourth terminals (for example, 9-3 and 9-4), which are conductively connected to the two output terminals of the position sensor 170 so as to receive the output signal of the position sensor 170 from the two output terminals. Furthermore, the circuit board 190 may include fifth and sixth terminals (for example, 9-5 and 9-6), which are conductively connected to the coil 120 so as to supply the drive signal to the coil 120.

Alternatively, for example, when the position sensor 170 is a driver-type position sensor including a Hall sensor, the position sensor 170 may include first to fourth terminals for transmitting and receiving data to and from an external device through data communication using a protocol such as I2C communication and fifth and sixth terminals for supplying a drive signal to the coil 120. Here, the first and second terminals of the position sensor 170 may be terminals for receiving a power signal, and the third and fourth terminals of the position sensor 170 may be terminals for transmitting and receiving a clock signal and a data signal.

When the position sensor 170 is a driver-type position sensor including a Hall sensor, the circuit board 190 may include first to fourth terminals (for example, 9-1 to 9-4) conductively connected to the first to fourth terminals of the position sensor 170. The fifth and sixth terminals of the position sensor 170 may be conductively connected to the coil 120 via the circuit board 190 such that a drive signal is supplied to the coil 120 via the fifth and sixth terminals of the position sensor 170.

Figure 11B:
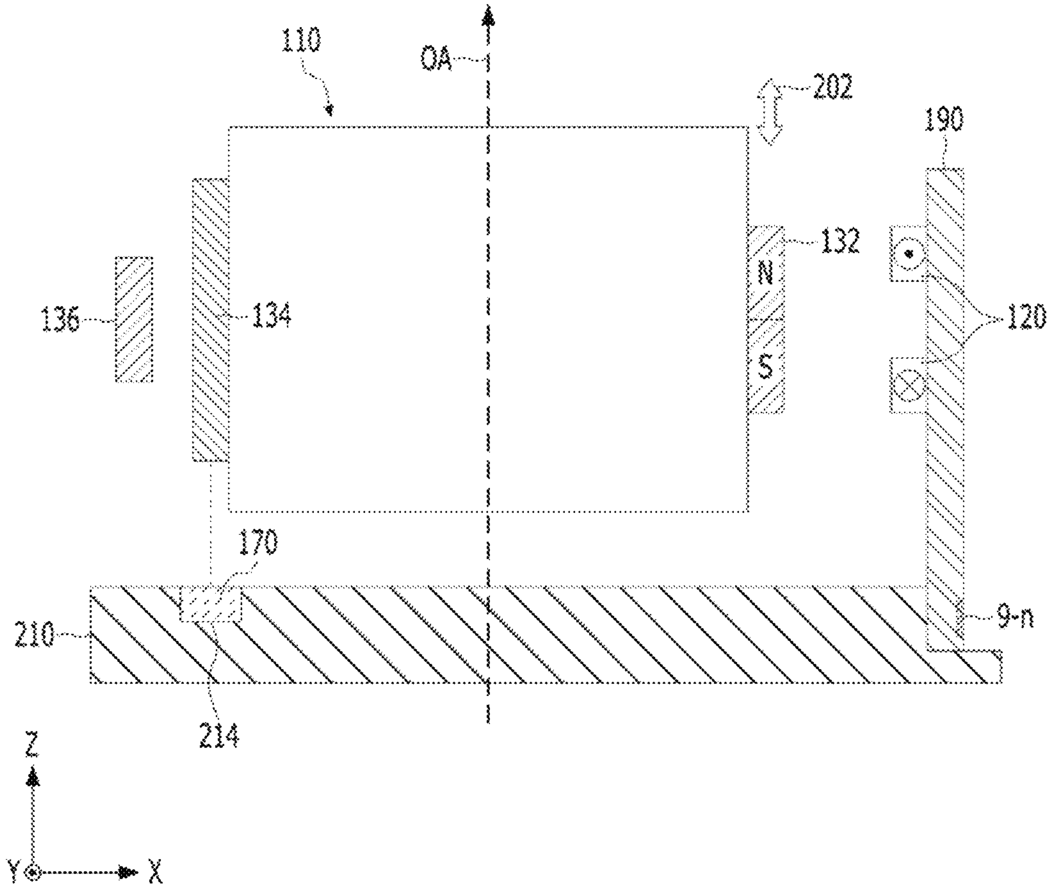
FIG. 11B illustrates disposition of the position sensor according to another embodiment.

FIG. 11A illustrates another disposition of the position sensor 170. FIG. 11B illustrates a modification of the embodiment shown in FIG. 11A.

Referring to FIG. 11B, for example, the position sensor 170 may be disposed so as to correspond to the second magnet 134. For example, the position sensor 170 may be disposed at a position corresponding to the second magnet 134 in the optical-axis direction. For example, the position sensor 170 may be disposed on the base 210 so as to detect the magnetic field of the second magnet 134.

For example, at least a portion of the position sensor 170 may be overlap the second magnet 134 in the optical-axis direction. For example, the position sensor 170 may not overlap the first magnet 132 and the yoke 136 in the optical-axis direction. In another embodiment, the position sensor 170 may not overlap the second magnet 134 in the optical-axis direction.

For example, the position sensor 170 may be disposed below the second magnet 134. For example, the position sensor 170 may be disposed lower than the coil 120.

The lens moving apparatus 100 may include a conductive member conductively connected to the position sensor 170. The conductive member may include at least one terminal conductively connected to the position sensor 170.

Figure 12A:
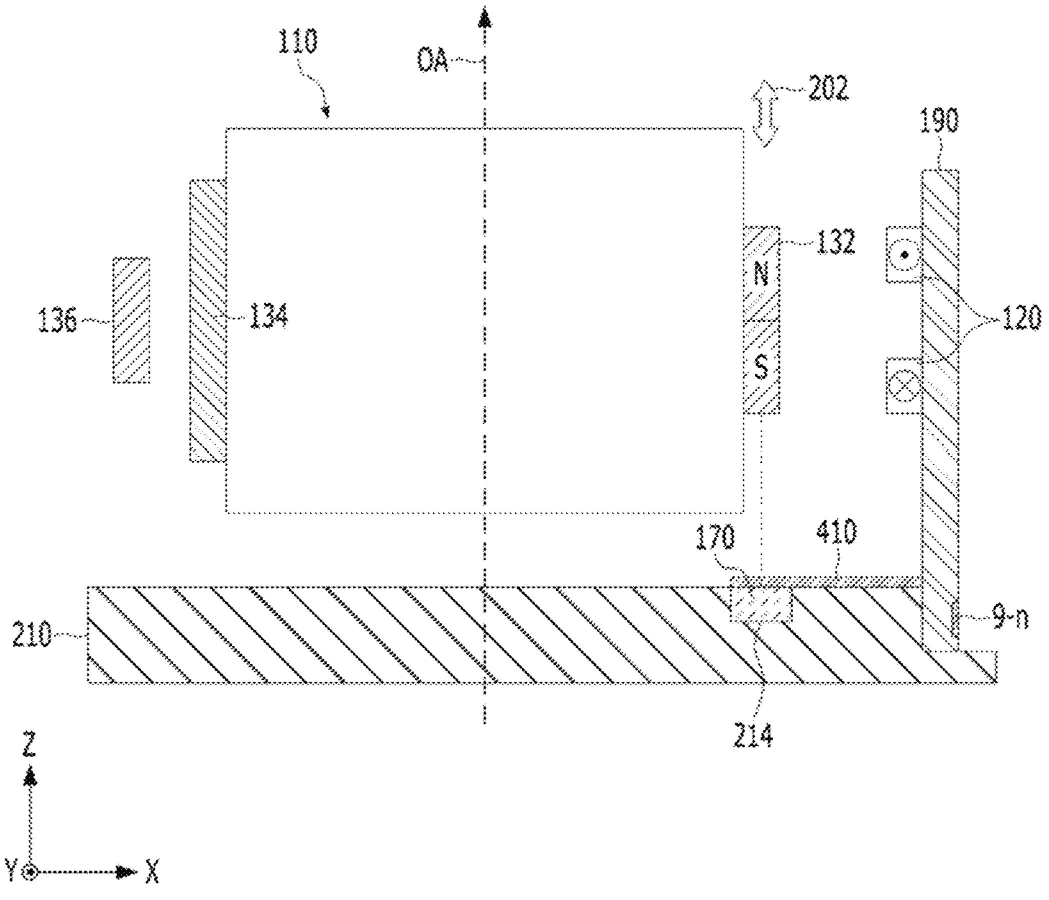
FIG. 12A illustrates an embodiment of conductive connection between the position sensor and the conductive member.

FIG. 12A illustrates an embodiment of conductive connection between the position sensor 170 and the conductive member 410.

Referring to FIG. 12A, the conductive member 410 may be disposed on the base 210, and may be conductively connected to the position sensor 170. The conductive member 410 may be made of a conductive material, for example, metal.

For example, the conductive member 410 may be conductively connected to the circuit board 190. For example, the conductive member 410 may include a plurality of conductive portions configured to conductively connect the position sensor 170 to the circuit board 190.

For example, the conductive member 410 may be a terminal, a wire, or a circuit pattern, which is formed on the surface of the base 210 through surface electrode technology or the like.

Alternatively, for example, the conductive member 410 may be an insert terminal, which is formed on the base 210 through insert injection molding. For example, the conductive member 410 may include a plurality of terminals configured to conductively connect the position sensor 170 to the circuit board 190.

Although the conductive member 410 may be formed, for example, on the base 210, the disclosure is not limited thereto.

FIG. 12A illustrates the embodiment shown in FIG. 11A, and the description of the conductive member 410 shown in FIG. 12A may be applied to the embodiment shown in FIG. 11B with or without modification.

Figure 12B:
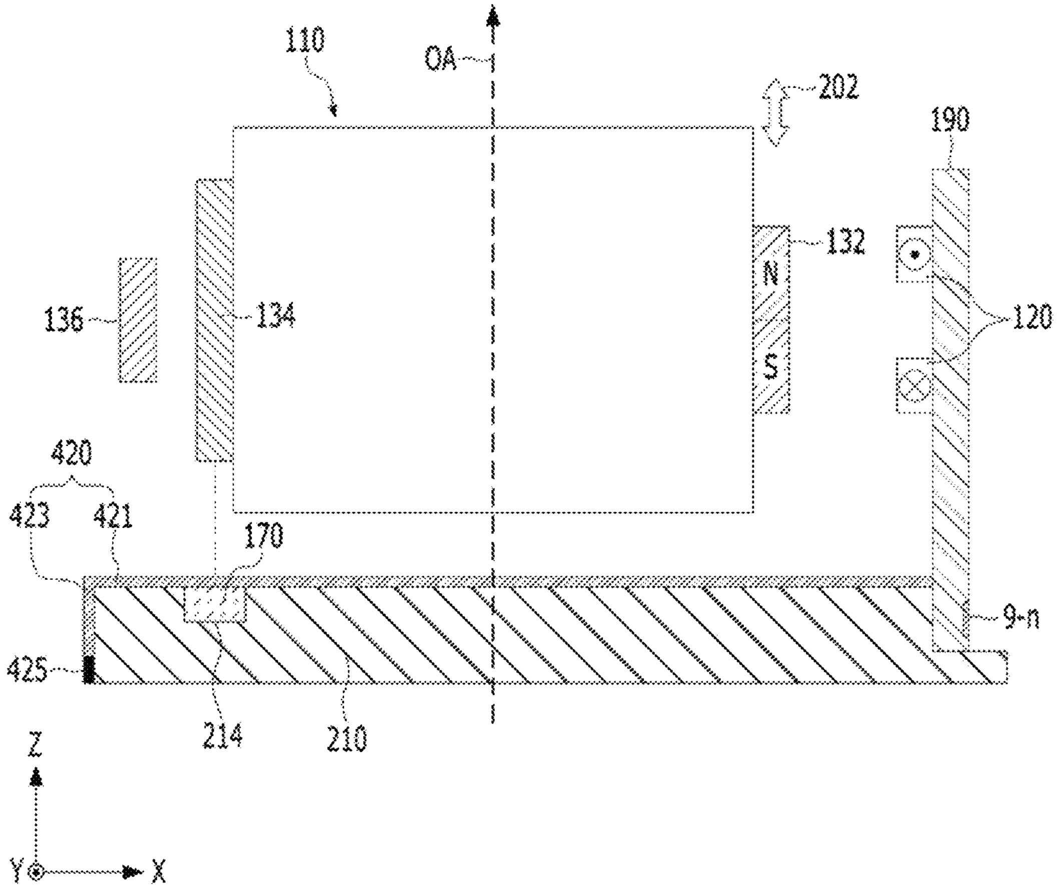
FIG. 12B illustrates another embodiment of conductive connection between the position sensor and the conductive member.

FIG. 12B illustrates another embodiment of conductive connection between the position sensor 170 and the conductive member 420.

Referring to FIG. 12B, the conductive member 420 may include a circuit board or a circuit member including at least one terminal conductively connected to the position sensor 170. For example, the conductive member 420 may be a printed circuit board or a flexible printed circuit board.

The conductive member 420 may be disposed on the base 210. For example, the conductive member 420 may be disposed on the upper surface of the base 210. The position sensor 170 may be disposed below the conductive member 420, and may be directly coupled to the conductive member 420.

For example, the position sensor 170 may be coupled to the lower surface of the conductive member 420 (for example, a circuit board) so as to be conductively connected to the conductive member 420 using solder or a conductive adhesive. For example, the position sensor 170 may be disposed between the conductive member 420 and the base 210.

For example, the conductive member 420 may include a terminal portion 423, which is bent toward the outer surface of the base 210 or extends toward the outer surface. The terminal portion 423 may include at least one terminal 425 conductively connected to the position sensor 170.

For example, the conductive member 420 may include a body 421, which is disposed on the upper surface of the base 210 and on which the position sensor 170 is disposed, and the terminal portion 423, which is bent toward the outer surface of the base 210 at the end of the body 421 or extends toward the outer surface from the body 421. For example, the position sensor 170 may be disposed on the lower surface of the body 421, and a plurality of terminals 425 may be formed on the terminal portion 423.

For example, although the circuit board 190 may be separated from or spaced apart from the circuit board 420, the disclosure is not limited thereto. In another embodiment, the circuit board 190 and the circuit board 420 may be integrally formed as a single board.

In another embodiment, the position sensor 170 may be disposed on the conductive member 420. In another embodiment, for example, the position sensor 170 may be coupled to the upper surface of the conductive member 420 (for example, the circuit board) and may thus be conductively connected to the conductive member 420 using solder or a conductive adhesive.

FIG. 12B illustrates the embodiment shown in FIG. 11B, and the description of the conductive member 420 shown in FIG. 12B may be applied to the embodiment shown in FIG. 11A.

Although the first magnet 132, the second magnet 134, and the yoke 136 according to the embodiment shown in FIG. 6A are illustrated in FIGS. 11A, 11B, 12A, and 12B, the disclosure is not limited thereto. The description of FIGS. 11A, 11B, 12A, and 12B may be applied to other embodiments shown in FIGS. 1 to 10 with or without modification.

Although the position sensor 170 is disposed on the base 210 in the embodiments shown in FIGS. 1 to 12B, the base 210 may be omitted, and the position sensor 170 may be disposed on the bottom surface of the housing 140 so as to correspond to, face or overlap the first magnet 132 or the second magnet 134 in the optical-axis direction in another embodiment.

The lens moving apparatus according to the embodiment may be applied to various fields, for example, those of camera modules, cameras, camera devices, or optical devices.

For example, the lens moving apparatus 100 according to the embodiment may be included in an optical instrument, which is designed to form the image of an object in a space using reflection, refraction, absorption, interference, diffraction or the like, which are characteristics of light, to extend eyesight, to record an image obtained through a lens or to reproduce the image, to perform optical measurement, or to propagate or transmit an image. For example, although the optical instrument according to the embodiment may be a mobile phone, cellular phone, smart-phone, portable smart instrument, digital camera, laptop computer, digital broadcasting terminal, PDA (Personal Digital Assistant), PMP (Portable Multimedia Player), navigation device, or the like, the disclosure is not limited thereto. Furthermore, any device capable of taking images or photographs is possible.

Figure 14:
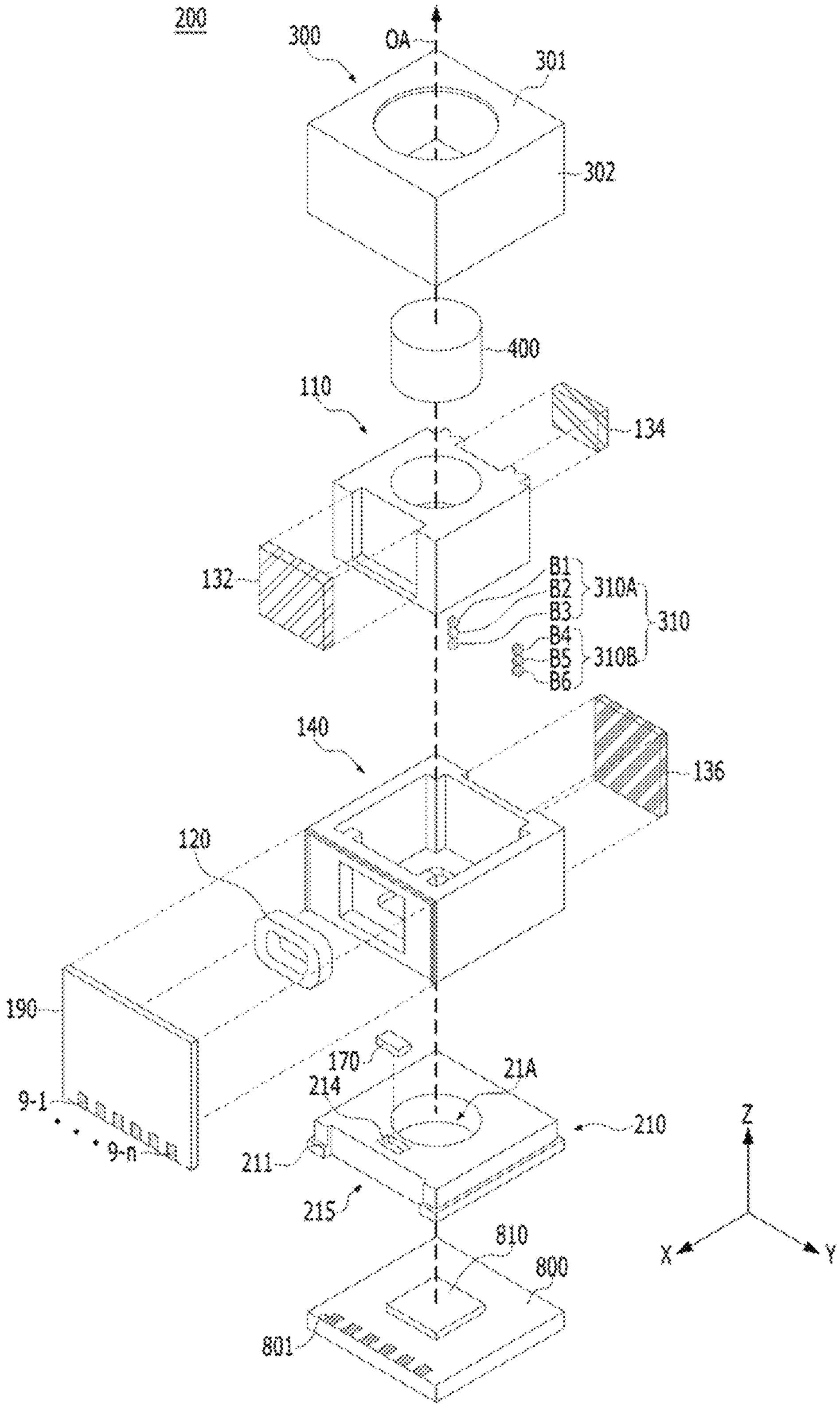
FIG. 14 is an exploded perspective view of a camera module according to an embodiment.

FIG. 14 is an exploded perspective view illustrating a camera device 200 according to an embodiment.

Referring to FIG. 14, the camera device 200 may include a lens module 400, the lens moving apparatus 100, a circuit board 800, and an image sensor 810.

The camera device 200 may further include a filter (not shown) positioned between the lens module 400 and the image sensor 810. Although the filter may be disposed or seated on, for example, the base 210, the disclosure is not limited thereto. For example, the lower surface of the base 210 may be provided with a seating groove in which the filter is seated or disposed. The base 210 may be coupled, attached, or fixed to the upper surface of the circuit board 800 via an adhesive member (not shown).

The lens module 400 may include a lens and/or a lens barrel, and may be mounted in the bobbin 110 of the lens moving apparatus 100.

For example, the lens module 400 may include one or more lenses and a lens barrel configured to accommodate the lenses. However, one component of the lens module is not limited to the lens barrel, and any component may be used, as long as it has a holder structure capable of supporting one or more lenses. The lens module may be coupled to the lens moving apparatus 100 and may be moved therewith.

For example, the lens module 400 may be coupled to the lens moving apparatus 100 through threaded engagement. For example, the lens module 400 may be coupled to the lens moving apparatus 100 by means of an adhesive (not shown). The light that has passed through the lens module 400 may be radiated to the image sensor 810 through the filter.

The filter may serve to prevent light within a specific frequency band that passes through the lens barrel from being introduced into the image sensor 810. The filter may be, for example, an infrared-light-blocking filter, without being limited thereto.

The circuit board 800 may be disposed below the lens moving apparatus 100, and the image sensor 810 may be disposed or mounted on the circuit board 800. The image sensor 810 may receive an image included in the light introduced through the lens moving apparatus 100, and may convert the received image into an electrical signal.

The circuit board 800 may be conductively connected to the circuit board 190 of the lens moving apparatus 100. For example, the circuit board 800 may include terminals 801, which are conductively connected to the terminals 9-1 to 9-*n* of the circuit board 190 of the lens moving apparatus 100. For example, a drive signal to be supplied to the coil 120 and a drive signal (or a clock signal and/or a data signal) to be supplied to the position sensor 170 may be transmitted to the terminals 801 of the circuit board 800 and the terminals 9-1 to 9-*n* of the circuit board 190 of the lens moving apparatus 100. The output of the position sensor 170 may be transmitted to the terminals 801 of the circuit board 800 from the terminals 9-1 to 9-*n* of the circuit board 190 of the lens moving apparatus 100.

The image sensor 810 may be positioned such that the optical axis thereof is aligned with the optical axis of the lens module 400. Accordingly, the image sensor 810 may obtain the light that has passed through the lens module 400. The image sensor 810 may output the radiated light as an image. The image sensor 810 may be, for example, a CCD (charge coupled device), MOS (metal oxide semiconductor), CPD or CID. However, the kind of the image sensor is not limited thereto.

The filter and the image sensor 810 may be disposed so as to be spaced apart from each other in the state of facing each other in the optical direction.

Figure 15:
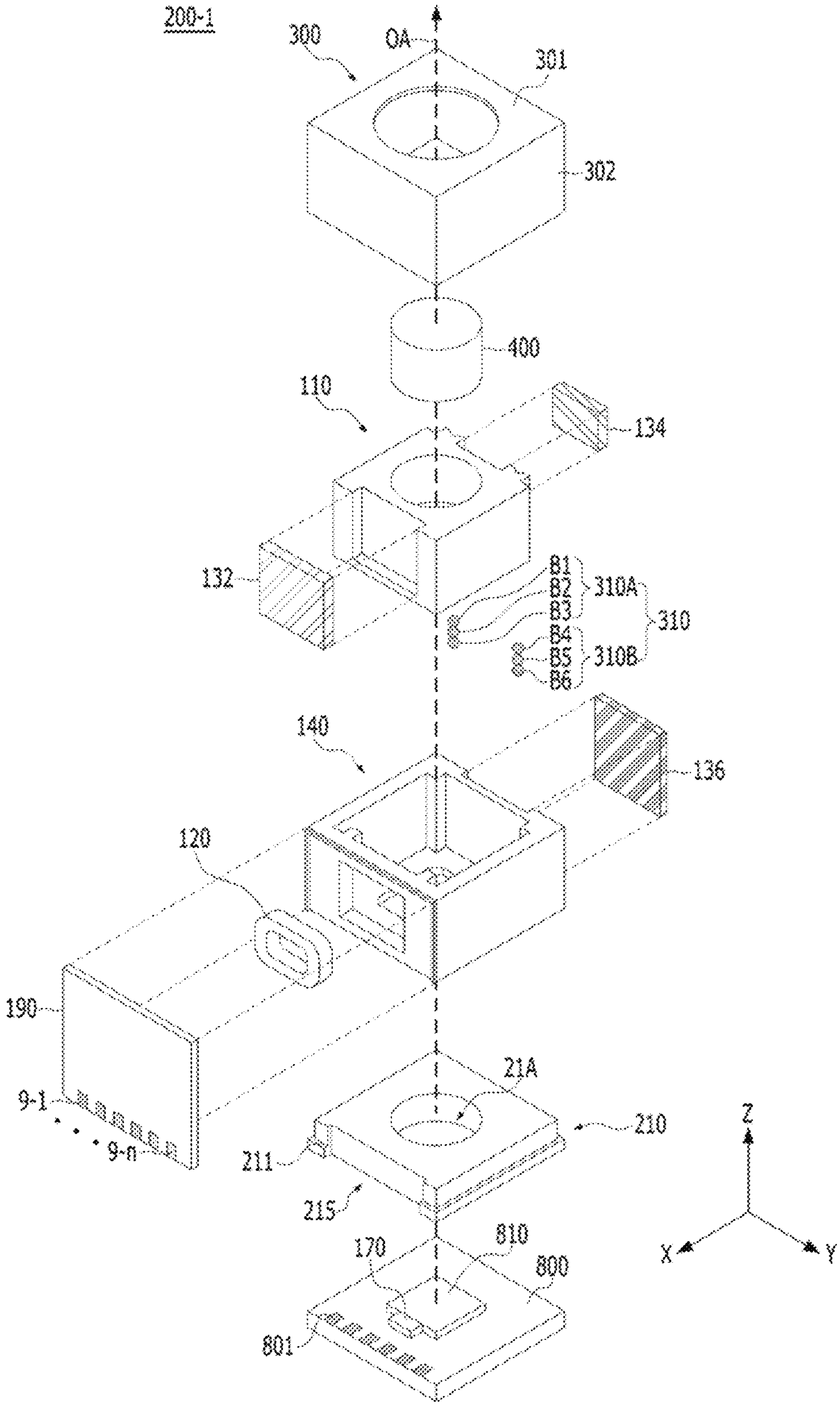
FIG. 15 is an exploded perspective view of a camera module according to another embodiment.

FIG. 15 is an exploded perspective view of a camera device 200-1 according to a further (another) embodiment.

Referring to FIG. 15, the camera device 200-2 is a modification of the camera module shown in FIG. 14. In FIG. 15, the position sensor 170 is not disposed on the base 210 but is disposed on the circuit board 800 of the camera device 200-1.

For example, the position sensor 170 may be disposed between the base 210 and the circuit board 800. Alternatively, for example, the position sensor 170 may be disposed below the base 210. In order to avoid spatial interference with the position sensor 170, a groove or an escape groove may be formed in the lower surface of the base 210.

For example, the position sensor 170 may be directly coupled to the circuit board 800 and may be conductively connected to the circuit board 800 using solder or a conductive adhesive. Accordingly, there is no need to provide the additional conductive members 410 and 420 configured to conductively connect the position sensor 170 to the circuit board 800 in the embodiment shown in FIG. 15.

For example, the position sensor 170 may correspond to, face, or overlap the first magnet 132 in the optical-axis direction.

Alternatively, in another embodiment, the position sensor 170 may correspond to, face, or overlap the second magnet 134 in the optical-axis direction. The description of the position sensor 170 shown in FIGS. 11A and 11B may be applied to the embodiment shown in FIG. 15 with or without modification.

Figure 16:
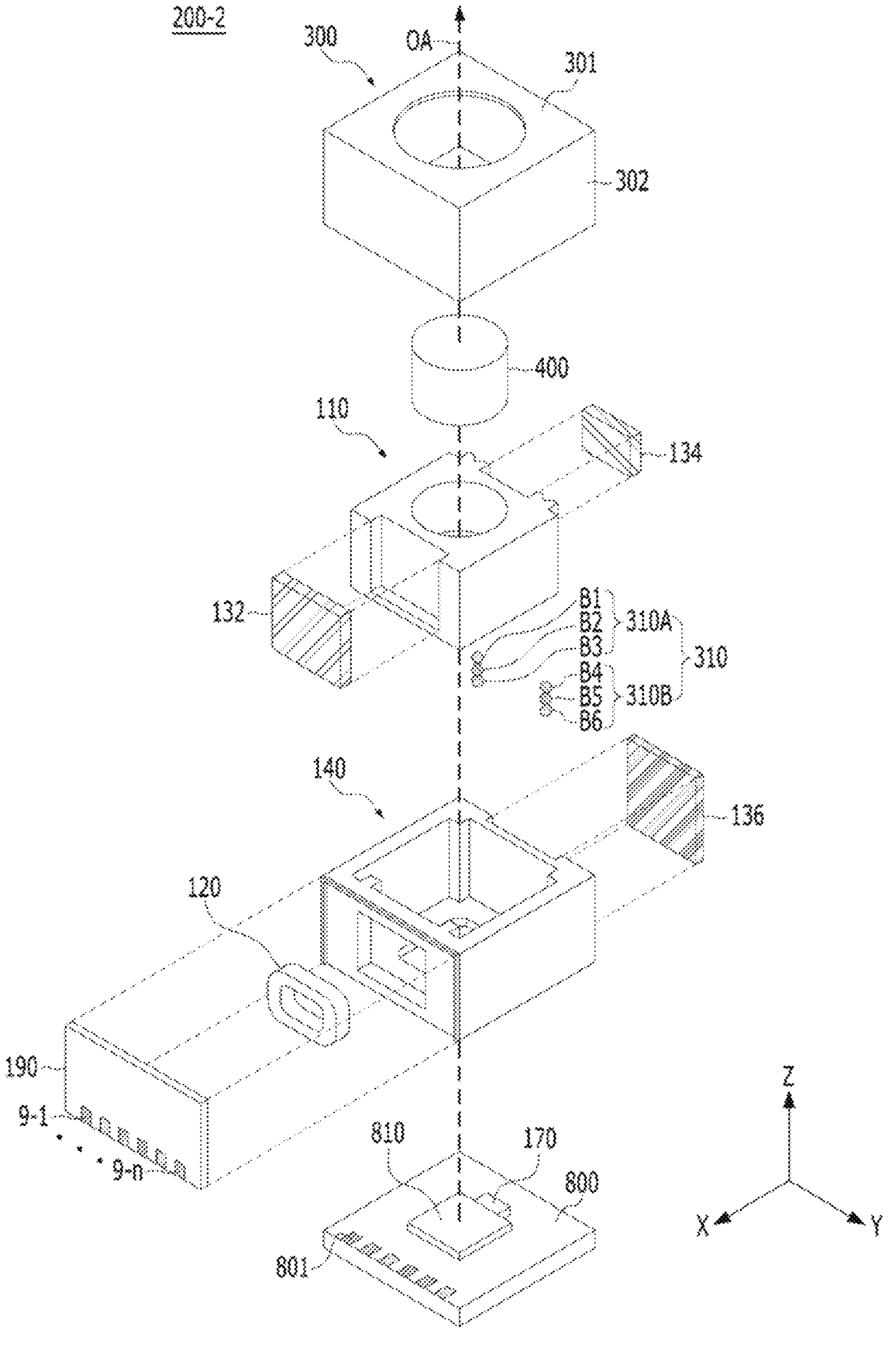
FIG. 16 is an exploded perspective view of a camera module according to a further embodiment.

FIG. 16 is an exploded perspective view of a camera device 200-2 according to a further embodiment. The camera device 200-2 shown in FIG. 16 may be a modification of the camera device 200 shown in FIG. 14.

Referring to FIG. 16, the position sensor 170 may not be disposed on the base 210 but may be disposed on the circuit board 800 of the camera device 200-1 (200-2), and the base 210 may be omitted in FIG. 16.

The position sensor 170 may be disposed between the bobbin 110 (and/or the housing 140) and the circuit board 800. For example, the position sensor 170 may be disposed between the first magnet 132 or the second magnet 134 disposed on the bobbin 110 and the circuit board 800.

In order to avoid spatial interference with the position sensor 170, a groove or an escape groove may be formed in the lower surface of the housing 140.

For example, the position sensor 170 may correspond to, face, or overlap the first magnet 132 or the second magnet 134 in the optical-axis direction. The description of the position sensor 170 shown in FIGS. 11A and 11B may be applied to the embodiment shown in FIG. 16 with or without modification.

Furthermore, the description of the embodiment shown in FIG. 15 may be applied to coupling and conductive connection between the circuit board 800 and the position sensor 170.

Figure 17:
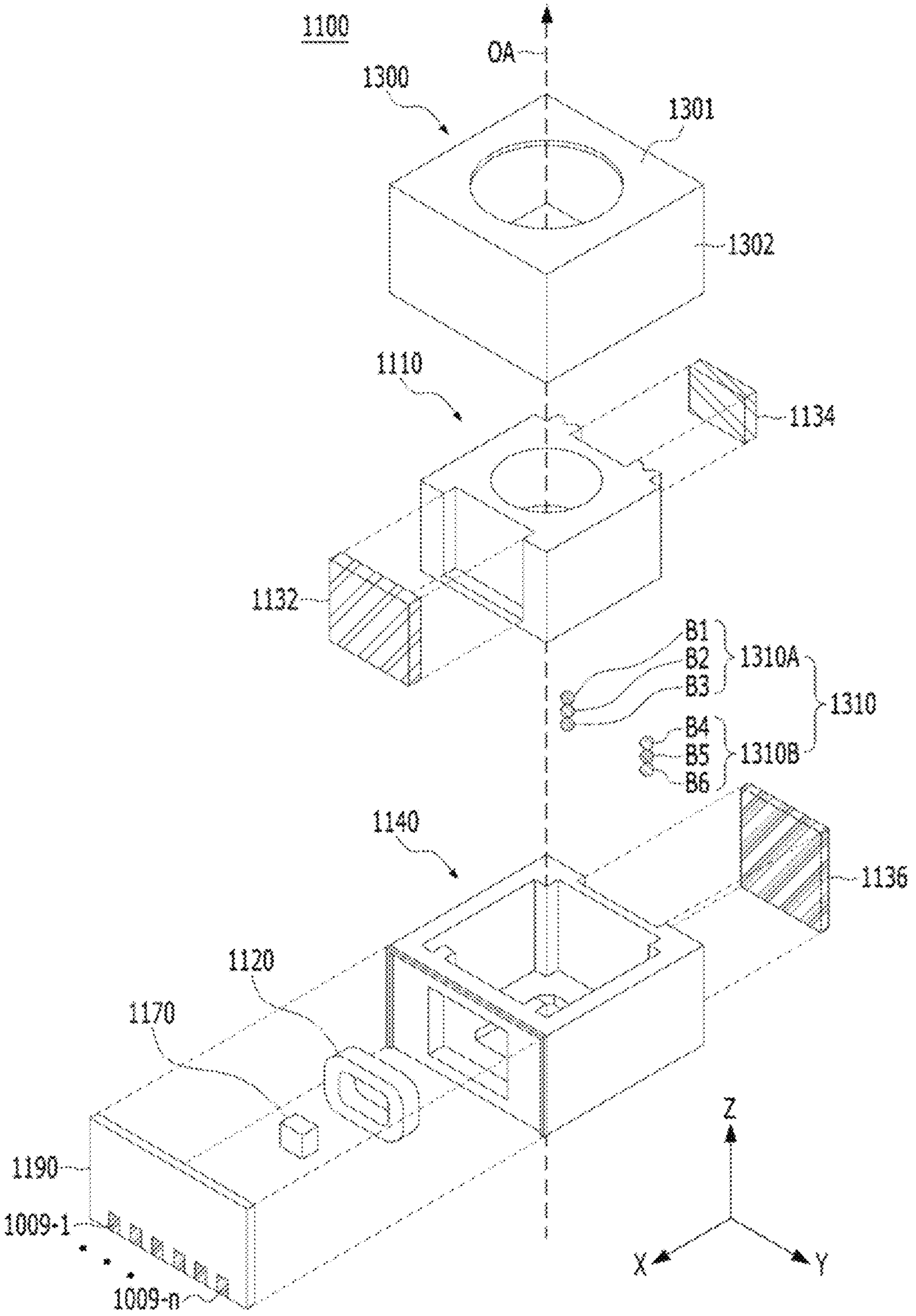
FIG. 17 is an exploded view of a lens moving apparatus according to an embodiment.
Figure 18:
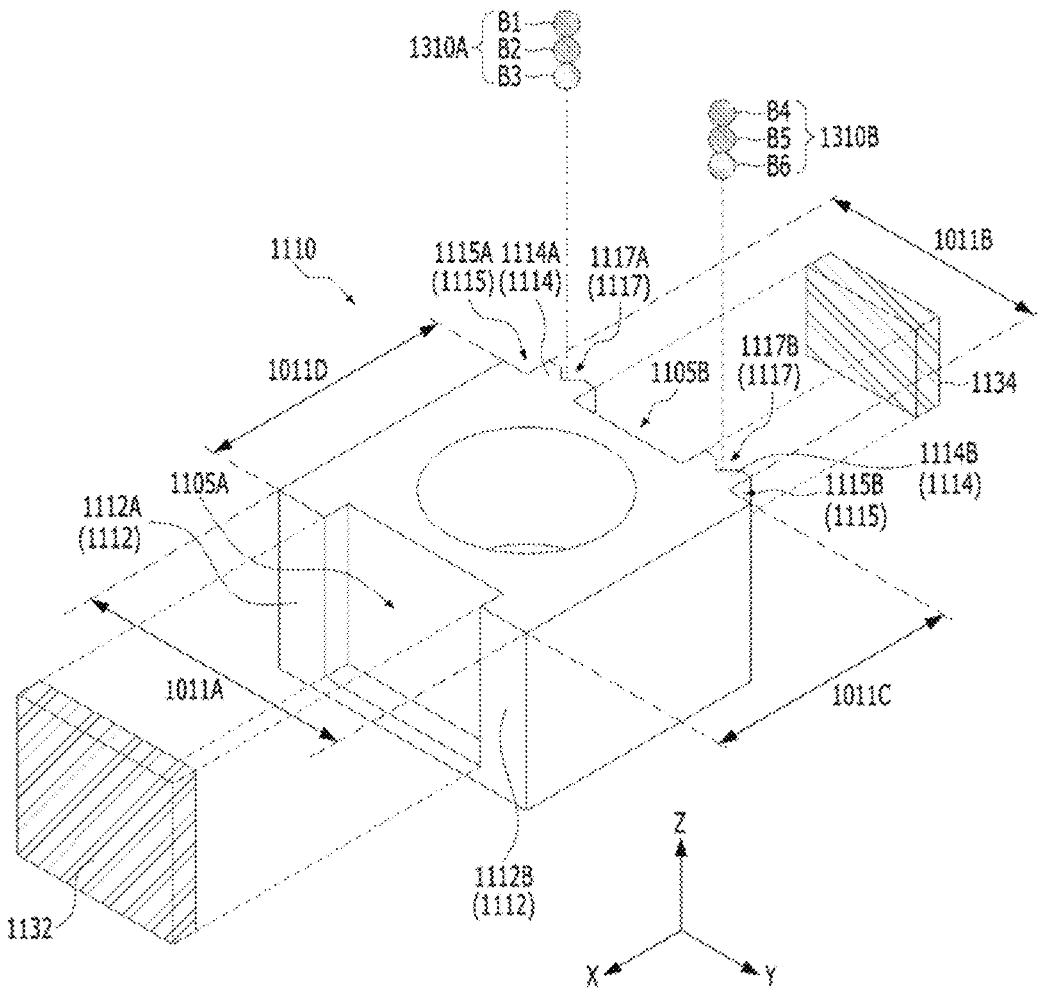
FIG. 18 is an exploded perspective view of the bobbin, the first magnet, and the second magnet shown in FIG. 17.
Figure 19:
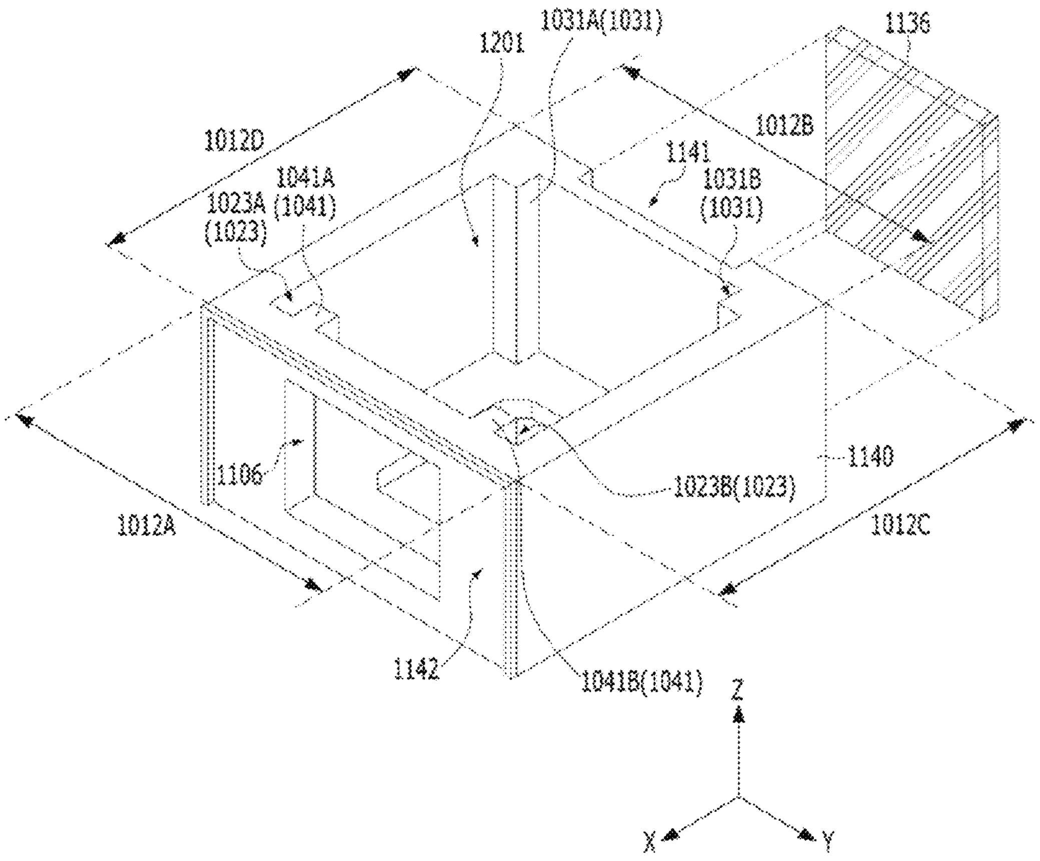
FIG. 19 is an exploded perspective view of the housing and the yoke shown in FIG. 17.
Figure 20A:
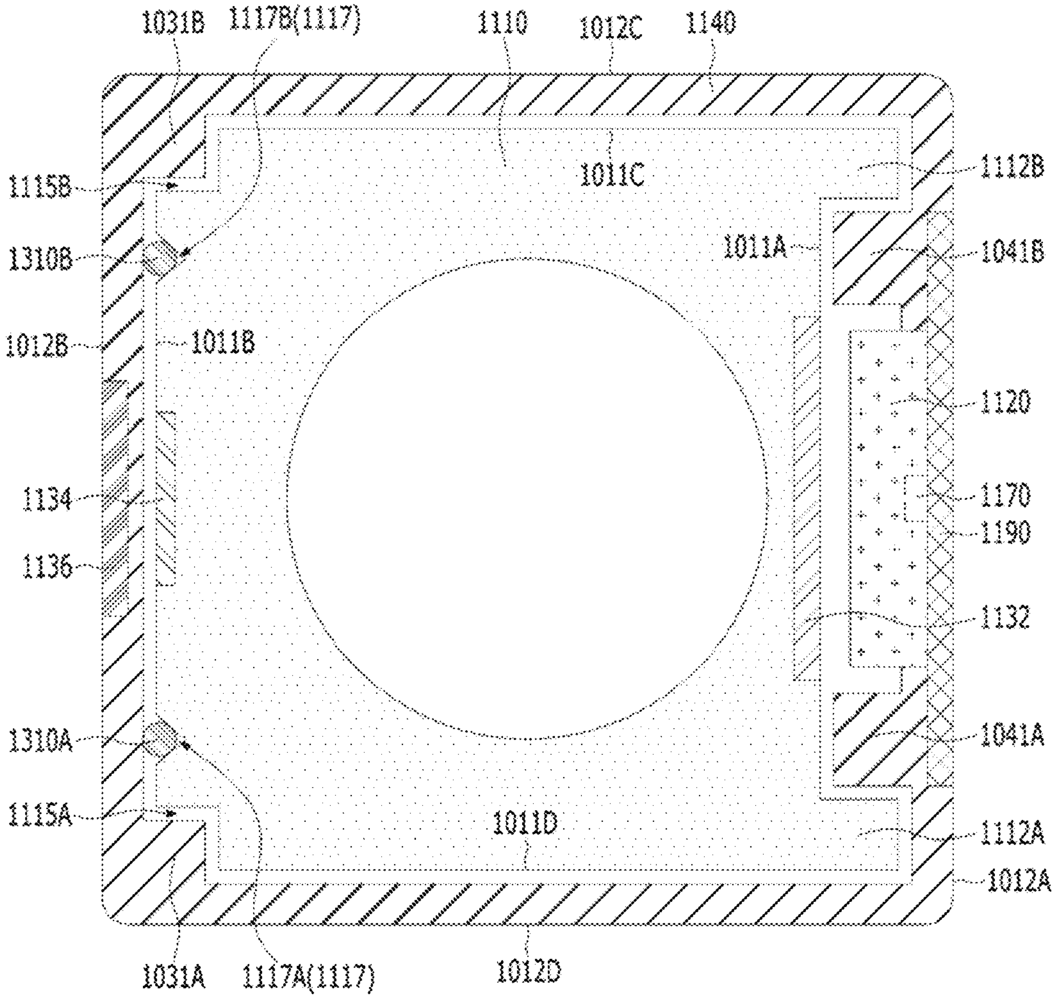
FIG. 20A is a plan view of the lens moving apparatus shown in FIG. 17, from which a cover member is removed.

FIG. 17 is an exploded view of a lens moving apparatus 1100 according to an embodiment. FIG. 18 is an exploded perspective view of the bobbin 1110, the first magnet 1132, and the second magnet 1134 shown in FIG. 17. FIG. 19 is an exploded perspective view of the housing 1140 and the yoke 1136 shown in FIG. 17. FIG. 20A is a plan view of the lens moving apparatus 110 shown in FIG. 17 from which a cover member 1300 is removed.

Referring to FIGS. 17 to 20A, the lens moving apparatus 1100 may include the bobbin 1110, the first magnet 1132, the second magnet 1134, the housing 1140, a coil 1120, a ball member 1310, and the yoke 1136.

The lens moving apparatus 1100 may further include a position sensor 1170 for AF feedback operation. In addition, the lens moving apparatus 1100 may further include a circuit board 1190, which is conductively connected to the position sensor 1170 in order to supply a drive signal to the position sensor 1170 and receive the output of the position sensor 1170.

The lens moving apparatus 1100 may further include a cover member 1300 configured to accommodate therein the housing 1140.

The bobbin 1110, which is intended to mount a lens or a lens barrel thereon, may be disposed in the housing 1140, and may be movable in the direction of the optical axis OA or in the first direction (for example, in the Z-axis direction) by virtue of the electromagnetic interaction between the coil 1120 and the first magnet 1132. The bobbin 1110 may alternatively be referred to as a "lens holder".

The bobbin 1110 may have a bore 1021 (see FIG. 23A) configured to allow a lens or a lens barrel to be mounted therein. For example, the bore 1021 in the bobbin 1110 may be a through hole, and may have a circular shape, an elliptical shape, or a polygonal shape, without being limited thereto.

Although not shown in FIG. 18, the bobbin 1110 may include at least one first stopper formed thereon. For example, the first stopper may have a structure that projects from the upper surface of the bobbin 1110 in the optical-axis direction or in the upward direction in order to prevent the upper surface of the bobbin 1110 from directly colliding with the inner surface of the upper plate 1301 of the cover member 1300. The bobbin 1110 may further include at least one second stopper formed on the lower surface thereof.

The bobbin 1110 may include a plurality of side surfaces or outer surfaces.

For example, the bobbin 1110 may include a plurality of side portions 1011A to 1011D. Furthermore, the bobbin 1110 may include a corner or a corner portion positioned between two adjacent side portions.

For disposition or seating of the first magnet 1132, the bobbin 1110 may include a first seating portion 1105A, which is formed or disposed on the first side portion (the first side surface or the first outer surface) among a plurality of side portions (or side surfaces or outer surfaces). The first seating portion 1105A may take the form of a groove.

For example, the first seating portion 1105A may be a groove having a structure that is depressed from the first side portion 1011A (or the first side surface or the first outer surface), and may have an opening, which is formed in at least one of the upper surface or the lower surface of the bobbin 1110. For example, the lower portion of the first seating portion 1105A may not be open but may be closed at the lower surface of the bobbin 1110.

For disposition or seating of the second magnet 1134, the bobbin 1110 may include a second seating portion 1105B, which is formed or disposed on the second side portion 1011B (or the second side surface or the second outer surface) among the plurality of side portions (or the side surfaces or the outer surfaces). The second seating portion 1105B may have the form of a groove having a structure that is depressed from the second side portion 1011B, and may have an opening, which is formed in at least one of the upper surface or the lower surface of the bobbin 1110. For example, the lower portion of the second seating portion 1105B may not be open but may be closed at the lower surface of the bobbin 1110.

For example, the second side portion 1011B (or the second side surface or the second outer surface) of the bobbin 1110 may be positioned opposite the first side portion 1011A (or the first side surface or the first outer surface) of the bobbin 1110.

The third side portion 1011C (or the third side surface or the third outer surface) and the fourth side portion 1011D (or the fourth side surface or the fourth outer surface) of the bobbin 1110 may be disposed between the first and second side portions of the bobbin 1110, and may be positioned opposite each other.

The bobbin 1110 may include at least one escape portion 1115 configured to avoid spatial interference with the projection 1031 of the housing 1140. The escape portion 1115 may alternatively be referred to as an "escape groove".

For example, the escape portion 1115 may be formed in at least one of the corners of the bobbin 1110. For example, the escape portion 1115 may be formed in at least one of the corners of the bobbin 1110 adjacent to the second side portion (or the second side surface or the second outer surface) of the bobbin 1110.

For example, the escape portion 1115 may include a first escape portion 1115A formed in one corner of the bobbin 1110 adjacent to the second side portion 1011B (or the second side surface or the second outer surface) and a second escape portion 1115B formed in the other corner of the bobbin 1110 adjacent to the second side portion 1011B (or the second side surface or the second outer surface). The escape portion 1115 in the bobbin 1110, in conjunction with the projection 1031 of the housing 1140 to be described later, may serve to suppress rotation of the bobbin 1110.

The projection 1031 of the housing 1140 may serve to suppress the extent to which the bobbin 1110 rotates about the optical axis. The projection 1031 may alternatively be referred to as a "rotation suppressor", a "stopper", a "catching step", a "shock mitigator", or a "shock absorber".

By virtue of the projection 1031, it is possible to suppress or prevent the bobbin 1110 from rotating beyond an intended extent due to external shock, to mitigate shock between the bobbin 1110 and the housing 1140 due to external shock, to reduce generation of foreign substances or particles attributable to shock or collision, and to prevent deformation or breakage of the bobbin 1110 and/or the housing 1140. Furthermore, the projection 1031 may also serve as a stopper in a direction perpendicular to the optical axis.

The bobbin 1110 may include at least one groove 1117, on or in which a ball member 1310 is disposed or received. The groove 1117 may alternatively be referred to as a "receiving groove" or a "guide groove". At least a portion of the ball member 1310 may be in contact with the groove 1117.

For example, the groove 1117 may be formed in the second side portion 1011B (or the second side surface or the second outer surface) of the bobbin 1110. The groove 1117 may have a structure that is depressed from the second side portion 1011B (the second side surface or the second outer surface) of the bobbin 1110.

For example, the groove 1117 may be positioned between the second seating portion 1105B and the corner of the bobbin 1110 adjacent to the second side portion 1011B.

For example, the groove 1117 may include a first groove 1117A and a second groove 1117B. For example, the first groove 1117A may be positioned between the second seating portion 1105B and a corner of the bobbin 1110 adjacent to the second side portion 1011B. The second groove 1117B may be positioned between the second seating portion 1105B and the other corner of the bobbin 1110 adjacent to the second side portion 1011B.

For example, the first groove 1117A may be positioned between the second seating portion 1105B and the first escape portion 1115A, and the second groove 1117B may be positioned between the second seating portion 1105B and the second escape portion 1115B.

For example, the groove 1117 may have an opening formed in the upper surface of the bobbin 1110. For example, the lower portion of the groove 1117 may not be open but may be closed at the lower surface of the bobbin 1110. The lower portion of the groove 1117 may have a height difference relative to the lower surface of the bobbin 1110 in the optical-axis direction. For example, the lower portion of the groove 1117 may be positioned higher than the lower surface of the bobbin 1110.

For example, the groove 1117 may be formed so as to extend in the optical-axis direction. For example, the groove 1117 may extend to the lower surface from the upper surface of the bobbin 1110 or may extend in the optical-axis direction so as to be formed between the upper surface and the lower surface of the bobbin 1110.

Although the groove 1117 may have, for example, a triangular shape when viewed from above, the disclosure is not limited thereto. The groove 1117 may have a polygonal shape (for example, a quadrilateral shape, a pentagonal shape or the like). For example, the groove 1117 may be a "V"-shaped or "U"-shaped groove.

In another embodiment, the groove 1117 may not be formed in the bobbin 1110 but be formed in the inner surface of the housing 1140 to allow the ball member 1310 to be disposed or received therein.

For example, the groove 1117 may be formed in at least one projection 1114 (or a protrusion) formed on the outer surface (or the second outer surface) of the second side portion 1011B of the bobbin 1110. The projection 1114 may include a first projection 1114A, in which the first groove 1117A is formed, and a second projection 1114B, in which the second groove 1117B is formed.

The first magnet 1132 and the second magnet 1134 may be disposed on the bobbin 1110 so as to be spaced apart from each other. For example, the second magnet 1134 may be positioned opposite the first magnet 1132.

For example, the first magnet 1132 may be disposed on the first side portion 1011A (the first side surface or the first outer surface) of the bobbin 1110, and the second magnet 1134 may be disposed on the first side portion 1011A (the first side surface or the first outer surface) of the bobbin 1110.

For example, the first magnet 1132 may be disposed in the first seating portion 1105 in the bobbin 1110, and the second magnet 1134 may be disposed in the second seating portion 1105B in the bobbin 1110.

The first magnet 1132 may be disposed so as to correspond to or face the coil 1120. Electromagnetic force may be generated by the interaction between the first magnet 1132 and the coil 1120, and the bobbin 1110 may be moved in the optical-axis direction by virtue of the electromagnetic force.

The first magnet 1132 may include at least one magnet unit. Although the first magnet 1132 includes one magnet unit in the embodiment shown in FIG. 1, the disclosure is not limited thereto. In another embodiment, the first magnet 1132 may include two or more magnet units.

Although each of the first magnet 1132 and the second magnet 1134 may have a shape corresponding to the outer surface of a corresponding one of the side portions 1011A and 1011B, for example, a polyhedral form (for example, a regular hexahedral form or a rectangular parallelepiped form), the disclosure is not limited thereto.

The first magnet 1132 may be a monopolar magnetized magnet, which includes two different polarities and an interface plane naturally formed between the two different polarities.

For example, the first magnet 1132 may be a monopolar magnetized magnet in which the N pole is separated from the S pole in the optical-axis direction. For example, the first magnet 1132 may be a monopolar magnetized magnet in which the first surface thereof that faces the coil 1120 includes the N pole and the S pole. Although the N pole of the first magnet 1132 may be positioned at a higher level and the S pole of the first magnet 1132 may be positioned at a lower level, the disclosure is not limited thereto. In another embodiment, the positions of the N pole and the S pole may be reversed.

In another embodiment, the first magnet 1132 may also be a monopolar magnetized magnet in which the N pole is separated from the S pole in a direction perpendicular to the optical-axis direction. Although the first magnet according to another embodiment may, for example, be constructed such that the first surface thereof that faces the coil 1120 becomes the N pole and the second surface thereof opposite the first surface becomes the S pole, the disclosure is not limited thereto. In a further embodiment, the positions of the N pole and the S pole may be reversed.

In a further embodiment, the first magnet 1132 may also be a tetrapolar or bipolar magnetized magnet in order to increase electromagnetic force.

For example, the first magnet 1132 may include a first magnet unit including the N pole and the S pole, a second magnet unit including the S pole and the N pole, and a partition wall disposed between the first magnet unit and the second magnet unit. Here, the partition wall is a portion that is almost completely non-magnetic and which may include a zone having almost no polarity. The partition wall may be filled with air or a non-magnetic material, and may be referred to as a "neutral zone".

For example, the first magnet and the second magnet may face each other in the optical-axis direction, and may be disposed such that different poles thereof face each other.

For example, the first surface of the first magnet that faces the first coil 1120 may be the N pole (or the S pole), and the first surface of the second magnet that faces the first coil 1120 may be the S pole (or the N pole). For example, the first surface of the first magnet that faces the first coil 120 and the first surface of the second magnet may have opposite polarities.

In another embodiment, for example, the first magnet and the second magnet may face each other in a direction perpendicular to the optical-axis direction, and the first magnet and the second magnet may be disposed such that different poles thereof face each other in a direction perpendicular to the optical-axis direction.

Although the first surface of the first magnet 1132 may have a flat surface, the disclosure is not limited thereto. The first surface of the first magnet 1132 may have a curved surface, a sloped surface, or a tapered surface. For example, the first surface of the first magnet 1132 may be the surface that faces the coil 1120.

The second magnet 1134 may include at least one magnet unit. Although the second magnet 1134 includes a single magnet unit in FIG. 17, the disclosure is not limited thereto. In another embodiment, the second magnet 1134 may include two or more magnet units.

The second magnet 1134 may be a monopolar magnetized magnet or a bipolar magnetized magnet. The description of the monopolar magnetization or bipolar magnetization of the first magnet 1132 may be applied to the second magnet 1134 with or without modification.

The intensity of the magnetic force of the second magnet 1134 may be different from the intensity of the magnetic force of the first magnet 1132. Although the intensity of the magnetic force of the second magnet 1134 may, for example, be less than the intensity of the magnetic force of the first magnet 1132, the disclosure is not limited thereto. In another embodiment, the intensity of the magnetic force of the second magnet 1134 may be equal to or greater than the intensity of the magnetic force of the first magnet 1132.

For example, the second magnet 1134 and the first magnet 1132 may be made of different materials. The second magnet 1134 and the first magnet 1132 may include different components.

For example, the second magnet 1134 may be made of a material that has magnetic force lower than the magnetic force of the material of the first magnet 1132. For example, the first magnet 1132 may be made of a first material, and the second magnet 1134 may be made of a second material different from the first material. Herein, the magnetic force of the first material may be higher than the magnetic force of the second material. The second magnet 1134 may include at least one of neodymium (NdFeB) or samarium-cobalt.

In another embodiment, the second magnet 1134 may be made of the same material as that of the first magnet 1132.

The housing 1140 may be disposed in the cover member 1300, and may receive at least a portion of the bobbin 1110 therein.

Referring to FIG. 19, the housing 1140 may support the coil 1120, the circuit board 1190, and the yoke 1136, and may receive therein the bobbin 1110 to allow the AF moving unit (or the AF operation unit) to be movable.

For example, the AF moving unit may include the bobbin 1110 and components coupled or mounted on the bobbin 1110. For example, the AF moving unit may include the bobbin 1110, the first magnet 1132, and the second magnet 1134. Alternatively, the AF moving unit may include the lens module 400 (see FIG. 12) coupled or mounted on the bobbin 1110.

In another embodiment in which the yoke 1136 is disposed on the bobbin 1110 and the second magnet 1132 is disposed on the housing 1140, the AF moving unit may include the bobbin 1110, the first magnet 1132, and the yoke 1136.

In a further embodiment in which the coil 1120 is disposed on the bobbin 1110 and the first magnet 1132 is disposed on the housing 1140, the AF moving unit may include the bobbin 1110, the coil 1120, and the second magnet 1134. In still a further embodiment, the AF moving unit may include the yoke 1136, in place of the second magnet 1134.

The housing 1140 may have a bore 1201, a hole, or a cavity for receiving the bobbin 1110 therein. Here, the bore 1201 in the housing 1140 may be positioned at the center of the central region of the housing 1140. For example, the bore in the housing 1140 may be a through hole that is formed through the housing 1140 in the optical-axis direction. Although the bore 1201 in the housing 1140 may have a shape corresponding to the shape of the bobbin 1110, for example, a polygonal shape (for example, a quadrilateral shape or an octagonal shape) or a circular shape (or an elliptical shape), the disclosure is not limited thereto. The bore 1201 in the housing 1140 may have various shapes.

The housing 1140 may include a plurality of side portions 1012A to 1012D. The housing 1140 may include a corner or a corner portion positioned between two adjacent side portions.

The housing 1140 may include a first side portion 1012A corresponding to the first side portion 1012A of the bobbin 1110, a second side portion 1012B corresponding to the second side portion 1011B of the bobbin 1110, a third side portion 1012C corresponding to the third side portion 1011C of the bobbin 1110, and a fourth side portion 1012D corresponding to the fourth side portion 1011D of the bobbin 1110. The first side portion 1012A (or the first side surface or the first outer surface) of the housing 1140 may be positioned opposite the second side portion 1012B (or the second side surface or the second outer surface) of the housing 1140, and the third side portion 1012C (or the third side surface or the third outer surface) of the housing 1140 may be positioned opposite the fourth side portion 1012D (or the fourth side surface or the fourth outer surface) of the housing 1140.

Each of the first to fourth side portions 1012A to 1012D of the housing 1140 may be disposed parallel to a corresponding one of the side plates of the cover member 1300.

For disposition or seating of the yoke 1136, the housing 1140 may include a first seating portion 1141 formed in the second side portion 1012B thereof. The first seating portion 1141 may have the form of a hole, a groove, or a seating groove. For example, the first seating portion 1141 may be a groove having a structure that is depressed from the second side portion (or the second side surface or the second outer surface) of the housing 1140, and may have an opening, which is formed in at least one of the upper surface or the lower surface of the housing 1140. For example, the lower portion of the first seating portion 1141 may not be open but may be closed at the lower surface of the housing 1140.

An opening or a hole 1106 may be formed in the first side portion 1012A (or the first side surface or the first outer surface) of the housing 1140. At least a portion of the coil 1120 may be disposed in the hole 1106 in the housing 1140. The hole 1106 may be a through hole, which is formed through the first side portion 1012A. Since the hole 1106 is a through hole, the housing 1140 may not be interposed between the position sensor 1170 and the first magnet 1132, thereby increasing the output of the position sensor 1170 and improving the sensitivity of the position sensor 1170.

In another embodiment, the housing 1140 may have a groove or a recess, in place of the hole, for disposition of the coil 1120.

For disposition or seating of the circuit board 1190, a second seating portion 1142 may be formed in the first side portion 1012A (or the first side surface or the first outer surface) of the housing 1140.

For example, the second seating portion 1142 may be a groove having a structure that is depressed from the first side portion 1012A (or the first side surface or the first outer surface) of the housing 1140, and may have an opening, which is formed in at least one of the upper surface or the lower surface of the housing 1140. For example, the hole 1106 may be formed in the bottom surface of the second seating portion 1142 of the housing 1140.

In another embodiment, the second seating portion 1142 may include a protrusion to be coupled to the circuit board, and the circuit board may have a hole to be coupled to the protrusion of the housing.

The housing 1140 may include the projection 1031, which corresponds to or faces the escape groove 1115 in the bobbin 1110. The projection 1031 may project toward the bobbin 1110 from the inner surface or the internal surface of the housing 1140.

For example, the projection 1031 may be formed between the inner surfaces of two adjacent side portions of the housing 1140. For example, the projection 1031 may include a first projection 1031A, which corresponds to or faces the first escape portion 115A in the bobbin 1110, and a second projection 1031B, which corresponds to or faces the second escape portion 1115B in the bobbin 1110.

For example, the first projection 1031A may be formed between the inner surface of the second side portion 1012B and the inner surface of the fourth side portion 1012D of the housing 1140, and the second projection 1031B may be formed between the inner surface of the second side portion 1012B and the inner surface of the third side portion 1012C of the housing 1140.

Although the projection 1031 is formed so as to extend to the lower surface from the upper surface of the housing 1140 in FIG. 19, the disclosure is not limited thereto. In another embodiment, one end (for example, the upper end or the upper surface) of the projection 1031 may be spaced apart from the upper surface of the housing 1140 and may be positioned below the upper surface of the housing 1140. In another embodiment, the other end (for example, the lower end or the lower surface) of the projection 1031 may be spaced apart from the lower surface of the housing 1140 and may be positioned above the lower surface of the housing 1140.

Furthermore, although the escape portion 1115 is formed so as to extend to the lower surface from the upper surface of the bobbin 1110 in FIG. 18, the disclosure is not limited thereto. In another embodiment, one end (for example, the upper end) of the escape portion 1115 may be spaced apart from the upper surface of the bobbin 1110 and may be positioned below the upper surface of the bobbin 1110. In a further embodiment, the other end (for example, the lower end or the lower surface) of the escape portion 1115 may be spaced apart from the lower surface of the bobbin 1110 may be positioned above the lower surface of the bobbin 1110.

Although not shown in FIG. 19, the housing 1140 may include a first stopper formed on the upper portion, the upper surface, or the upper end thereof, and a second stopper formed on the lower portion, the lower surface, or the lower end thereof. The first and second stoppers of the bobbin 1110 and the housing 1140 may alternatively be referred to as "bosses" or "protrusions".

At least one projection 1112 (or a protrusion) may be formed on the first side portion 1011A (or the first side surface or the first outer surface) of the bobbin 1110, and at least one groove portion 1023 or a groove, corresponding to the projection 1112 of the bobbin 1110, may be formed in the inner surface of the first side portion 1012A of the housing 1140.

For example, the bobbin 1110 may include a first projection 1112A (or a first protrusion), which is disposed at one side of the first side portion 1011A (or the first side surface or the first outer surface), and a second projection 1112B (or a second protrusion), which is disposed at another side of the first side portion 1011A (or the first side surface or the first outer surface).

For example, the first seating portion 1105A may be positioned between the first projection 1112A and the second projection 1112B.

The housing 1140 may include at least one groove portion 1023, which is formed by projection of the inner surface of the first portion 1012A toward the bobbin 1110 and corresponds to or faces the at least one projection 1112 of the bobbin 1110.

For example, the groove portion 1023 in the housing 1140 may include a first groove portion 1023A, which is positioned at one side of the inner surface of the first side portion 1012A adjacent to the fourth side portion 1012D, and a second groove portion 1023B, which is positioned at another side of the inner surface of the first side portion 1012A adjacent to the third side portion 1012C.

For example, the at least one projection 1112 of the bobbin 1110 may be disposed in the at least one groove portion 1023 in the housing 1140.

For example, the first projection 1112A of the bobbin 1110 may be disposed in the first groove portion 1023A in the housing 1140, and the second projection 1112 of the bobbin 1110 may be disposed in the second groove portion 1023B in the housing 1140.

The projection 1112 of the bobbin 1110 and the groove portion 1023 in the housing 1140 may together serve to suppress the extent to which the bobbin 1110 rotates about the optical axis. For example, the projection 1112 may be referred to as a "rotation suppressor", a "stopper", a "catching step", a "shock mitigator", or a "shock absorber".

By virtue of the projection 1112, it is possible to suppress or prevent the bobbin 1110 from rotating beyond an intentional extent due to external shock, to mitigate shock between the bobbin 1110 and the housing 1140 due to external shock, to reduce generation of foreign substances or particles attributable to shock or collision, and to prevent deformation or breakage of the bobbin 1110 and/or the housing 1140. Furthermore, the projection 1031 may also serve as a stopper in a direction perpendicular to the optical-axis direction.

In another embodiment, for prevention of the rotation, a groove portion may be formed in the bobbin 1110, in place of the projection 1112, and a projection may be formed on the housing 1140, in place of the groove portion 1023.

The housing 1140 may include at least one projection 1041 (or a protrusion), which is disposed in the first seating portion 1105A in the bobbin 1110. The projection 1041 may project toward the first side portion 1101A of the bobbin 1110 from the inner surface of the first side portion 1012A of the housing 1140.

For example, the projection 1041 (or the protrusion) may include a first projection 1041A and a second projection 1041B.

Next, the coil 1120 will be described.

The coil 1120 may be positioned so as to correspond to or face the first magnet 1132 in a direction perpendicular to the optical-axis direction. For example, the coil 1120 may be disposed on the first side portion 1012A of the housing 1140 so as to correspond to or face the first magnet 1132. Alternatively, for example, the coil 1120 may be disposed between the first side portion 1011A (or the first side surface or the first outer surface) of the bobbin 1110 and the first side plate of the cover member 1300.

For example, the coil 1120 may be a driver-type AF coil configured to electromagnetically interact with the first magnet 1132 disposed at the bobbin 1110.

For example, the coil 1120 may be disposed in the housing 1140. For example, at least a portion of the coil 1120 may be disposed in the hole 1106 in the housing 1140.

In order to create electromagnetic force from the interaction with the first magnet 1132, a drive signal (for example, drive current or voltage) may be provided or applied to the coil 1120.

The drive signal applied to the coil 1120 may be a DC signal, without being limited thereto. The drive signal may be an AC signal or a signal containing both DC and AC components.

An AF moving unit (or AF operation unit) may be moved in the first direction, for example, in an upward direction (in the +z-axis direction) or in a downward direction (in the −z-axis direction) by virtue of the electromagnetic force resulting from the interaction between the coil 1120 and the magnet 1130.

By controlling the intensity and/or polarity of a drive signal applied to the first coil 1120 (for example, the direction in which current flows) and thus controlling the intensity and/or direction of the electromagnetic force resulting from the interaction between the coil 1120 and the first magnet 1132, it is possible to control the movement of the AF moving unit in the first direction, thereby performing an autofocus function.

The coil 1120 may have a closed-loop shape, for example, a ring shape having a central hole 1120A. The coil 1120 may be coupled to the circuit board 1190 disposed on the housing 1140, or may be mounted on the circuit board 1190. For example, the coil 1120 may be disposed on a first surface of the circuit board 1190. For example, the first surface of the circuit board 1190 may be a surface that faces the first side portion 1011A (or the first side surface or the first outer surface) of the bobbin 1110.

For example, the coil 1120 may be embodied as a coil ring, which is wound or coiled in a clockwise direction or in a counterclockwise direction about an axis perpendicular to the optical axis.

The coil 1120 may be conductively connected to the circuit board 1190. For example, the coil 1120 may be conductively connected to the pads of the circuit board 1190 using solder or conductive adhesive.

The circuit board 1190 and the position sensor 1170 may be disposed on the first side portion 1012A (or the first side surface or the first outer surface) of the housing 1140. For example, at least a portion of the circuit board 1190 may be disposed in the second seating portion 1142 formed in the first side portion 1012A of the housing 1140.

For example, at least a portion of the first surface of the circuit board 1190 may be in contact with the bottom surface of the second seating portion 1142 in the housing 1140.

The circuit board 1190 may include a plurality of terminals 1009-1 to **1009-*n* (n being a natural number greater than 1), which are to be conductively connected to external apparatuses or devices. For example, the plurality of terminals 1009-1 to 1009-*n* may be disposed on the second surface of the circuit board 1190. The second surface of the circuit board 1190 may be a surface opposite the first surface of the circuit board 1190**.

For example, the circuit board 1190 may be a printed circuit board or an FPCB.

Although the plurality of terminals 1009-1 to **1009-*n* may, for example, be arranged in a row at the lower end of the second surface of the circuit board 1190**, the disclosure is not limited thereto.

Although the circuit board 190 according to the embodiment shown in FIG. 17 includes six terminals 1009-1 to **1009-*n*** (for example, n=6), the number of terminals is not limited thereto.

The circuit board 1190 may include a circuit pattern or a wire for conductively connecting the position sensor 1170 to the terminals 1009-1 to **1009-*n***.

The position sensor 1170 may be mounted or disposed on the first surface of the circuit board 1190 and may be conductively connected to the circuit board 1190.

For example, the position sensor 1170 may be disposed inside the circuit board 1190, which is disposed on the first side portion 1012A of the housing 1140. Here, the inside of the circuit board 1190 may be the side toward the center of the housing 1140 from the circuit board 1190.

For example, the position sensor 1170 may be disposed in the central hole 1120A in the coil 1120 disposed on the circuit board 1190. The position sensor 1170 may not overlap the coil 1120 in a direction perpendicular to the optical-axis direction. For example, the position sensor 1170 may be disposed in the hole 1106 in the housing 1140. In another embodiment, the position sensor 1170 may also be positioned outside the central hole 1120A in the coil 1120.

Furthermore, the position sensor 1170 may face or overlap the yoke 1136 in a direction perpendicular to the optical-axis direction. In another embodiment, the position sensor 1170 may not face or overlap the yoke 1136 in a direction perpendicular to the optical-axis direction.

The position sensor 1170 may detect the intensity of the magnetic field of the first magnet 1132 mounted on the bobbin 1110 during movement of the bobbin 1110, and may output an output signal (for example, an output voltage) corresponding to the result of detection. For example, a controller of a camera module 200-3 or a controller 780 of a terminal 200A may sense or detect the displacement of the bobbin 1110 in the optical-axis direction using the output signal from the position sensor 1170.

The position sensor 1170 may be embodied as a Hall sensor alone, or may be embodied as a driver including a Hall sensor. The driver-type position sensor may include a temperature-sensing element.

For example, when the position sensor 1170 is embodied as a Hall sensor alone, the position sensor 1170 may include two input terminals, to which a drive signal or power is supplied, and two output terminals, through which a sensed voltage (or an output voltage) is output.

The circuit board 1190 may include first and second terminals (for example, 1009-1 and 1009-2), which are conductively connected to the two input terminals of the position sensor 1170 so as to supply power or a drive signal to the two input terminals. Furthermore, the circuit board 1190 may include third and fourth terminals (for example, 1009-3 and 1009-4), which are conductively connected to the two output terminals of the position sensor 1170 so as to receive the output signal of the position sensor 1170 from the two output terminals. Furthermore, the circuit board 1190 may include fifth and sixth terminals (for example, 1009-5 and 1009-6), which are conductively connected to the coil 1120 so as to supply a drive signal to the coil 1120.

For example, when the position sensor 1170 is a driver-type position sensor including a Hall sensor, the position sensor 1170 may include first to fourth terminals for transmitting and receiving data to and from an external device through data communication using a protocol such as I2C communication and fifth and sixth terminals for supplying a drive signal to the coil 1120. Here, the first and second terminals of the position sensor 1170 may be terminals for receiving a power signal, and the third and fourth terminals of the position sensor 1170 may be signal terminals for transmitting and receiving a clock signal and a data signal.

Here, the circuit board 1190 may include first to fourth terminals (for example, 1009-1 to 1009-4) conductively connected to the first to fourth terminals of the position sensor 1170. The fifth and sixth terminals of the position sensor 1170 may be conductively connected to the coil 1120 via the circuit board 1190 such that a drive signal is supplied to the coil 1120 via the fifth and sixth terminals of the position sensor 1170.

The yoke 1136 may be disposed on the housing 1140 so as to correspond to or face the second magnet 1134. For example, the yoke 1136 may be disposed so as to face the second magnet 1134 in a direction perpendicular to the optical-axis direction.

The yoke 1136 may be disposed on a side portion of the housing 1140 other than the first side portion 1012A of the housing 1140 on which the coil 1120 is disposed. For example, the yoke 136 may be positioned opposite the coil 120. For example, the yoke 1136 may be disposed on the second side portion 1012B of the housing 1140. For example, the second magnet 1134 may be disposed between the second side portion 1011B of the bobbin 1110 and the yoke 1136. Alternatively, for example, the second magnet 1134 may be disposed between the first magnet 1132 and the yoke 1136.

The yoke 1136 may be disposed so as to be spaced apart from the circuit board 1190. For example, the circuit board 1190 may be disposed on the first side portion 1012A of the housing 1140, and the first magnet 1132 may be disposed between the circuit board 1190 and the yoke 1136.

For example, attractive force may act between the yoke 1136 and the second magnet 1134 in a direction perpendicular to the optical-axis direction. A magnetic circuit may be formed between the yoke 1136 and the second magnet 1134.

The yoke 1136 may be made of a ferromagnetic material. For example, the yoke 1136 may be a magnetic body. For example, the yoke 1136 may be made of ferromagnetic metal. Alternatively, for example, the yoke 1136 may be made of a material having magnetism.

Alternatively, for example, the yoke 1136 may be a magnet. Here, the yoke 1136 may alternatively be referred to as a "third magnet".

Because the yoke 1136 is disposed on the housing 1140, which is a stationary body, the bobbin 1110 coupled to the second magnet 1134 may be attracted toward the yoke 1136 by means of the attractive force acting between the yoke 1136 and the second magnet 1134.

Because a ball member 1310 is pressed by the bobbin 1110 and the housing 1140 by means of the interaction between the yoke 1136 and the second magnet 1134, the yoke 1136 and the second magnet 1134 may be referred to as a "press unit" or a "press member". When the bobbin 1110 is moved in the optical-axis direction by the press unit, contact between the bobbin 1110 and the ball member 1310 and contact between the housing 1140 and the ball member 1310 may be maintained.

The ball member 1310 may be disposed between the bobbin 1110 and the housing 1140. The ball member 1310 may alternatively be referred to as a "rolling member", a "ball", or a "ball bearing".

Since the ball member 1310 is in contact with the bobbin 1110 and the housing 1140 and rolls between the bobbin 1110 and the housing 1140, the ball member 1310 is able to support movement of the bobbin 1110 in the optical-axis direction. The ball member 1310 is able to reduce the friction between the bobbin 1110 and the housing 1140 when the bobbin 1110 is moved in the optical-axis direction. By virtue of rolling motion of the ball member 1310, the bobbin 1110 is movable in a sliding manner in the optical-axis direction in the state of being in contact with the ball member 1310.

Although the ball member 1310 may be made of, for example, a metal material, a plastic material, or a resin material, the disclosure is not limited thereto.

The ball member 1310 may have a circular shape, and may have a sufficient diameter to support movement of the bobbin 1110 in the optical-axis direction.

For example, the ball member 1310 may be disposed between the second side portion 1011B (or the second side surface or the second outer surface) of the bobbin 1110 and the second side portion 1012B of the housing 1140. For example, the ball member 1310 may be disposed opposite the first magnet 1132.

For example, at least a portion of the ball member 1310 may be disposed in the groove 1117 in the bobbin 1110. For example, the ball member 1310 may be disposed between the groove 1117 in the bobbin 1110 and the inner surface of the housing 1140, and may be in contact with the groove 1117 in the bobbin 1110 and the inner surface of the housing 1140.

The ball member 1310 may include at least one ball member. For example, the ball member 1310 may include two or more ball members 1310A and 1310B.

For example, the ball member 1310 may include a first ball member 1310A, which is disposed between the first groove 1117A in the bobbin 1110 and the second side portion 1012B of the housing 1140, and a second ball member 1310B, which is disposed between the second groove 1117B in the bobbin 1110 and the second side portion 1012B of the housing 1140.

For example, the first ball member 1310A may include a plurality of balls B1 to B3, and the second ball member 1310B may include a plurality of balls B4 to B6.

For example, at least a portion of the ball member 1310 may be disposed in the first groove 1117A in the bobbin 1110, and may be in contact with the first groove 1117A. At least another portion of the ball member 1310 may be in contact with the inner surface of the second side portion 1012B of the housing 1140.

Figure 20B:
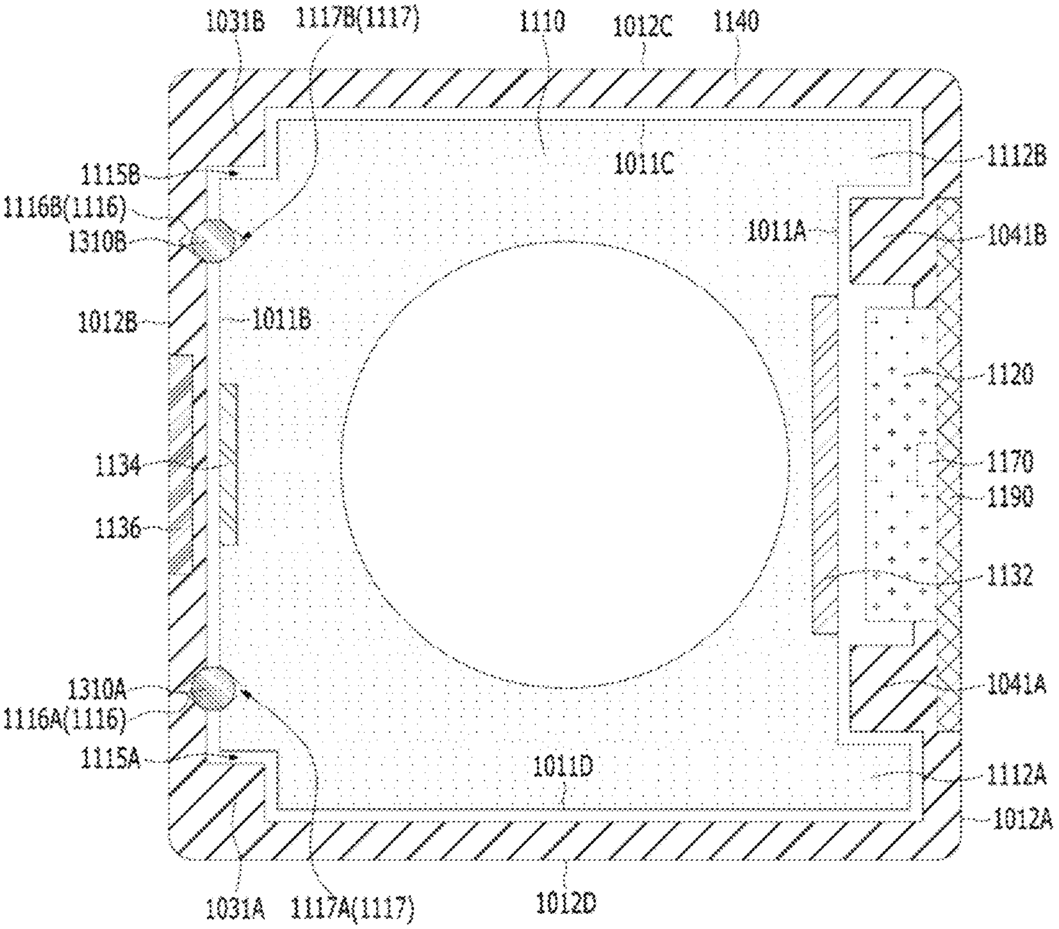
FIG. 20B illustrates a modification of the embodiment shown in FIG. 20A.

FIG. 20B illustrates a modification of the embodiment shown in FIG. 20A.

Referring to FIG. 20B, the housing 1140 may include a groove 1116, which corresponds to or faces the groove 1117 in the bobbin 1110.

For example, the groove 1116 may be formed in the second side portion 1012B of the housing 1140. For example, the groove 1116 may be formed in the inner surface of the second side portion 1012B of the housing 1140. The description of the shape of the groove 1117 in the bobbin 1110 may be applied to the groove 1116 in the housing 1140 with or without modification.

For example, the groove 1116 may include a first grove 1116A, which corresponds to or faces the first groove 1117A in the bobbin 1110, and a second groove 1116B, which corresponds to or faces the second groove 1117B in the bobbin 1110.

At least a portion of the ball member 1310 may be disposed in the groove 1117 in the bobbin 1110, and may be in contact with the groove 1117 in the bobbin 1110. For example, there may be one or more contact points between at least a portion of the ball member 1310 and the groove 1117 in the bobbin 1110.

At least another portion of the ball member 1310 may be disposed in the groove 1116 in the housing 1140, and may be in contact with the groove 1116 in the housing 11140. For example, there may be one or more contact points between the at least another portion of the ball member 1310 and the groove 1116 in the housing 1140.

By virtue of the attractive force acting between the yoke 1136 and the second magnet 1134, the ball member 1310 may be pressed by the bobbin 1110 and/or the housing 1140, and may stably support the bobbin 1110.

Although the yoke 1136 is disposed on the housing 1140 and the second magnet 1134 is disposed on the bobbin 1110 in the embodiment shown in FIG. 17, the disclosure is not limited thereto. In another embodiment, the yoke 1136 may be disposed on the second side portion 1011B of the bobbin 1110, and the second magnet 1134 may be disposed on the second side portion 1012B of the housing 1140.

The cover member 1300 may accommodate therein the housing 1140.

The cover member 1300 may have the form of a box, which is open at the lower portion thereof and includes an upper plate 1301 and side plates 1302. The side plates 1302 of the cover member 1300 may extend downwards from the upper plate 1301 of the cover member 1300. The upper plate 1301 of the cover member 1300 may have a polygonal shape, for example, a quadrilateral shape or an octagonal shape, and may have a bore formed therethrough so as to allow a lens or a lens module 400 to be exposed to external light.

Although the cover 1300 may be made of a non-magnetic material such as SUS or plastic in order to prevent the cover member 1300 from being attracted to the magnets 1132 and 1134, the cover member 1300 may also be made of a magnetic material so as to serve as a yoke.

Figure 21A:
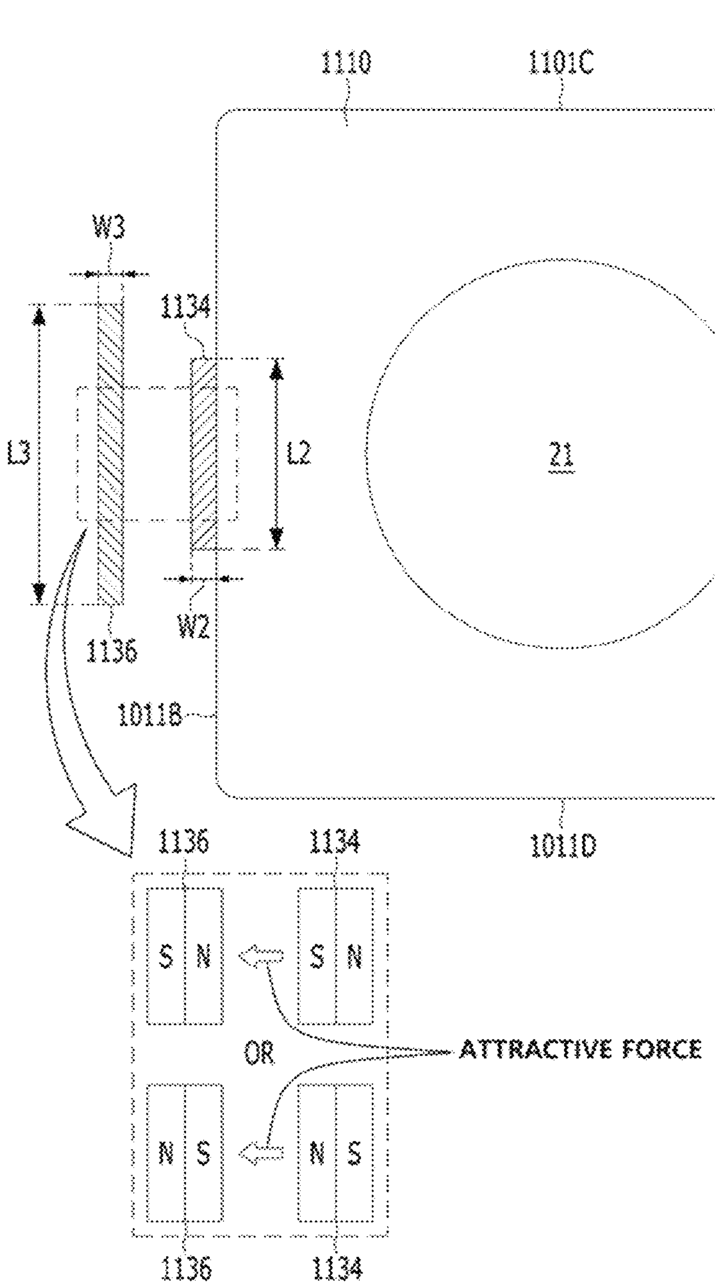
FIG. 21A is a plan view of the first magnet, the coil, the second magnet, and the yoke according to an embodiment.

FIG. 21A is a plan view illustrating an embodiment of the first magnet 1132, the coil 1120, the second magnet 1134, and the yoke 1136.

Referring to FIG. 21A, for example, the length L1 of the first magnet 1132 in the vertical direction may be greater than the length L2 of the second magnet 1134 in the vertical direction. The reason for this is to assure sufficient electromagnetic force for AF operation by increasing the length of the first magnet 1132 in the vertical direction because the first magnet 1132 is a drive magnet for AF operation.

In another embodiment, the length L1 of the first magnet 1132 in the vertical direction may be equal to the length L2 of the second magnet 1134 in the vertical direction. In a further embodiment, the length of the first magnet 1132 in the vertical direction may be less than the length of the second magnet 1134 in the vertical direction.

The length L3 of the yoke 1136 in the vertical direction may be greater than the length L2 of the second magnet 1134 in the vertical direction.

For example, the surface area of the first surface of the yoke 11136, which faces the second magnet 134, may be larger than the surface area of the first surface of the second magnet 1134, which faces the yoke 1136.

For example, the length L3 of the yoke 1136 in the vertical direction may be three or more times the length L2 of the second magnet 1134 in the vertical direction. Alternatively, for example, the length L3 of the yoke 1136 in the vertical direction may be five or more times and ten or less times the length L2 of the second magnet 1134 in the vertical direction.

The reason for this is to increase the attractive force acting between the yoke 1136 and the second magnet 1134 by increasing the length of the yoke 1136 such that the yoke 1136 is subjected to a sufficient magnetic force of the second magnet 1134.

For example, the "vertical direction" may be a direction which is perpendicular to the optical-axis direction and is directed toward the fourth side portion 1011D from the third side portion 1011C of the bobbin 1110. Alternatively, the "vertical direction" may be a direction, which is perpendicular to the optical-axis direction and is parallel to the first side portion 1011A or the second side portion 1011B.

The length W1 of the first magnet 1132 in the horizontal direction may be greater than the length W2 of the second magnet 1134 in the horizontal direction. The reason for this is to assure sufficient electromagnetic force for AF operation by increasing the length of the first magnet 1132 in the horizontal direction because the first magnet 1132 is a drive magnet for AF operation. In another embodiment, the length W1 of the first magnet 1132 in the horizontal direction may be equal to the length W2 of the second magnet 1134 in the horizontal direction. In a further embodiment, the length W1 of the first magnet 1132 in the horizontal direction may be less than the length W2 of the second magnet 1134 in the horizontal direction.

For example, the "horizontal direction" may be a direction perpendicular to the "vertical direction".

Alternatively, for example, the "horizontal direction" may be a direction, which is perpendicular to the optical-axis direction and is directed toward the second side portion 1011B from the first side portion 1011A of the bobbin 1110. Alternatively, the "horizontal direction" may be a direction, which is perpendicular to the optical-axis direction and is parallel to the third side portion 1011C or the fourth side portion 1011D of the bobbin 1110.

For example, the length L1 of the first magnet 1132 in the vertical direction may be equal to or greater than the length L4 of the coil 1120 in the vertical direction. In another embodiment, the length L1 of the first magnet 1132 in the vertical direction may be less than the length L4 of the coil 1120 in the vertical direction.

Furthermore, for example, the length W1 of the first magnet 1132 in the horizontal direction may be equal to or greater than the length W4 of the coil 1120 in the horizontal direction. In another embodiment, the length W1 of the first magnet 1132 in the horizontal direction may be less than the length W4 of the coil 1120 in the horizontal direction.

When the yoke 1136 is a magnet, the facing surfaces of the second magnet 1134 and the yoke 1136 may have different polarities in order to allow an attractive force to act between the yoke 1136 and the second magnet 1134.

As illustrated in FIG. 21A, for example, the first surface of the second magnet 1134 may face the first surface of the yoke 1136, the first surface of the second magnet 1134 may have S polarity, and the first surface of the yoke 1136 may have N polarity. Alternatively, for example, the first surface of the second magnet 1134 may have N polarity, and the first surface of the yoke 1136 may have S polarity.

Figure 21B:
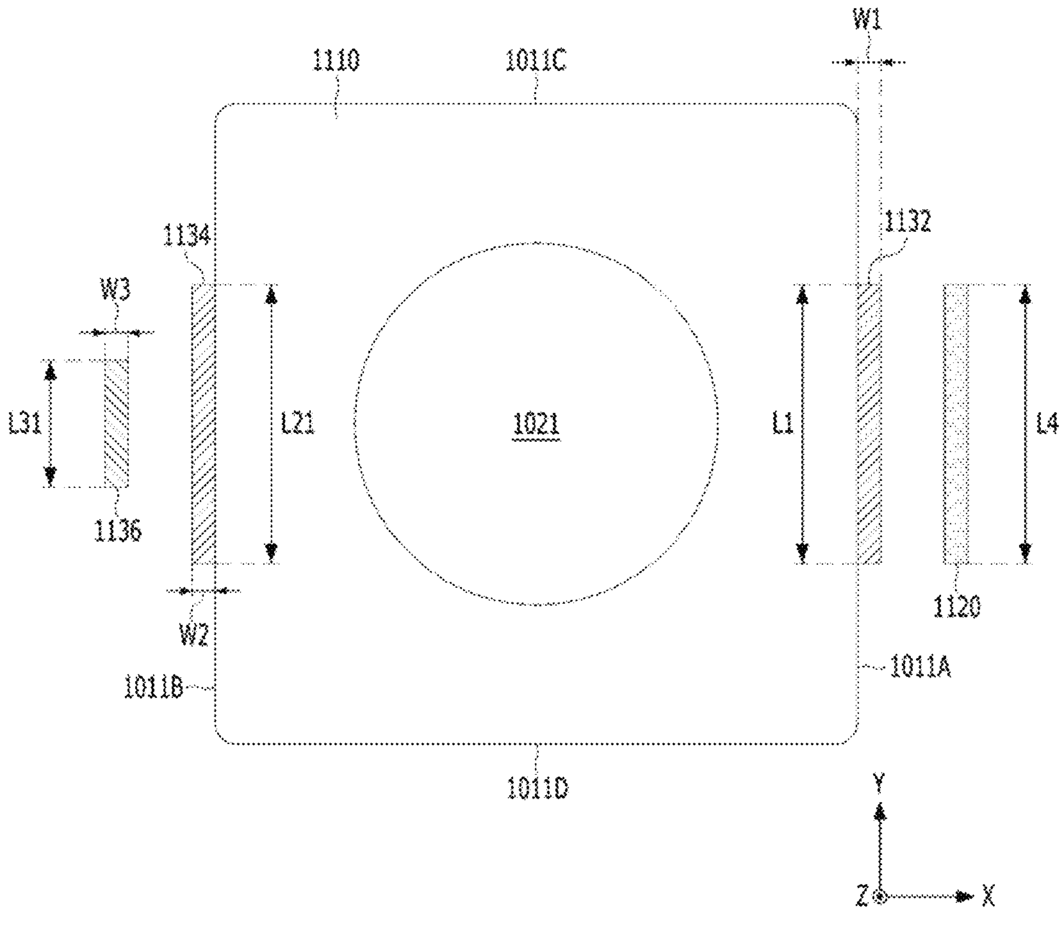
FIG. 21B is a plan view of the first magnet, the coil, the second magnet, and the yoke according to another embodiment.

FIG. 21B is a plan view illustrating another embodiment of the first magnet 1132, the coil 1120, the second magnet 1134, and the yoke 1136. The lengths of the second magnet 1134 and the yoke 1136, shown in FIG. 21B, in the vertical direction may be different from the embodiment shown in FIG. 21A.

Referring to FIG. 21B, the length L21 of the second magnet 1134 in the vertical direction may be less than the length L31 of the yoke 1136 in the vertical direction (L21<L31).

For example, the surface area of the first surface of the yoke 1136, which faces the second magnet 1134, may be smaller than the surface area of the first surface of the second magnet 1134, which faces the yoke 1136.

The length L21 of the second magnet 1134 in the vertical direction may be equal to or less than the length L1 of the first magnet 1132 in the vertical direction. In another embodiment, the length L21 of the second magnet 1134 in the vertical direction may be greater than the length L1 of the first magnet 1132 in the vertical direction.

While the yoke 1136 shown in FIG. 21B is a magnet, the description of the embodiment shown in FIG. 21A may be applied to the polarities of the second magnet 1134 and the yoke 1136 shown in FIG. 21B with or without modification.

In order to prevent tilting of the bobbin 1110 during AF operation, the length of the second magnet 1134 in the optical-axis direction may be different from the length of the yoke 1136 in the optical-axis direction.

Furthermore, for example, the entire region of the second magnet 1134 may overlap the yoke 1136 in a direction perpendicular to the optical-axis direction in the entire zone in which the bobbin 1110 moves in the optical-axis direction.

Figure 22A:
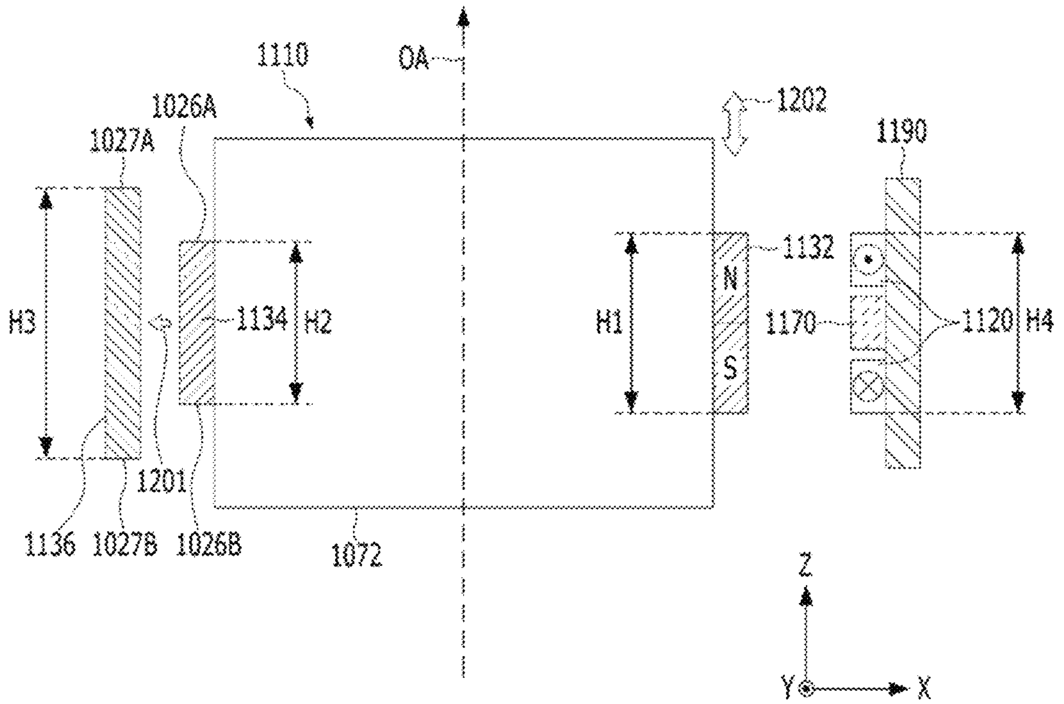
FIG. 22A is a cross-sectional view the first magnet, the coil, the second magnet, and the yoke according to an embodiment, taken in the optical-axis direction.

FIG. 22A is a cross-sectional view of an embodiment of the first magnet 1132, the coil 1120, the second magnet 1134, and the yoke 1136, taken in the direction of the optical axis OA.

Referring to FIG. 22A, the length H1 of the first magnet 1132 in the optical-axis direction may be greater than the length H2 of the second magnet 1134 in the optical-axis direction. The reason for this is to assure sufficient electromagnetic force for AF operation by increasing the length of the first magnet 1132 in the optical-axis direction because the first magnet 1132 is a drive magnet for AF operation.

In another embodiment, the length of the first magnet 1132 in the optical-axis direction may be equal to the length of the second magnet 1134 in the optical-axis direction. In a further embodiment, the length of the first magnet 1132 in the optical-axis direction may be less than the length of the second magnet 1134 in the optical-axis direction.

At least a portion of the first magnet 1132 may overlap at least a portion of the second magnet 1134 in a direction perpendicular to the optical axis OA. Here, the direction perpendicular to the optical axis OA may be a direction which is parallel to a straight line which extends through the optical axis OA and is perpendicular to the optical axis OA.

The length H3 of the yoke 1136 in the optical-axis direction may be greater than the length H2 of the second magnet 1134 in the optical-axis direction (H3>H2).

For example, the length H3 of the yoke 1136 in the optical-axis direction may be 1.5 or more times the length H2 of the second magnet 1134 in the optical-axis direction. For example, the length H3 of the yoke 1136 in the optical-axis direction may be two or more times and five or less times the length H2 of the second magnet 1134 in the optical-axis direction.

The reason why the length H3 is greater than the length H2 is to maintain the attractive force acting between the second magnet 1134 and the yoke 1136 constant in the zone in which the bobbin 1110 moves in the optical-axis direction for AF operation.

The attractive force acting between the second magnet 1134 and the yoke 1136 may be influenced by the range within which the yoke 1136 overlaps the second magnet 1134 in a direction perpendicular to the optical-axis direction.

For example, when the entire region of the second magnet 1134 overlaps the yoke 1136 in a direction perpendicular to the optical-axis direction in the entire zone in which the bobbin 1110 moves in the optical-axis direction, it is possible to maintain the attractive force acting between the second magnet 1134 and the yoke 1136 constant.

In contrast, when at least a portion of the second magnet 1134 does not overlap the yoke 1136 in a direction perpendicular to the optical-axis direction, the attractive force acting between the second magnet 1134 and the yoke 1136 may decrease, thereby causing a case in which the bobbin 1110 is not brought into close contact with the ball member 1310. Hence, the bobbin 110 may be tilted relative to the optical-axis, thereby making it impossible for accurate AF operation to be performed.

Accordingly, in the entire zone in which the bobbin 1110 moves in the optical-axis direction, the upper end 1026A (or the upper surface or the upper portion) of the second magnet 1134 may be positioned lower than the upper end 1027A (or the upper surface or the upper portion) of the yoke 1136, and the lower end 1026B (or the lower surface or the lower portion) of the second magnet 1134 may be positioned higher than the lower end 1027B (or the lower surface or the lower portion) of the yoke 1136. Here, the entire zone for movement of the bobbin may be the position (or the displacement) of the bobbin from the lowest point of the bobbin 1110 to the highest point of the bobbin 1110.

In another embodiment, the upper end 1026A (or the upper surface or the upper portion) of the second magnet 1134 may be flush with the upper end 1027A (or the upper surface or the upper portion) of the yoke 1136 when the bobbin 1110 is positioned at the highest point. Meanwhile, the lower end 1026B (or the lower surface or the lower portion) of the second magnet 1134 may be flush with the lower end 1027B (or the lower surface or the lower portion) of the yoke 1136 when the bobbin 1110 is positioned at the lowest point.

Although the lower end 1027B of the yoke 1136 is positioned higher than the lowest end 1072 of the bobbin 1110 in FIG. 22A, the disclosure is not limited thereto. In another embodiment, the lower end 1027B of the yoke 1136 may be positioned lower than the lowest end 1072 of the bobbin 1110 or may be positioned at the same level as the lowest end 1072 of the bobbin 1110 in FIG. 22A. For example, the lowest end 1072 of the bobbin 1110 may be the lower end or the lower surface of the stopper provided at the lower surface of the bobbin 1110 or a lower side of the bobbin 1110. For example, the lower end 1027B of the yoke 1136 may project downwards beyond the lowest end 1072 of the bobbin 1110.

Figure 22B:
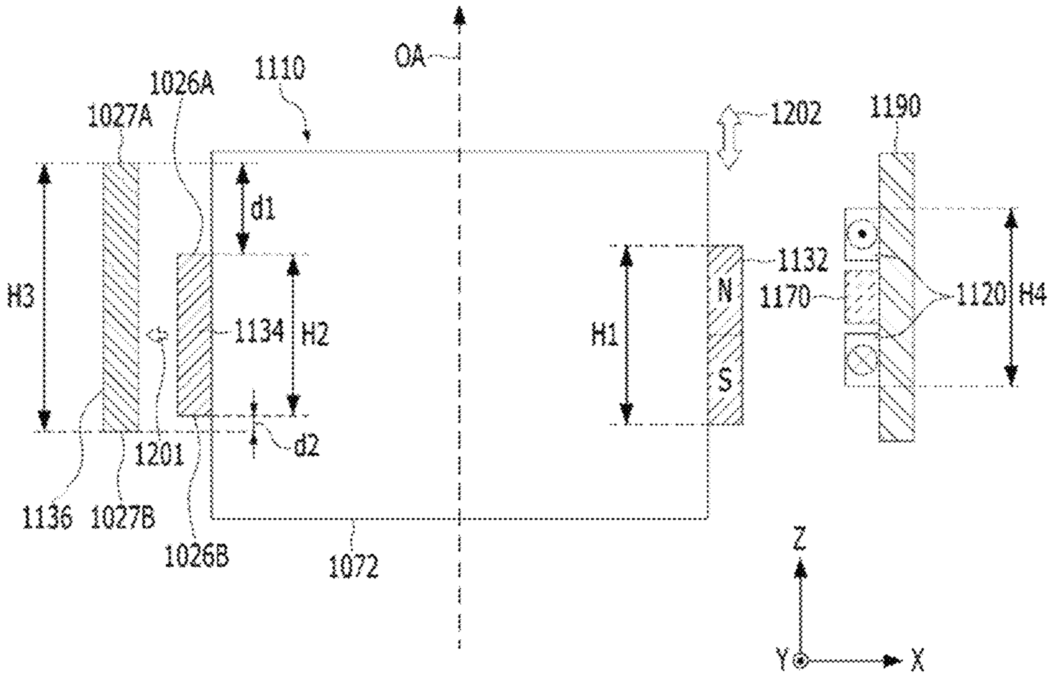
FIG. 22B illustrates the distance between the upper end of the second magnet and the upper end of the yoke when the bobbin shown in FIG. 22A is positioned at the lowest point.

FIG. 22B illustrates the distance between the upper end 1026A of the second magnet 1134 and the upper end 1027A of the yoke 1136 when the bobbin 1110 shown in FIG. 22A is positioned at the lowest point.

Referring to FIG. 22B, the first distance d1 between the upper end 1026A of the second magnet 1134 and the upper end 1027A of the yoke 1136 in the optical-axis direction may be greater than the total stroke distance or the movable distance of the bobbin 1110 in the optical-axis direction when the bobbin 1110 is positioned at the lowest point.

For example, the total stroke distance of the bobbin 1110 may be a distance that the bobbin 1110 moves from the lowest point to the highest point thereof.

For example, the lowest point may be the lowest point of the displacement that the bobbin 1110 moves in the optical-axis direction for AF operation. For example, the lowest point may be the displacement or the position of the bobbin 1110 when the lower end of the bobbin 1110 or the lower stopper of the bobbin 1110 comes into contact with or collides with the stationary portion (for example, the housing 1140).

For example, the highest point may be the highest point of the displacement by which the bobbin 1110 moves in the optical-axis direction for AF operation. For example, the highest point may be the displacement or the position of the bobbin 1110 when the upper end of the bobbin 1110 or the upper stopper of the bobbin 1110 comes into contact with or collides with the stationary portion (or the housing 1140 or the cover member 1300).

For example, the first distance d1 may be one or more times and three or less times the total stroke distance of the bobbin 1110 in the optical-axis direction. Alternatively, for example, the first distance d1 may be 1.5 to two times the total stroke distance of the bobbin 1110 in the optical-axis direction.

In another embodiment, for example, the first distance d1 may be equal to the total stroke distance of the bobbin 1110 in the optical-axis direction.

For example, when the bobbin 110 is positioned at the lowest point, the second distance d2 between the lower end 1026B of the second magnet 1134 and the lower end 1027B of the yoke 1136 in the optical-axis direction may be 0 or greater and may be two or less times the total stroke distance of the bobbin 1110 in the optical-axis direction.

For example, the second distance d2 may be one to two times the total stroke distance of the bobbin 1110 in the optical-axis direction. Alternatively, the second distance d2 may be 0 or greater, and may be 1.5 or less times the total stroke distance of the bobbin 1110 in the optical-axis direction.

Figure 22C:
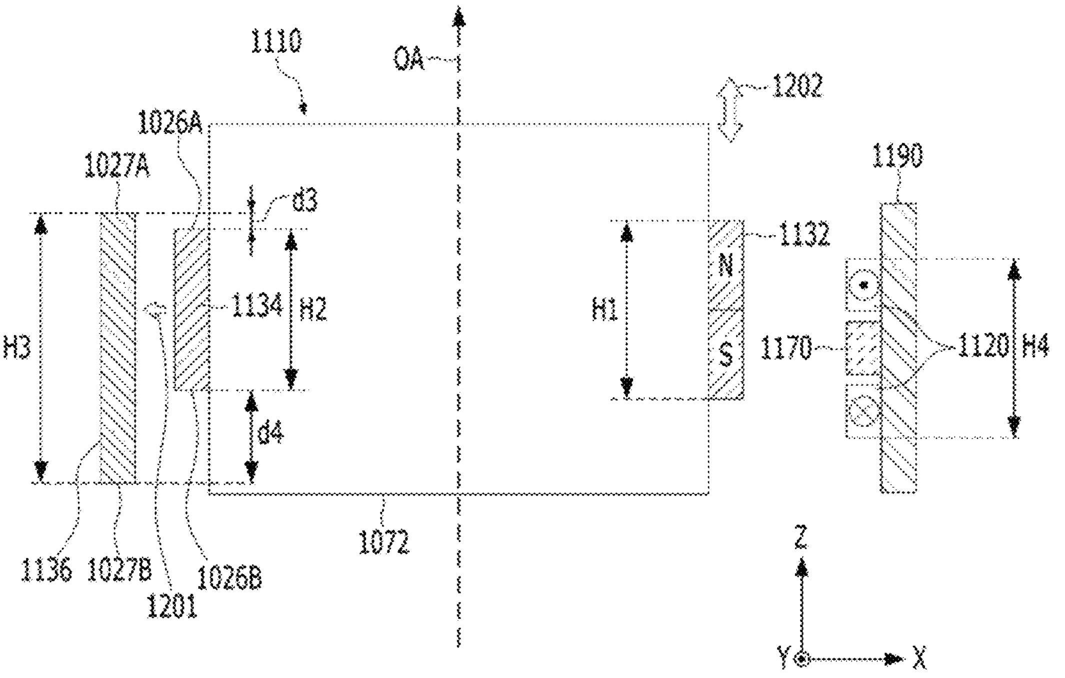
FIG. 22C illustrates the distance between the upper end of the second magnet and the upper end of the yoke when the bobbin shown in FIG. 22A is positioned at the highest point.

FIG. 22C illustrates the distance between the upper end 1026A of the second magnet 1134 and the upper end 1027A of the yoke 1136 when the bobbin 1110 shown in FIG. 22A is positioned at the highest point.

Referring to FIG. 22C, for example, when the bobbin 1110 is positioned at the highest point, the third distance d3 between the upper end 1026A of the second magnet 1134 and the upper end 1027A of the yoke 1136 in the optical-axis direction may be 0 or greater and may be two or less times the total stroke distance of the bobbin 1110 in the optical-axis direction.

For example, the third distance d3 may be one to two times the total stroke distance of the bobbin 1110 in the optical-axis direction. Alternatively, for example, the third distance d3 may be 0 or greater, and may be 1.5 or less times the total stroke distance of the bobbin 1110 in the optical-axis direction.

When the bobbin 1110 is positioned at the highest point, the fourth distance d4 between the lower end 1026B of the second magnet 1134 and the lower end 1027B of the yoke 1136 in the optical-axis direction may be greater than the total stroke distance or the movable distance of the bobbin 1110 in the optical-axis direction.

For example, the fourth distance d4 may be one or more times and three or less times the total stroke distance of the bobbin 1110 in the optical-axis direction. Alternatively, the fourth distance d4 may be 1.5 to two times the total stroke distance of the bobbin 1110 in the optical-axis direction.

When the first distance d1 (or the fourth distance d4) is less than the total stroke distance, the attractive force acting between the second magnet 1134 and the yoke 1136 may not be maintained constant, thereby deteriorating reliability of AF operation. Meanwhile, when the first distance d1 (or the fourth distance d4) is greater than three times the total stroke distance, the size of the yoke 1136 may unnecessarily increase, thereby increasing the size of the lens moving apparatus and the total cost.

In another embodiment, for example, the fourth distance d4 may be equal to the total stroke distance of the bobbin 1110 in the optical-axis direction.

As described in FIGS. 22B and 22C, since the entire region of the second magnet 1134 overlaps the yoke 1136 even when the bobbin 1110 moves in the optical-axis direction for AF operation, it is possible to maintain pressing force applied to the first ball member 1310 constant, and it is possible to suppress tilting of the bobbin 1110 and thus to assure reliability of AF operation.

In another embodiment, the region in which the second magnet 1134 overlaps the yoke 1136 in a direction perpendicular to the optical-axis direction in the entire zone in which the bobbin 1110 moves in the optical-axis direction may be 50% or more of the total volume of the second magnet 1134.

Figure 23A:
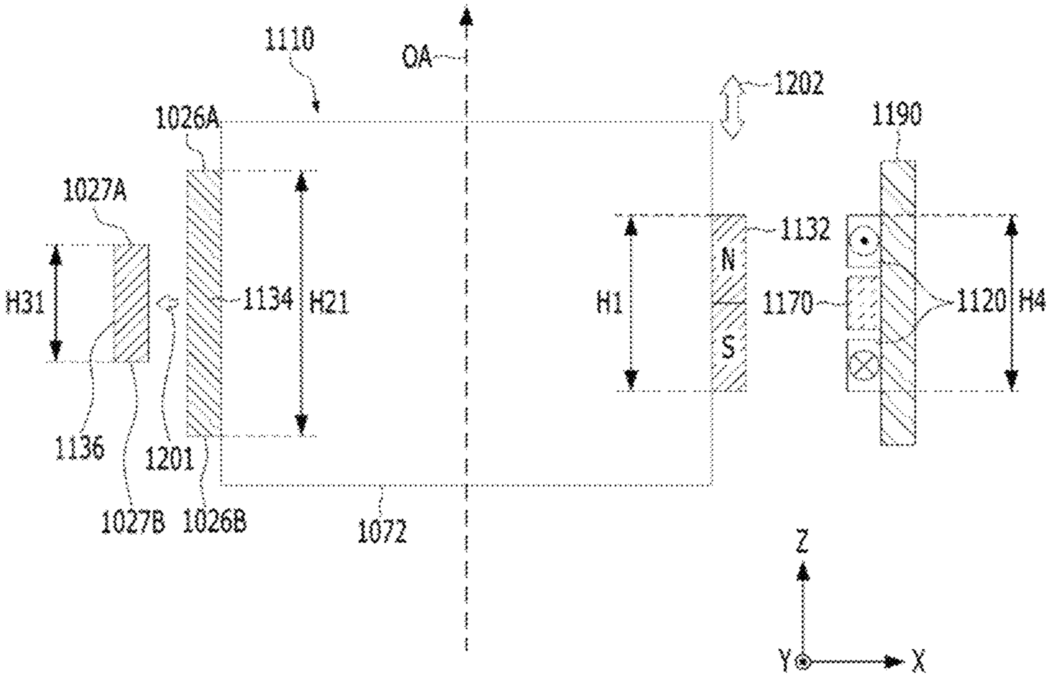
FIG. 23A is a cross-sectional view of the first magnet, the second magnet, and the yoke according to another embodiment, taken in the optical-axis direction.

FIG. 23A is a cross-sectional view of another embodiment of the first magnet 1132, the coil 1120, the second magnet 1134, and the yoke 1136, taken in the direction of the optical axis OA.

Referring to FIG. 23A, the length H21 of the second magnet 1134 in the optical-axis direction may be greater than the length H1 of the first magnet 1132 in the optical-axis direction (H21>H1).

The length H31 of the yoke 1136 in the optical-axis direction may be less than the length H21 of the second magnet 1134 in the optical-axis direction. The reason why the length H21 is greater than the length H31 is to maintain the attractive force acting between the second magnet 1134 and the yoke 1136 in the zone in which the bobbin 1110 moves in the optical-axis direction for AF operation, constant.

Accordingly, in the entire zone in which the bobbin 1110 moves in the optical-axis direction, the upper end 1027A (or the upper surface or the upper portion) of the yoke 1136 may be positioned lower than the upper end 1026A (or the upper surface or the upper portion) of the second magnet 1134, and the lower end 1027B (or the lower surface or the lower portion) of the yoke 1136 may be positioned higher than the lower end 1026B (or the upper surface or the upper portion) of the second magnet 1134.

In another embodiment, when the bobbin 1110 is positioned at the highest point, the upper end 1027A (or the upper surface of the upper portion) of the yoke 1136 may be flush with the upper end 1026A (or the upper surface or the upper portion) of the second magnet 1134. Furthermore, when the bobbin 1110 is positioned at the lowest point, the lower end 1027B (or the lower surface or the lower portion) of the yoke 1136 may be flush with the lower end 1026B (or the lower surface or the lower portion) of the second magnet 1134.

Figure 23B:
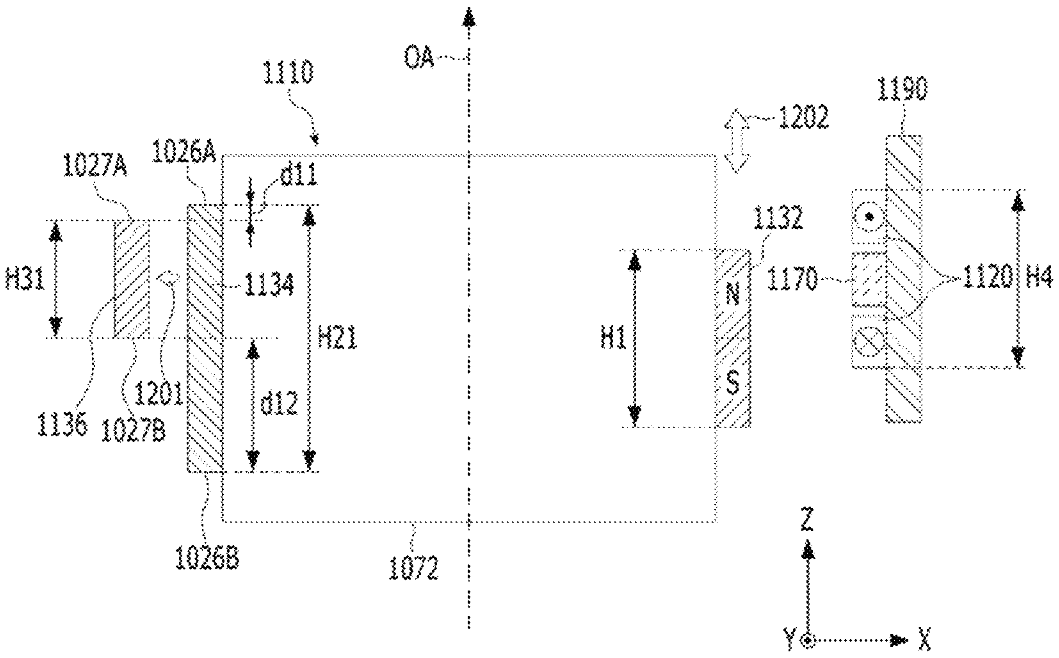
FIG. 23B illustrates the distance between the upper end of the second magnet and the upper end of the yoke when the bobbin shown in FIG. 23A is positioned at the lowest point.

FIG. 23B illustrates the distance between the upper end 1026A of the second magnet 1134 and the upper end 1027A of the yoke 1136 when the bobbin 1110 is positioned at the lowest point.

Referring to FIG. 23B, when the bobbin 1110 is positioned at the lowest point, the first distance d11 between the upper end 1026A of the second magnet 1134 and the upper end 1027A of the yoke 1136 in the optical-axis direction may be 0 or greater and may be two or less times the total stroke distance of the bobbin 1110 in the optical-axis direction.

For example, the first distance d11 may be one to two times the total stroke distance of the bobbin 1110 in the optical-axis direction. Alternatively, for example, the first distance d11 may be 0 or greater and may be 1.5 or less times the total stroke distance of the bobbin 1110 in the optical-axis direction.

When the bobbin 1110 is positioned at the lowest point, the second distance d12 between the lower end 1026B of the second magnet 1134 and the lower end 1027B of the yoke 1136 in the optical-axis direction may be greater than the total stroke distance or the movable distance of the bobbin 1110 in the optical-axis direction.

For example, the second distance d12 may be one or more times and three or less times the total stroke distance of the bobbin 1110 in the optical-axis direction. Alternatively, for example, the second distance d12 may be 1.5 to two times the total stroke distance of the bobbin 1110 in the optical-axis direction.

In another embodiment, for example, the second distance d12 may be equal to the total stroke distance of the bobbin 1110 in the optical-axis direction.

Figure 23C:
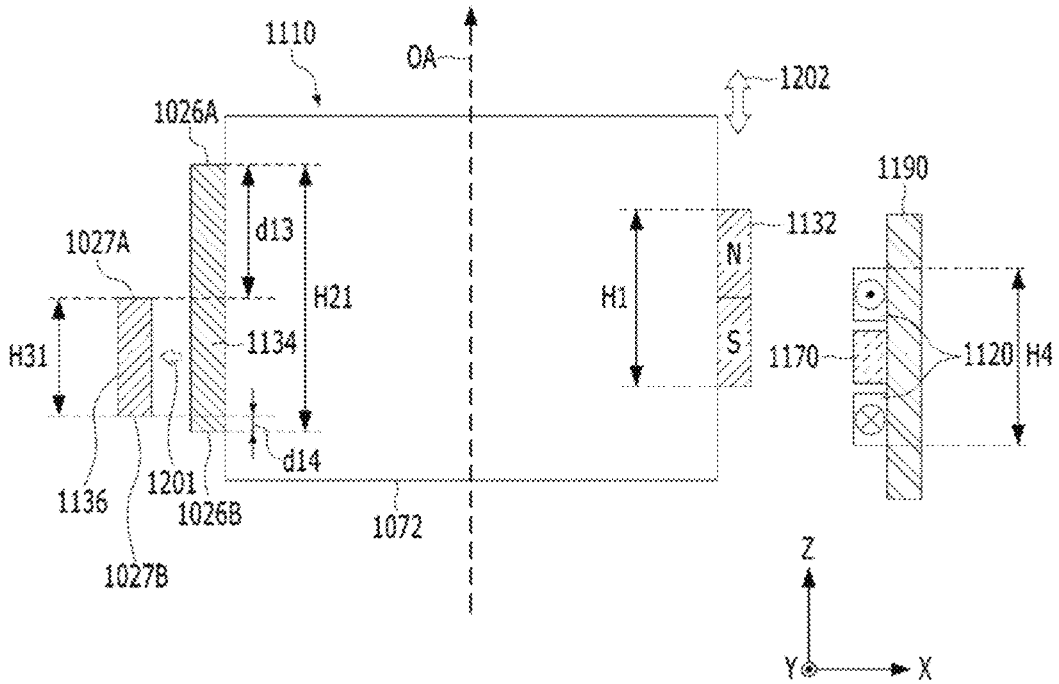
FIG. 23C illustrates the distance between the upper end of the second magnet and the upper end of the yoke when the bobbin shown in FIG. 23A is positioned at the highest point.

FIG. 23C illustrates the distance between the upper end 1026A of the second magnet 1134 and the upper end 1027A of the yoke 1136 when the bobbin 1110 is positioned at the highest point.

Referring to FIG. 23C, when the bobbin 1110 is positioned at the highest point, the third distance d13 between the upper end 1026A of the second magnet 1134 and the upper end 1027A of the yoke 1136 in the optical-axis direction may be greater than the stroke range or the movable distance of the bobbin 1110 in the optical-axis direction.

For example, the third distance d13 may be one or more times and three or less times the total stroke distance of the bobbin 1110 in the optical-axis direction. Alternatively, for example, the third distance d13 may be 1.5 to two times the total stroke distance of the bobbin 1110 in the optical-axis direction.

In another embodiment, for example, the third distance d13 may be equal to the total stroke distance of the bobbin 1110 in the optical-axis direction.

For example, when the bobbin 1110 is positioned at the highest point, the fourth distance d14 between the lower end 1026B of the second magnet 1134 and the lower end 1027A of the yoke 1136 in the optical-axis direction may be 0 or greater and may be two or less times the total stroke distance of the bobbin 1110 in the optical-axis direction.

For example, the fourth distance d14 may be one to two times the total stroke distance of the bobbin 1110 in the optical-axis direction. Alternatively, for example, the fourth distance d14 may be 0 or greater and may be 1.5 or less times the total stroke distance of the bobbin 1110 in the optical-axis direction.

When the second distance d12 (or the third distance d13) is less than the total stroke distance, the attractive force acting between the second magnet 1134 and the yoke 1136 may not be maintained constant, thereby deteriorating reliability of AF operation. When the second distance d12 (or the third distance d13) is greater than three times the total stroke distance, the size of the second magnet 1134 may unnecessarily increase, thereby increasing the size of the lens moving apparatus and the total cost.

As described in FIGS. 23B and 23C, since the entirety of the yoke 1132 overlaps the second magnet 1134 in a direction perpendicular to the optical-axis direction even when the bobbin 1110 moves in the optical-axis direction for AF operation, the pressing force applied to the first ball member 1310 may be maintained constant, thereby suppressing tilting of the bobbin 1110 and assuring reliability of AF operation.

Figure 24A:
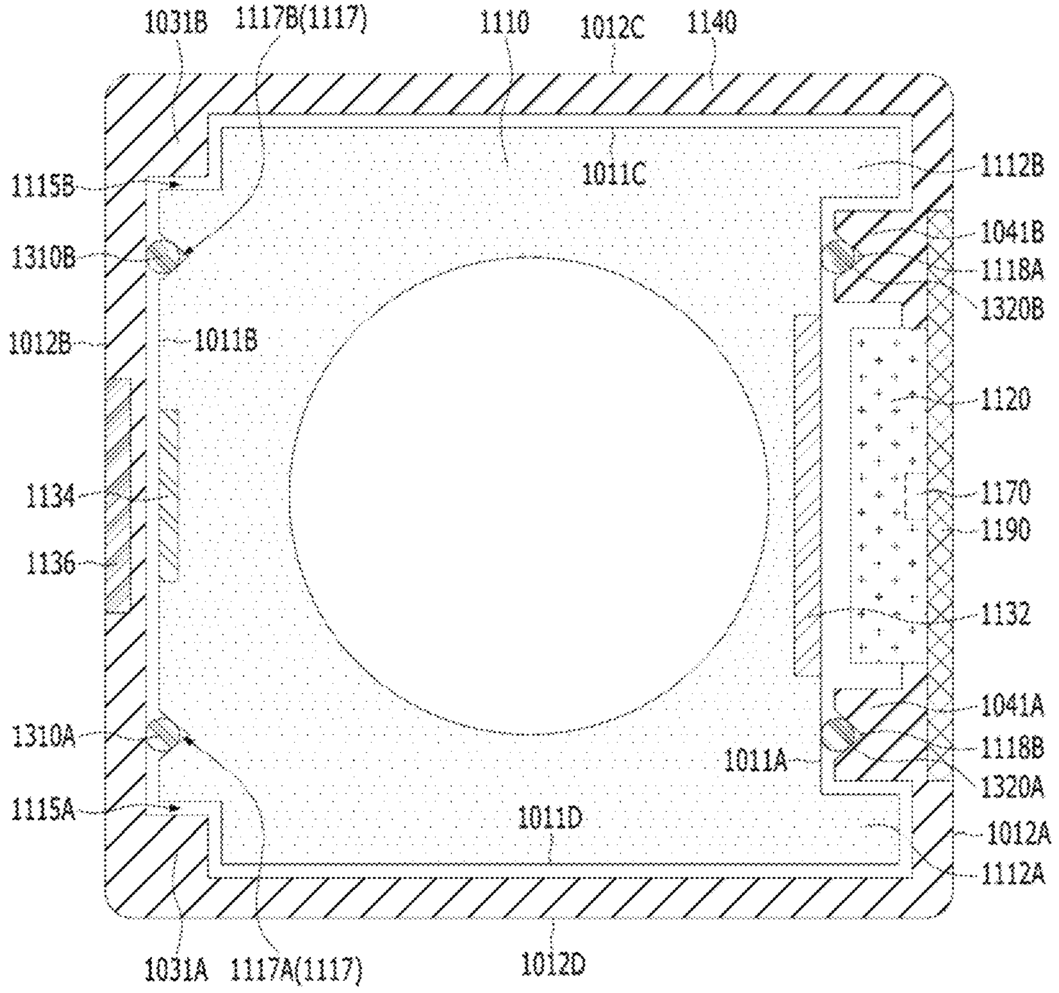
FIG. 24A is a plan view a lens moving apparatus according to another embodiment.
Figure 24B:
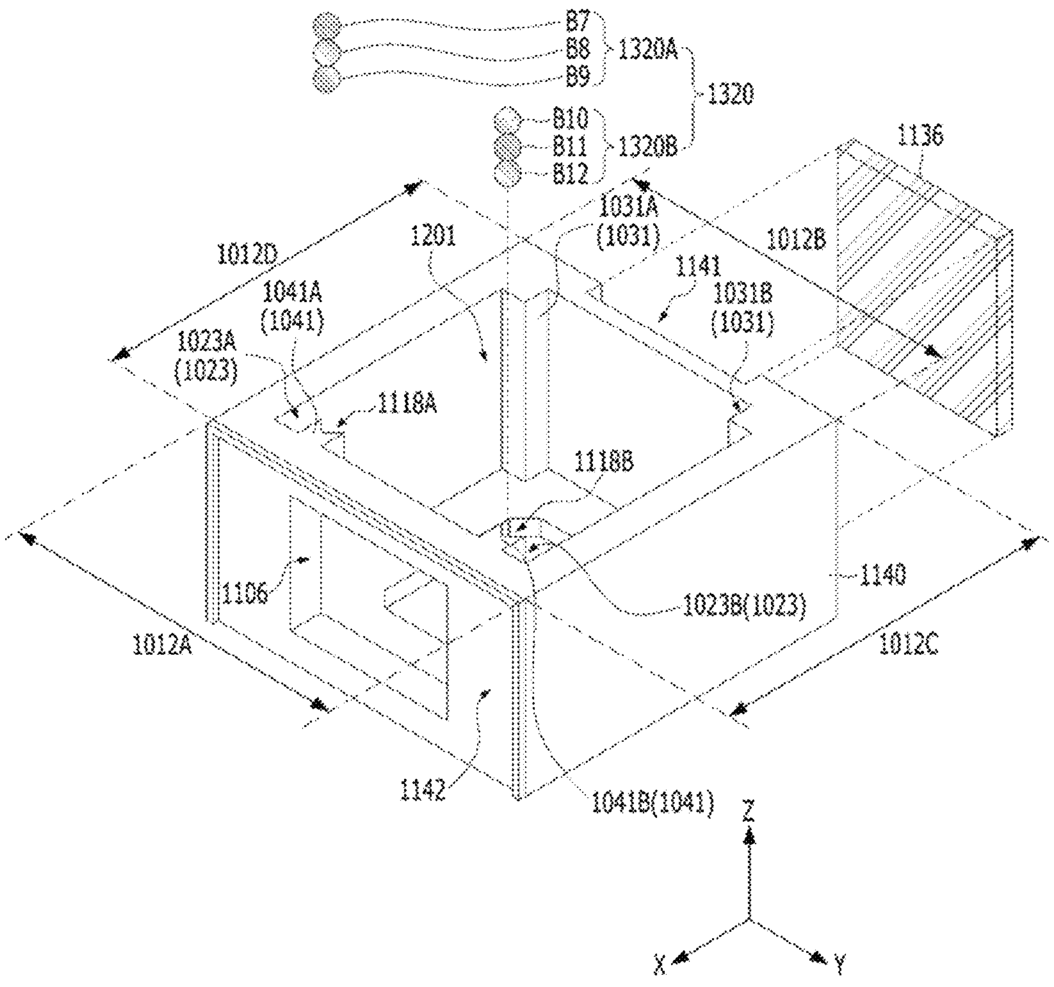
FIG. 24B is a perspective view of the housing, the ball member, and the yoke shown in FIG. 24A.

FIG. 24A is a plan view of the lens moving apparatus according to another embodiment. FIG. 24B is a perspective view of the housing 1140, a ball member 1320, and the yoke 1136, which are shown in FIG. 24A. The embodiment shown in FIGS. 24A and 24B may be a modification of the embodiment shown in FIGS. 19 and 20A.

The lens moving apparatus according to the embodiment shown in FIGS. 24A and 24B may further include the ball member 1320 in addition to the embodiment shown in FIGS. 16 and 20A.

The ball member 1320 may be disposed between the first side portion 1011A of the bobbin 1110 and the first side portion 1012A of the housing 1140. For example, the housing 1140 may include one or more grooves 1118A and 1118B in which the ball member 1320 is disposed or received.

For example, the grooves 1118A and 1118B may be formed in the first side portion 1012A of the housing. The grooves 1118A and 1118B may have a structure that is depressed from the inner surface of the first side portion 1012A of the housing 1140.

For example, the grooves 1118A and 1118B may be formed in the projection 1041 (or the protrusion) of the housing 1140. For example, the grooves 1118A and 1118B may be formed in the side surface of the projection 1041 of the housing 1140, which faces the first side portion 1011A (or the first side surface or the first outer surface) of the bobbin 1110.

For example, the grooves 1118A and 1118B may be positioned between the coil 1120 and the corner of the housing 1140 adjacent to the first side portion 1012A of the housing 1140.

For example, the housing 1140 may include a first groove 1118A and a second groove 1118B. For example, the first groove 1118A may be positioned between the coil 1120 and a corner of the housing 1140 adjacent to the first side portion 1012A. Furthermore, the second groove 1118B may be positioned between the coil 1120 and the other corner of the housing 1140 adjacent to the first side portion 1012A.

For example, the first groove 1118A may be formed in the first projection 1041A of the housing 1140, and the second groove 1118B may be formed in the second projection 1041B of the housing 1140.

For example, the grooves 1118A and 1118B may have openings, which are formed in the upper surface of the housing 1140. For example, the lower portions of the grooves 1118A and 1118B may not be open but may be closed at the lower surface of the housing 1140. The lower portions of the grooves 1118A and 1118B may have a height difference relative to the lower surface of the housing 1140 in the optical-axis direction. For example, the lower portions of the grooves 1118A and 1118B may be positioned higher than the lower surface of the housing 1140.

Although each of the grooves 1118A and 1118B may have, for example, a triangular shape when viewed from above, the disclosure is not limited thereto. Each of the grooves 1118A and 1118B may have a polygonal shape (for example, a quadrilateral shape, a pentagonal shape or the like). For example, each of the grooves 118A and 118B may be a "V"-shaped or "U"-shaped groove.

In another embodiment, the groove may not be formed in the housing 1140 but be formed in the first side portion 1011A (the first side surface or the first outer surface) of the bobbin 1110 to allow the ball member 1320 to be disposed or received therein.

The ball member 1320 may be disposed between a corresponding one of the grooves 1118A and 1118B in the housing 1140 and the first side portion 1011A of the bobbin 1110. The ball member 1320 may be in contact with a corresponding one of the grooves 1118A and 1118B in the housing 1140 and the first side portion 1011A of the bobbin 1110.

At least a portion of the ball member 1320 may be disposed in and in contact with a corresponding one of the grooves 1118A and 1118B in the housing 1140. There may be one or more contact points between at least a portion of the ball member 1320 and a corresponding one of the grooves 1118A and 1118B in the housing 1140.

The ball member 1320 may include at least one ball member. For example, the ball member 1320 may include two or more ball members 1320A and 1320B. For example, the ball member 1320 may include a third ball member 1320A and a fourth ball member 1320B.

The third ball member 1320A may be disposed or received in the first groove 1118A in the housing 1140, and the fourth ball member 1320B may be disposed or received in the second groove 1118B in the housing 1140.

The description of the shape and the material of the ball member 1320 shown in FIG. 20A may be applied to the ball member 1320 shown in FIGS. 24A and 14B with or without modification.

In comparison with the embodiment shown in FIG. 20A, the embodiment shown in FIGS. 24A and 24B is able to further reduce friction between the bobbin 110 and the housing 1140 by means of the ball member 1320, to reduce driving force required for normal AF operation, and to reduce power consumption.

Figure 25A:
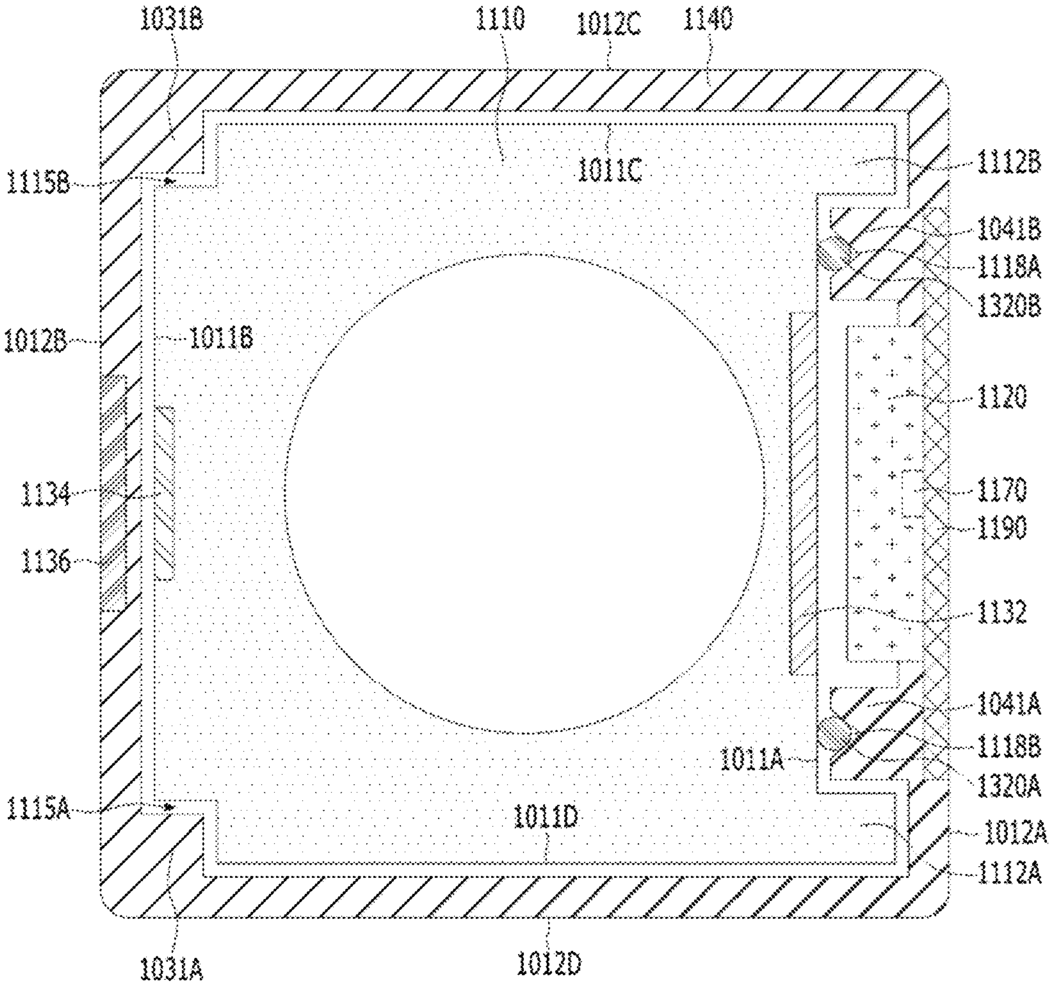
FIG. 25A is a plan view of a lens moving apparatus according to a further embodiment.
Figure 25B:
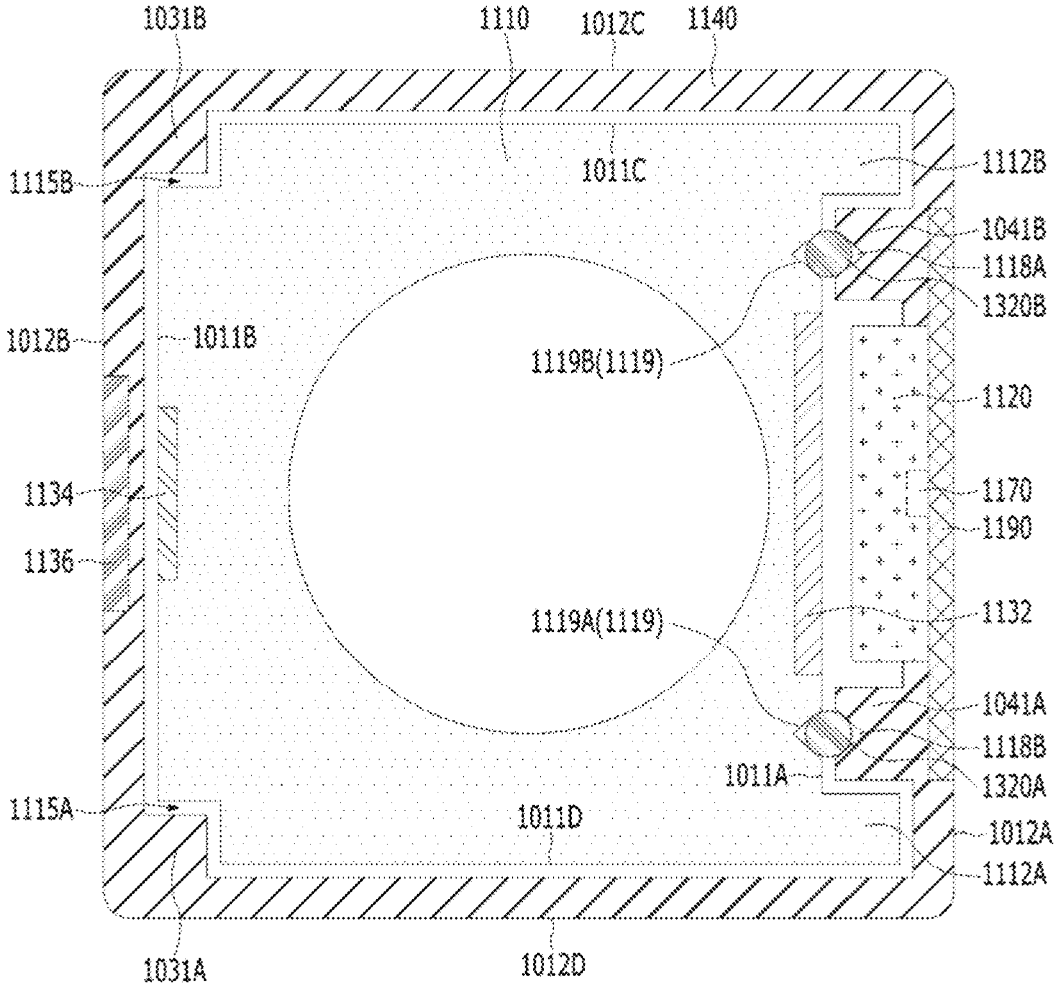
FIG. 25B illustrates a modification of the embodiment shown in FIG. 25A.

In a modification of the embodiment shown in FIG. 24A, the housing 1140 may include the groove 1116 shown in FIG. 20B, and the bobbin 1110 may include the groove 1119 shown in FIG. 25B.

Figure 26:
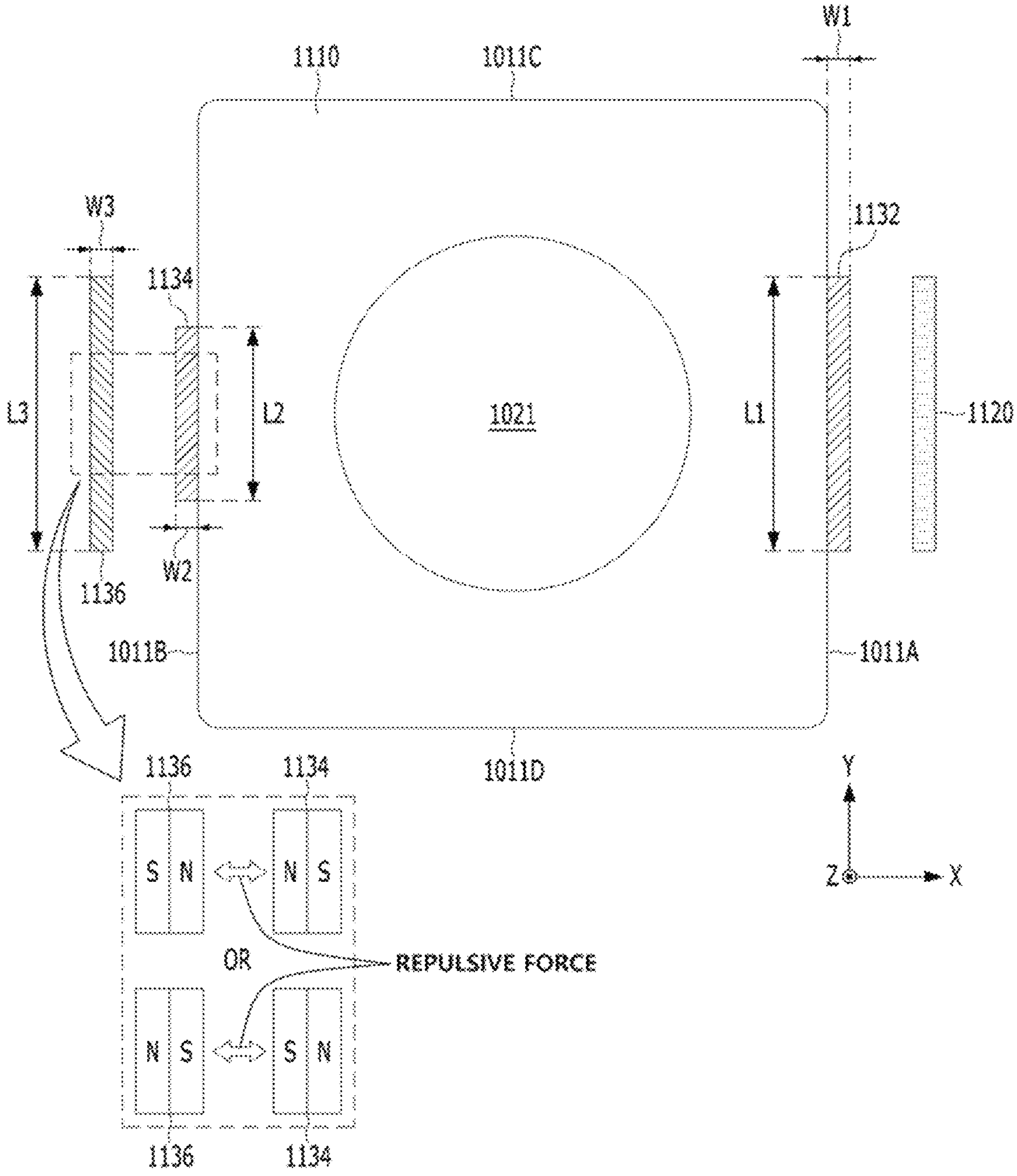
FIG. 26 is a plan view of the first magnet, the coil, the second magnet, and the yoke of the lens moving apparatus shown in FIG. 25.

FIG. 25A is a plan view of the lens moving apparatus according to a further embodiment. FIG. 26 is a plan view of the first magnet 1132, the coil 1120, the second magnet 1134, and the yoke 1136 of the lens moving apparatus shown in FIG. 25.

The lens moving apparatus according to the embodiment shown in FIGS. 25A and 26 may be a modification of the lens moving apparatus shown in FIGS. 20A and 24A. In the lens moving apparatus shown in FIGS. 25A and 26, the ball member 1310 shown in FIGS. 20A and 24A may be omitted, the ball member 1320 may be disposed between the first side portion 1011A of the bobbin 1110 and the first side portion 1012A of the housing 1140, and repulsive force may act between the second magnet 1134 and the yoke 1136.

For example, by virtue of the repulsive force acting between the second magnet 1134 and the yoke 1136, the bobbin 1110 (and/or the housing 1140) may press the ball member 1320, and thus the ball member 1320 may stably support the bobbin 1110.

The yoke 1136 may push the second magnet 1134 toward the ball member 1320. Furthermore, the yoke 1136 may push the bobbin 110 toward the ball member 1320. Therefore, the bobbin 1110 may be in close contact with the ball member 1320.

For example, the repulsive force acting between the yoke 1136 and the second magnet 1134 may be 5[gf] or less. Alternatively, the repulsive force acting between the yoke 1136 and the second magnet 1134 may be 1 [gf] to 3[gf]. Alternatively, the repulsive force acting between the yoke 1136 and the second magnet 1134 may be 0.1[gf] to 2[gf].

The yoke 1136 may overlap the first magnet 1132 in a direction parallel to a straight line, which is perpendicular to the optical axis OA and extends through the center of the bobbin 1110. For example, when the first magnet 1132 is a bipolar magnetized magnet, the yoke 1136 may overlap the first magnet 1132 in a direction parallel to a straight line, which is perpendicular to the optical axis OA and extends through the center of the bobbin.

With the exception of the description of the polarities of the second magnet 1134 and the yoke 1136 to which attractive force is applied, the description of the embodiment shown in FIGS. 21A to 23C may be applied to the embodiment shown in FIGS. 25A to 26 with or without modification.

In FIGS. 25A and 26, the yoke 1136 may be a "magnet (for example, a "third magnet"), and the facing surfaces of the second magnet 1134 and the yoke 1136 may have the same polarity in order to cause repulsive force to act between the yoke 1136 and the second magnet 1134 shown in FIG. 26.

As illustrated in FIG. 26, for example, the first surface of the second magnet 1134 may face the first surface of the yoke 1136, the first surface of the second magnet 1134 may have N polarity, and the first surface of the yoke 1136 may have N polarity. Alternatively, for example, the first surface of the second magnet 1134 may have S polarity, and the first surface of the yoke 1136 may have S polarity.

For example, the intensity of the magnetic force of the yoke 1136, which is a magnet, may be lower than the intensity of the magnetic force of the first magnet 1132. Alternatively, in another embodiment, the intensity of the magnetic force of the yoke 1136, which is a magnet, may be equal to or higher than the intensity of the magnetic force of the first magnet 1132.

For example, the intensity of the magnetic force of the yoke 1136, which is a magnet, may be higher than the intensity of the magnetic force of the second magnet 1134. Alternatively, in another embodiment, for example, the intensity of the magnetic force of the yoke 1136, which is a magnet, may be equal to the intensity of the magnetic force of the second magnet 1134. In a further embodiment, for example, the intensity of the magnetic force of the yoke 1136, which is a magnet, may be higher than the intensity of the magnetic force of the second magnet 1134.

The yoke 1136, which is a magnet, and the first magnet 1132 may be made of different materials or components. In another embodiment, the yoke 1136 and the first magnet 1132 may be made of the same material or component.

The second magnet 1132 and the yoke 1136 may be made of the same material or component. In another embodiment, the second magnet 1132 and the yoke 1136 may be made of different materials or components.

The description of the embodiment shown in FIGS. 20A to 23C may be applied to the relationship between the intensity of the magnetic force of the first magnet 1132 and the intensity of the magnetic force of the second magnet 1134 of the embodiment shown in FIG. 26 with or without modification.

In the embodiment shown in FIGS. 25A and 26, because repulsive force acts between the second magnet 1134, which is independent of the first magnet 1132, and the yoke 1136, it is possible to easily and freely design or set the frictional force between the bobbin 1110/the housing 1140 and the ball member 1310.

Accordingly, in the embodiment shown in FIGS. 25A and 26, it is possible to easily and freely design or set the frictional force between the bobbin 1110/the housing 1140 and the ball member 1310, regardless of assurance of the electromagnetic force required for AF operation. Furthermore, since the size of the yoke 1136 is not restricted by the first magnet 1132, it is possible to improve the freedom of the size of the yoke 1136 and thus to improve the design freedom of the lens moving apparatus 1100.

With improvement in function of cellular phones and increase of the number of pixels, the size of an image sensor and a lens aperture are increasing. Particularly, there is trend to increase a lens aperture with the aim of realization of a high number of pixels and improvement in image quality.

Because the weight of the AF moving unit increases when the lens aperture increases, the AF moving unit must be stably supported and tilting of the AF moving unit relative to the optical axis must be suppressed or reduced in order to assure stable and reliable AF operation. In a ball-type lens moving apparatus including a ball member for supporting a bobbin, there is a need to easily adjust or set the frictional force between the bobbin and/or a housing and the ball member according to the weight of the lens.

FIG. 25B illustrates a modification of the embodiment shown in FIG. 25A.

Referring to FIG. 25B, the bobbin 1110 may include the groove 1119, which corresponds to or faces a corresponding one of the grooves 1118A and 1118B in the housing 1140.

For example, the groove 1119 may be formed in the first side portion 1011A of the bobbin 1110. For example, the groove 1119 may be formed in the side surface or the outer surface of the first side portion 1011A of the bobbin 1110. The description of the groove 1117 in the bobbin 1110 may be applied to the groove 1119 in the bobbin 1110 with or without modification.

For example, the groove 1119 may include a first groove 1119A, which corresponds to or faces the first groove 1118A in the housing 1140, and a second groove 1119B, which corresponds to or faces the second groove 1118B in the housing 1140.

At least a portion of the ball members 1320A and 1320B may be disposed in and in contact with the groove 1119 in the bobbin 1110. For example, there may be one contact point between at least a portion of the ball member 1320 and the groove 1119 in the bobbin 1110.

At least another portion of the ball members 1320A and 1320B may be disposed in and in contact with the grooves 1118A and 1118B in the housing 1140. For example, there may be one or more contact points between at least another portion of the ball members 1320A and 1320B and the grooves 1118A and 1118B in the housing 1140.

In comparison with the comparative embodiment of FIG. 13, since attractive force acts between the second magnet 1134, which is independent of the first magnet 1132, and the yoke 1136 in the present embodiment, it is possible to easily and freely design or set the frictional force the bobbin 1110 and/or the housing 1140 and the ball member 1310.

Accordingly, in the present embodiment, there is an effect of being capable of easily and freely designing or setting the frictional force between the bobbin 1110 and/or the housing 1140 and the ball member 1310, regardless of assurance of the electromagnetic force required for AF operation.

Furthermore, because the size of the yoke 1136 is not restricted by the first magnet 1132, it is possible to freely change the size of the yoke 1136 and thus to improve design freedom of the lens moving apparatus 1100.

Figure 27:
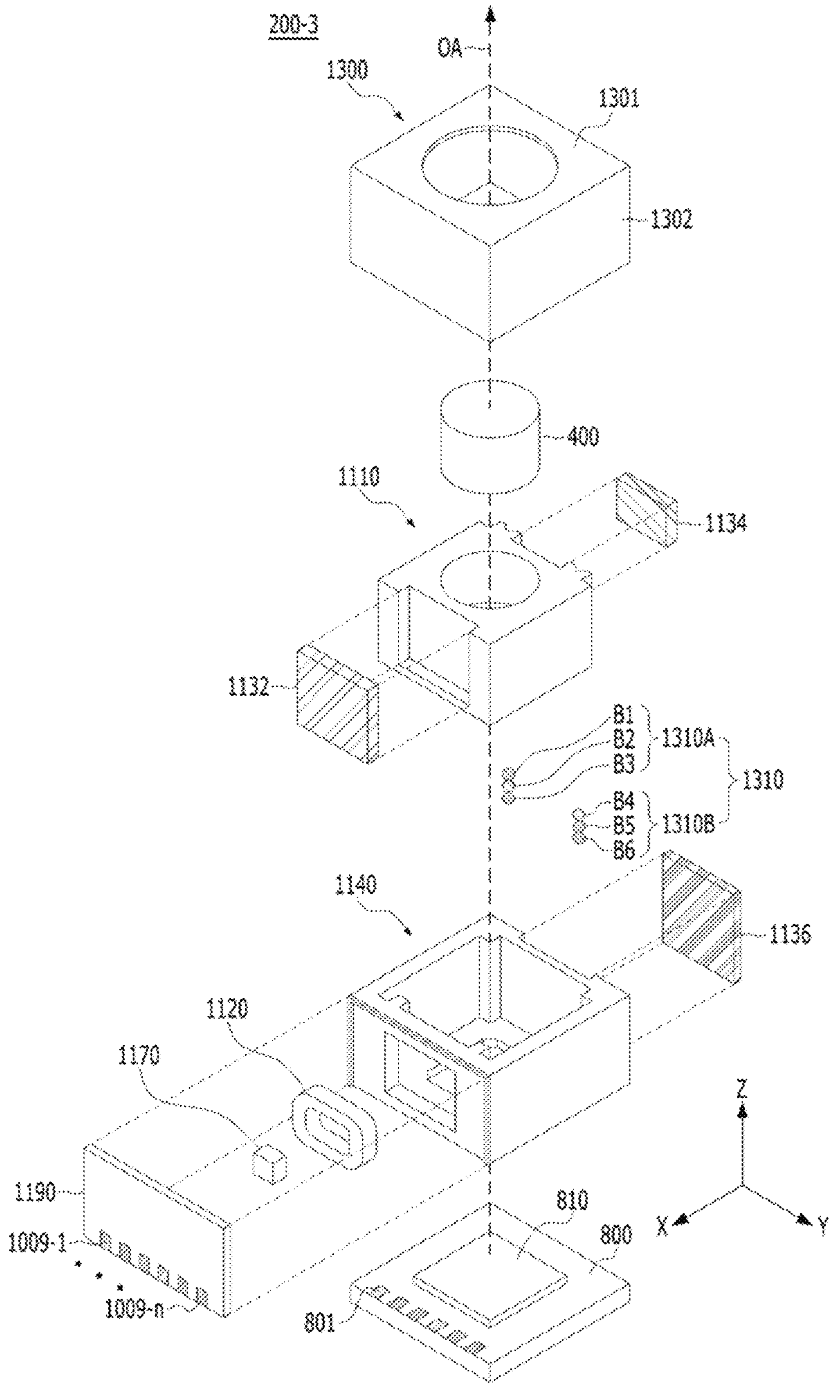
FIG. 27 is an exploded perspective view of a camera module including the lens moving apparatus shown in FIG. 17.

FIG. 27 is an exploded perspective view of a camera module 200-3 including the lens moving apparatus 1100 shown in FIG. 17.

Referring to FIG. 27, the camera module 200-3 may include the lens module 400, the lens moving apparatus 1100, the circuit board 800, and the image sensor 810.

Although not shown in FIG. 27, the camera module 200-3 may further include a "base" disposed between the housing 1140 and the circuit board 800. In addition, the camera module 200-3 may further include a filter positioned between the lens module 400 and the image sensor 810. For example, although the filter may be disposed or seated on the base, the disclosure is not limited thereto. The base may be coupled, attached, or secured to the upper surface of the circuit board 800 using an adhesive member (not shown).

The description of the lens module 400, the circuit board 800, the filter, and the image sensor 810 shown in FIG. 14 may be applied to the embodiment shown in FIG. 27 with or without modification.

Figure 28:
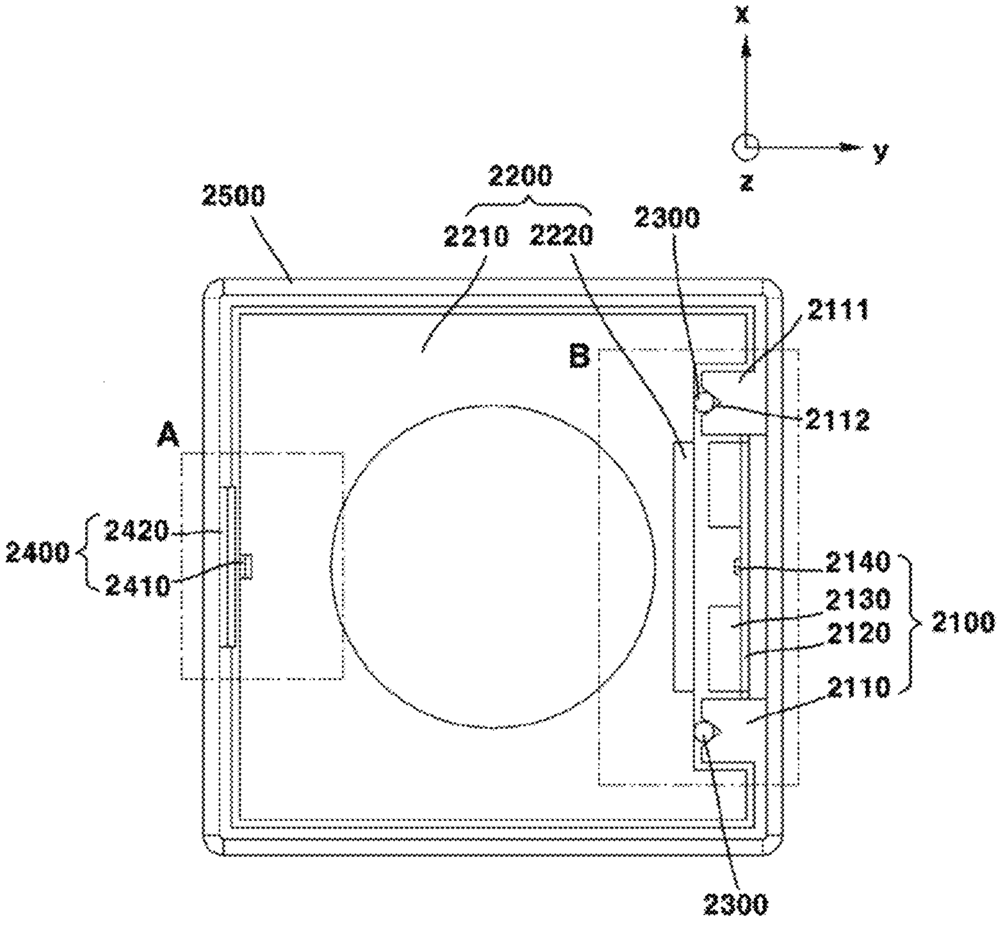
FIG. 28 is a cross-sectional view of a lens moving apparatus according to a further embodiment.
Figure 29:
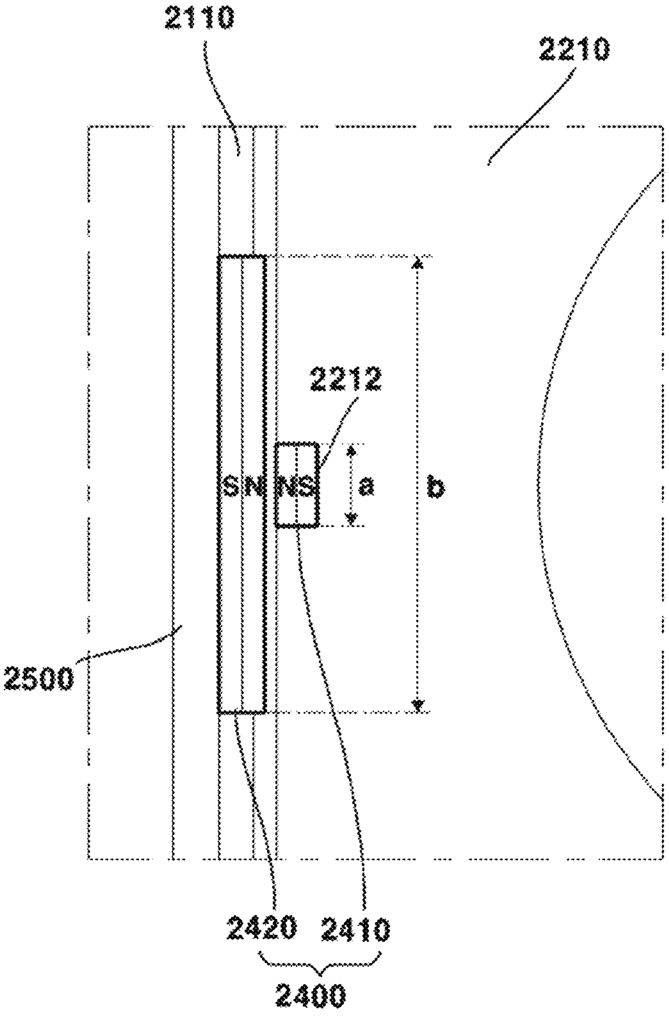
FIG. 29 is an enlarged cross-sectional view of area A in FIG. 28.
Figure 30:
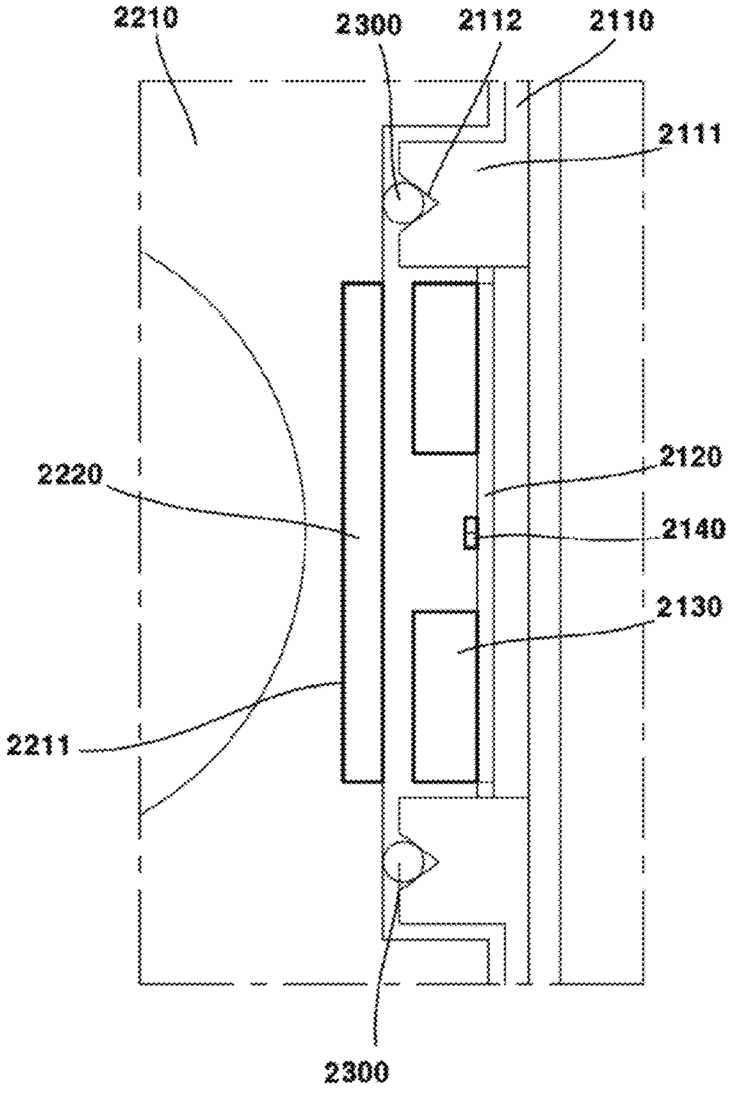
FIG. 30 is an enlarged cross-sectional view of area B in FIG. 28.
Figure 31:
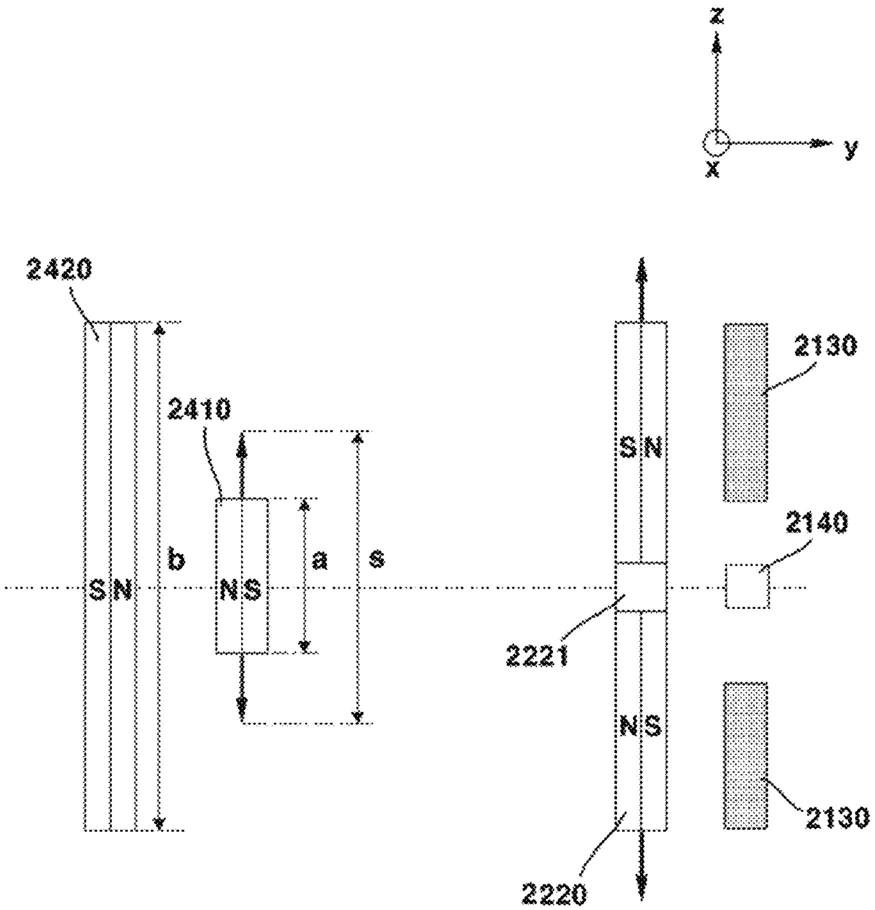
FIG. 31 is a view illustrating disposition of the coil, the Hall sensor, and the first to third magnets of the lens moving apparatus shown in FIG. 28.

FIG. 28 is a cross-sectional view of a lens moving apparatus 2010 according to a further embodiment. FIG. 29 is an enlarged cross-sectional view illustrating area A in FIG. 28. FIG. 30 is an enlarged cross-sectional view illustrating area B in FIG. 28. FIG. 31 is a view illustrating disposition of the coil, the Hall sensor, and the first to third magnets of the lens moving apparatus shown in FIG. 28.

The lens moving apparatus 2010 may be a voice coil motor (VCM). The lens moving apparatus 2010 may be a lens moving motor. The lens moving apparatus 2010 may be a lens moving actuator. The lens moving apparatus 2010 may include an AF module. The lens moving apparatus 2010 may include an OIS module. For example, the lens moving apparatus 2010 may be any one of the embodiments 100, 1100, and 2010 shown in FIGS. 1, 17, and 28.

The lens moving apparatus 2010 may include a stationary unit 2100. The stationary unit 2100 may be a unit in which a component or components, which are relatively immovable during AF operation in comparison with a movable unit 2200, are combined. The stationary unit 2100 may accommodate the movable unit 2200 therein.

The stationary unit 2100 may include a housing 2110. The housing 2110 may be disposed outside a bobbin 2210. The housing 2110 may receive therein at least a portion of the bobbin 2210. The housing 2110 may be disposed in a cover member 2500. The housing 2110 may be disposed between the cover member 2500 and the bobbin 2210. The housing 2110 may be made of a material different from that of the cover member 2500. The housing 2110 may be made of an insulation material. The housing 2110 may be injection-molded. A board 2120 may be disposed on the housing 2110. A coil 2130 may be disposed on the housing 2110.

The housing 2110 may include a projection 2111. The projection 2111 may project inwards from the inner surface of the side wall of the housing 2110. The projection 2111 may project toward the bobbin 2210 from the side wall of the housing 2110. The projection 2111 may include a plurality of projections. The projection 2111 may include two projections. An operation unit may be disposed between the two projections. Here, the operation unit may be a component configured to move the movable unit 2200, and may include a coil 2130 and a first magnet 2220. A ball 2300 may be disposed on the projection 2111.

The housing 2110 may have a groove 2112. The groove 2112 may be a "ball-receiving groove". The ball 2300 may be disposed in the groove 2112. The groove 2112 may receive at least a portion of the ball 2300. The groove 2112 may be formed in the inner surface of the projection 2111. The groove 2112 may be formed such that the ball 2300, which has the form of a sphere, may be in contact with the housing 2110 at two points. The groove 2112 may have a V shape. The groove 2112 may extend in the optical-axis direction. The groove 2112 may extend to the lower surface from the upper surface of the housing 2110 in the optical-axis direction. The groove 2112 may include a plurality of grooves. The groove may include two grooves.

The stationary unit 2100 may include the board 2120. The board 2120 may be disposed on the housing 2110. The board 2120 may include a circuit board. The board 2120 may include a flexible printed circuit board (FPCB). A coil 2130 and a Hall sensor 2140 may be disposed on the inner surface of the board 2120. The board 2120 may be conductively connected to the Hall sensor 2140. The board 2120 may be conductively connected to a printed circuit board 2050. The board 2120 may include a plurality of terminals disposed on the lower end thereof. The plurality of terminals of the board 2120 may be soldered to the terminals of the printed circuit board of the cameral module shown in FIG. 33.

The stationary unit 2100 may include the coil 2130. The coil 2130 may be a "AF operation coil", which is used for AF operation. The coil 2130 may be disposed on the board 2120. The coil 2130 may be disposed on the housing 2110. The coil 2130 may be disposed between the bobbin 2210 and the housing 2110. The coil 2130 may be disposed between the bobbin 2210 and the housing 2110. The coil 2130 may be disposed between the bobbin 2210 and the side plate of the cover member 2500. The coil 2130 may be disposed between the bobbin 2210 and the board 2120. The coil 2130 may face the first magnet 2220. The coil 2130 may be disposed so as to face the first magnet 2220. The coil 2130 may perform electromagnetic interaction with the first magnet 2220. Here, when current is supplied to the coil 2130 and thus an electromagnetic field is formed around the coil 2130, the first magnet 2220 may be moved relative to the coil 2130 by virtue of the electromagnetic interaction between the coil 2130 and the first magnet 2220. The coil 2130 may be composed of a single coil. In a modification, the coil 2130 may include a plurality of coils, which are spaced apart from each other.

When forward current is applied to the coil 2130, the movable unit 2200 may be moved far away from the image sensor 2060. When reverse current is applied to the coil 2130, the movable unit 220 may be moved close to the image sensor 2060.

The stationary unit 2100 may include the Hall sensor 2140. The Hall sensor 2140 may be disposed on the board 2120. The Hall sensor 2140 may be disposed in the coil 2130. The Hall sensor 2140 may include a Hall IC. The Hall sensor 2140 may face the first magnet 2220. The Hall sensor may detect the first magnet 2220. The Hall sensor 2140 may detect magnetic force of the first magnet 2220. The Hall sensor 2140 may detect change in position of the movable unit 220. The Hall sensor 2140 may detect change of position of the bobbin 2210. The Hall sensor 2140 may be replaced with a driver IC including a Hall device therein. The driver IC may be conductively connected to the coil 2130 so as to control current applied to the coil 2130. The Hall sensor 2140 may be disposed outside the coil 2130.

The lens moving apparatus 2010 may include the movable unit 2200. The movable unit 2200 may be a unit to which a component or components configured to be moved relative to the stationary unit 2100 during AF operation are coupled. The movable unit 2200 may be disposed so as to be movable in the stationary unit 2100. The movable unit 2200 may be movable relative to the stationary unit 2100 in the optical-axis direction.

The movable unit 2200 may include the bobbin 2210. The bobbin 2210 may be disposed in the housing 2110. The bobbin 2210 may be disposed in the hole in the housing 2110. The bobbin 2210 may be movably disposed in the housing 2110. The bobbin 2210 may be movable within a first stroke in the optical-axis direction. The bobbin 2210 may be movable relative to the housing 2110 in the optical-axis direction. A lens module 2020 may be coupled to the bobbin 2210. The bobbin 2210 may be coupled to the lens module 2020 using a screw and/or adhesive. The first magnet 2220 may be coupled to the bobbin 2210. The bobbin 2210 may be injection-molded.

The bobbin 2210 may have a first groove 2211. The first groove 2211 may be formed in a first surface of the bobbin 2210. The first groove 2211 may be formed so as to have a structure that is depressed from the first surface of the bobbin 2210. The first groove 2211 may be a "first magnet-receiving groove". The first groove 2211 may receive the first magnet 2220. The first groove 2211 may be formed so as to have size and shape corresponding to the first magnet 2220.

The bobbin 2210 may have a second groove 2212. The second groove 2212 may be formed in a second surface opposite the first surface of the bobbin 2210. The second groove 2212 may be formed so as to have a structure that is depressed from the second surface of the bobbin 2210. The second groove 2212 may be a "second magnet-receiving groove". The second groove 2212 may receive a second magnet 2410 therein. The second groove 2212 may have size and shape corresponding to the second magnet 2410.

The movable unit 2200 may include the first magnet 2220. The first magnet 2220 may move the bobbin 2210. The first magnet 2220 may move the bobbin 2210 by virtue of interaction with the coil 2130. The first magnet 2220 may move the bobbin 2210 by virtue of electromagnetic interaction with the coil 2130. The first magnet 2220 may be disposed on the first surface of the bobbin 2210. The first magnet 2220 may be disposed in the first groove 2211 so as not to project from the first surface of the bobbin 2210.

The first magnet 2220 may include a first surface, which faces the coil 2130, and a second surface opposite the first surface. The first magnet 2220 may be formed such that an upper portion of the first surface of the first magnet 2220 and a lower portion of the second surface of the first magnet 2220 have the same polarity and a lower portion of the first surface of the first magnet 2220 and an upper portion of the second surface of the first magnet 2220 have the same polarity.

The first magnet 2220 may include a neutral portion 2221. The neutral portion 2221 may be formed in the center of the first magnet 2220. The neutral portion 2221 may be disposed in a direction perpendicular to the optical-axis direction. The neutral portion 2221 may include a portion that is neutral in polarity.

The lens moving apparatus 2010 may include the ball 2300. The ball 230 may be disposed between the bobbin 2210 and the housing 2110. The ball 2300 may guide the bobbin 2210 in the optical-axis direction. The ball 2300 may prevent the bobbin 2210 from being moved in a direction perpendicular to the optical-axis direction. The ball 2300 may be a "guide member". The ball 2300 may be formed so as to have a spherical shape. The ball 2300 may be rotatably disposed between the bobbin 2210 and the housing 2110. The ball 2300 may be in contact with the bobbin 2210 at one point. The ball 2300 may be in contact with the housing 2110 at two points. Reversely, the ball 2300 may be in contact with the bobbin 2210 at two points and may be in contact with the housing 2110 at one point.

The ball 2300 may include a plurality of balls. The ball 2300 may include two groups of balls. The two groups of balls may be respectively disposed in the two grooves 2112. Each of the two groups may include a plurality of balls. For example, each of the two groups may include two, three or more balls. Each of a first group of balls may be in contact with both the bobbin 2210 and the housing 2110 at a total of three points. Each of a second group of balls may be in contact with both the bobbin 2210 and the housing 2110 at a total of four points. In other words, the shapes of the bobbin 2210 and the housing 2110, which receive the first group of balls therebetween, may be different from the shapes of the bobbin 2210 and the housing 2110, which receive the second group of bobbins therebetween.

The lens moving apparatus 2010 may include a press unit 2400. The press unit 2400 may press the movable unit 2200 against the ball 2300. The press unit 2400 may press the ball 2300 against the stationary unit 2100. The press unit 2400 may press the bobbin 2210 against the ball 2300. The press unit 2400 may press the ball 2300 against the housing 2110. The press unit 2400 may cause the ball 2330 to be brought into close contact with the bobbin 2210. Therefore, it is possible to maintain the contact between the bobbin 2210 and the ball 2300 and the contact between the ball 2300 and the housing 2110 even when the bobbin 2210 is moved. The press unit 2400 may include a magnet. The press unit 2400 may include a plurality of magnets. The press unit 2400 may include two magnets. The press unit 2400 may use the repulsive force acting between the two magnets.

The lens moving apparatus 2010 may include the second magnet 2410. The press unit 2400 may include the second magnet 2410. The second magnet 2410 may be disposed on the second surface opposite the first surface of the bobbin 2210. The second magnet 2410 may be disposed in the second groove 2212 in the bobbin 2210 so as not to project from the second surface of the bobbin 2210. The second magnet 2410 may be disposed between the first magnet 2220 and a third magnet 2420.

The second magnet 2410 may press the bobbin 2210 to bring the bobbin 2210 into contact with the ball 2300. The second magnet 2410 may press the bobbin 2210 to bring the bobbin 2210 into contact with the ball 2300 by virtue of the interaction with the third magnet 2420. The second magnet 2410 and the third magnet 2420 may be disposed such that the same polarities thereof face each other. Consequently, repulsive force may be generated between the second magnet 2410 and the third magnet 2420. In other words, the second magnet 2410 may press the bobbin 2210 to bring the bobbin 2210 into contact with the ball 2300 by virtue of the repulsive force acting between the second magnet 2410 and the third magnet 2420. The second magnet 2410 and the third magnet 2420 may be disposed such that repulsive force acts therebetween.

A portion of the housing 2110, a portion of the bobbin 2210, or an additional member may be disposed between the second magnet 2410 and the third magnet 2420. Here, repulsive force may act between the second magnet 2410 and the third magnet 2420.

The second magnet 2410 may overlap the neutral portion 2221 of the first magnet 2220 in a direction perpendicular to the optical-axis direction and the first direction. Here, the optical-axis direction may correspond to the z-axis direction in FIG. 31, the first direction may correspond to the x-axis direction in FIG. 31, and the second direction may correspond to the y-axis direction in FIG. 31.

The boundary portion between the polarities of the second magnet 2410 in the optical-axis direction may be positioned at the same level as the boundary portion between the polarities of the third magnet 2420 in the optical-axis direction. Here, the boundary portion between the polarities may be the neutral portion. The boundary portion between the polarities may be formed as an area or a line. The boundary portion between the polarities of the second magnet 2410 in the optical-axis direction may be positioned at a level higher than the level of the boundary portion between the polarities of the third magnet 2420. The boundary portion between the polarities of the second magnet 2410 in the optical-axis direction may be positioned at a level lower than the level of the boundary portion between the polarities of the third magnet 2420.

The bobbin 2210 and the second magnet 2410 may be movable within a first stroke a (see FIG. 31) in the optical-axis direction. The second magnet 2410 may overlap the third magnet 2420 within the entire range of the first stroke s in a direction perpendicular to the optical-axis direction. The second magnet 2410 may be overlap the third magnet 2420 at 70% or more of the total volume of the second magnet 2410 within the entire range of the first stroke s in a direction perpendicular to the optical-axis direction. The second magnet 2410 may be overlap the third magnet 2420 at 50% or more of the total volume of the second magnet 2410 within the entire range of the first stroke s in a direction perpendicular to the optical-axis direction. Here, the direction perpendicular to the optical-axis direction may correspond to the y-axis direction in FIG. 31.

When viewed from above, the second magnet 2410 may be disposed between the first magnet 2220 and the third magnet 2420. The third magnet 2420, the second magnet 2410, and the first magnet 2220 may be sequentially disposed in that order in the second direction perpendicular to the optical-axis direction and the first direction. The second direction may be perpendicular to a first surface of the third magnet 2420.

The second magnet 2410 may be made of a material different from the first magnet 2220. The second magnet 2410 may include a component different from the first magnet 2220. The second magnet 2410 may be made of a material having lower magnetic force than that of the material of the first magnet 2220. In other words, the first magnet 2220 may be made of a first material, and the second magnet 2410 may be made of a second material different from the first material. Here, the magnetic force of the first material may be higher than the magnetic force of the second material. The second magnet 2410 may include at least one of neodymium (NdFeB) or samarium-cobalt.

The second magnet 2410 may include a first surface that faces the third magnet 2420. Here, the surface area of the first surface of the second magnet 2410 may be smaller than the surface area of the first surface (the facing surface) of the third magnet 2420. The volume of the second magnet 2410 may be smaller than the volume of the third magnet 2420. The size of the second magnet 2410 may be smaller than the size of the third magnet 2420.

The magnetic force of the second magnet 2410 may be lower than the magnetic force of the first magnet 2220. The material of the second magnet 2410 may be the same as that of the first magnet 2220. The second magnet 2410 may be made of a material having magnetic force lower than the magnetic force of the first magnet 2220. The magnetic force of the second magnet 2410 may be equal to or higher than the magnetic force of the first magnet 2220.

The lens moving apparatus 2010 may include the third magnet 2420. The press unit 2400 may include the third magnet 2420. The third magnet 2420 may be disposed on the housing 2110. The third magnet 2420 may press the bobbin 2210 to bring the bobbin 2210 into contact with the ball 2300. The third magnet 2420 may press the bobbin 2210 to bring the bobbin 2210 into contact with the ball 2300 by virtue of the interaction with the second magnet 2410. The third magnet 2420 and the second magnet 2410 may be disposed such that the same polarities thereof face each other. Consequently, repulsive force may be generated between the third magnet 2420 and the second magnet 2410. In other words, the third magnet 2420 may press the bobbin 2210 to bring the bobbin into contact with the ball 2300 by virtue of the repulsive force between the third magnet 2420 and the second magnet 2410. The third magnet 2420 may push the second magnet 2410 toward the ball 2300. The third magnet 2420 may push the bobbin 2210 toward the ball 2300. Therefore, the bobbin 2210 may be in close contact with the ball 2300. Furthermore, the ball 2300 may be in close contact with the housing 2110. The repulsive force acting between the second magnet 2410 and the third magnet 2420 may be 2 gf or lower.

The magnetic force of the third magnet 2420 may be lower than the magnetic force of the first magnet 2220. The material of the third magnet 2420 may be the same as the material of the first magnet 2220. The third magnet 2420 may be made of a material having magnetic force lower than the magnetic force of the first magnet 2220. The magnetic force of the third magnet 2420 may be equal to or higher than the magnetic force of the first magnet 2220.

The third magnet 2420 may include the first surface that is directed toward the first surface of the second magnet 2410. The third magnet 2420 may include the first surface that faces the first surface of the second magnet 2410. The surface area of the first surface of the third magnet 2420 may be larger than the surface area of the first surface (the facing surface) of the second magnet 2410. The first surface of the third magnet 2420 and the first surface of the second magnet 2410 may have the same polarity. For example, the first surface of the third magnet 2420 and the first surface of the second magnet 2410 may be N poles. Alternatively, the first surface of the third magnet 2420 and the first surface of the second magnet 2410 may be S poles.

As illustrated in FIG. 31, the third magnet 2420 may be longer than the second magnet 2410 in the optical-axis direction. The length b (see FIG. 31) of the third magnet 2420 may be two or more times the length a (see FIG. 31) of the second magnet 2410 in the optical-axis direction. The length b (see FIG. 31) of the third magnet 2420 may be 1.5 or more times the length a (see FIG. 31) of the second magnet 2410 in the optical-axis direction. The length b (see FIG. 31) of the third magnet 2420 may be 1.2 or more times of the length a (see FIG. 31) of the second magnet 2410 in the optical-axis direction.

As illustrated in FIG. 29, the third magnet 2420 may be longer than the second magnet 2410 in the first direction which is perpendicular to the optical-axis direction. The width b (see FIG. 29) of the third magnet 2420 may be 5 or more times the width a (see FIG. 29) of the second magnet 2410 in the first direction. Here, the first direction may correspond to the x-axis direction in FIG. 1. The width of the third magnet 2420 may be greater than the width of the second magnet 2410 in the first direction which is perpendicular to the optical-axis direction. The first direction may be a direction in which the longer side of the third magnet 2420 extends. The first direction may be parallel to the first surface of the third magnet 2420. The first direction may be parallel to the first surface of the second magnet 2410. The width b (see FIG. 29) of the third magnet 2420 may be two or more times the width a (see FIG. 29) of the second magnet 2410 in the first direction. The width b (see FIG. 29) of the third magnet 2420 may be 1.5 or more times the width a (see FIG. 29) of the second magnet 2410 in the first direction.

The thickness of the third magnet 2420 may be equal to the thickness of the second magnet 2410 in the second direction which is perpendicular to and the optical-axis direction and the first direction. Here, the second direction may correspond to the y-axis direction in FIG. 28. The thickness of the third magnet 2420 may be greater than the thickness of the second magnet 2410 in the second direction which is perpendicular to the optical-axis direction and the first direction. The thickness of the third magnet 2420 may be less than the thickness of the second magnet 2410 in the second direction which is perpendicular to the optical-axis direction and the first direction.

The third magnet 2420 may be made of a material different from the first magnet 2220. The third magnet 2420 may include a component different from the first magnet 2220. The third magnet 2420 may be made of a material having a magnetic force lower than the magnetic force of the material of the first magnet 2220. In other words, the first magnet 2220 may be made of a first material, and the third magnet 2420 may be made of a material different from the first material. Here, the magnetic force of the first material may be higher than the magnetic force of the second material. The third magnet 2420 may include at least one of neodymium (NdFeB) or samarium-cobalt.

The second magnet 2410 and the third magnet 2420 may be made of the same material. In a modification, the second magnet 2410 and the third magnet 2420 may be made of different materials. The second magnet 2410 and the third magnet 2420 may include components which are different from each other.

In a modification, the first magnet 2220 and the second magnet 2410 may be made of the same material, and the third magnet 2420 may be made of a different material. Here, the magnetic force of the material of the third magnet 2420 may be lower than the magnetic force of the material of the first magnet 2220 and the second magnet 2410.

In another modification, the first magnet 2220 and the third magnet 2420 may be made of the same material, and the second magnet 2410 may be made of a different material. Here, the magnetic force of the material of the second magnet 2410 may be lower than the magnetic force of the material of the first magnet 2220 and the third magnet 2420.

The lens moving apparatus 2010 may include the cover member 2500. The cover member 2500 may include a "cover can". The cover member 2500 may be disposed so as to surround the housing 2110. The cover member 2500 may accommodate the housing 2110 therein. The cover member 250 may define the appearance of the lens moving apparatus 2010. The cover member 2500 may have the form of a hexahedron which is open at the lower surface. The cover member 2500 may be a non-magnetic body. The cover member 2500 may be made of metal. The cover member 2500 may be composed of a metal plate. The cover member 2500 may be connected to the ground portion of the printed circuit board 2050. Consequently, the cover member 2500 may be grounded. The cover member 2500 may shield electromagnetic interference (EMI). Here, the cover member 2500 may be referred to as an "EMI shield can".

The cover member 2500 may include an upper plate and a side plate. The cover member 2500 may include the upper plate having a hole and the side plate which extends downwards from the outer periphery or the edge of the upper plate. The side plate of the cover member 2500 may include a plurality of side plates. The plurality of side plates may include first to fourth side plates. The side plates of the cover member 2500 may include first and second side plates, which are disposed opposite each other, and third and fourth side plates, which are disposed between the first and second side plates and opposite each other. The board 2120 and the coil 2130 may be disposed on the first side plate of the cover member 2500, and the third magnet 2420 may be disposed on the second side plate.

In an embodiment, the first magnet 2220 for driving the bobbin 2210 is disposed on one side of the bobbin 2210, and the coil 2130 may be disposed on the stationary unit 2100 which is opposed to the first magnet 2220. A Hall device or a driver IC having a Hall device built therein may be disposed inside or outside the coil 2130. The Hall device may be disposed on the board 2120.

The second magnet 2410 may be disposed opposite the first magnet 2220, which is the operation unit of the bobbin 2210, and the third magnet 2420 is disposed on the housing 2110, which is the stationary unit 2100, such that the ball 2300 and the housing 2110 are brought into close contact with each other by virtue of the repulsive force acting therebetween.

Because the second magnet 2410 is disposed on the movable unit 2200, the second magnet 2410 may have size and height smaller than the third magnet 2420 in order to maintain constant repulsive force.

The inner side and the outer side of the third magnet 2420 may have different polarities. The second magnet 2410 may be disposed so as to correspond to the third magnet 2410 so as to exert repulsive force. Particularly, in order to maintain the repulsive force constant and to minimize dispersion, the second magnet 2410 and the third magnet 2420 use magnets which have a lower grade and better temperature properties than the first magnet 2220. For example, the second magnet 2410 and the third magnet 2420 may use a neodymium (NdFeB) magnet and/or a samarium-cobalt magnet. In order to achieve the above-mentioned objects, the second magnet 2410 and the third magnet 2420 may use different kinds of magnets. Considering weight of lenses and weight of operation units according to the recent trend, it is appropriate that the repulsive force is 2 gf or lower. In order to suppress generation of tilting, the center position of the first magnet 2220 and the third magnet 2420 may not deviate from the total stroke in which the actuator is operated, and the first magnet 2220 and the third magnet 2420 may partially overlap each other as appreciated from the cross-sectional view (FIG. 4). The third magnet 2420 may be an actuator which overlaps the second magnet 2410 in the stroke range.

An embodiment may include the lens moving apparatus 2010 in which the movable unit 2200, the ball 2300, and the stationary unit 2100 are relatively moved in a sliding manner in the state of being in contact with each other by virtue of the repulsive force acting between the magnets at the side opposite the operation unit in the actuator in which the ball 2300 is in contact with several points.

In the embodiment, the magnetic forces of the second magnet 2410 and the third magnet 2420 may be lower than the magnetic force of the first magnet 2220, and repulsive force may be generated between the second magnet 2410 and the third magnet 2420. The second magnet 2410 may have size and height smaller than the third magnet 2420.

Hereinafter, a lens moving apparatus 2010 according to an embodiment will be described with reference to the drawings.

Figure 32:
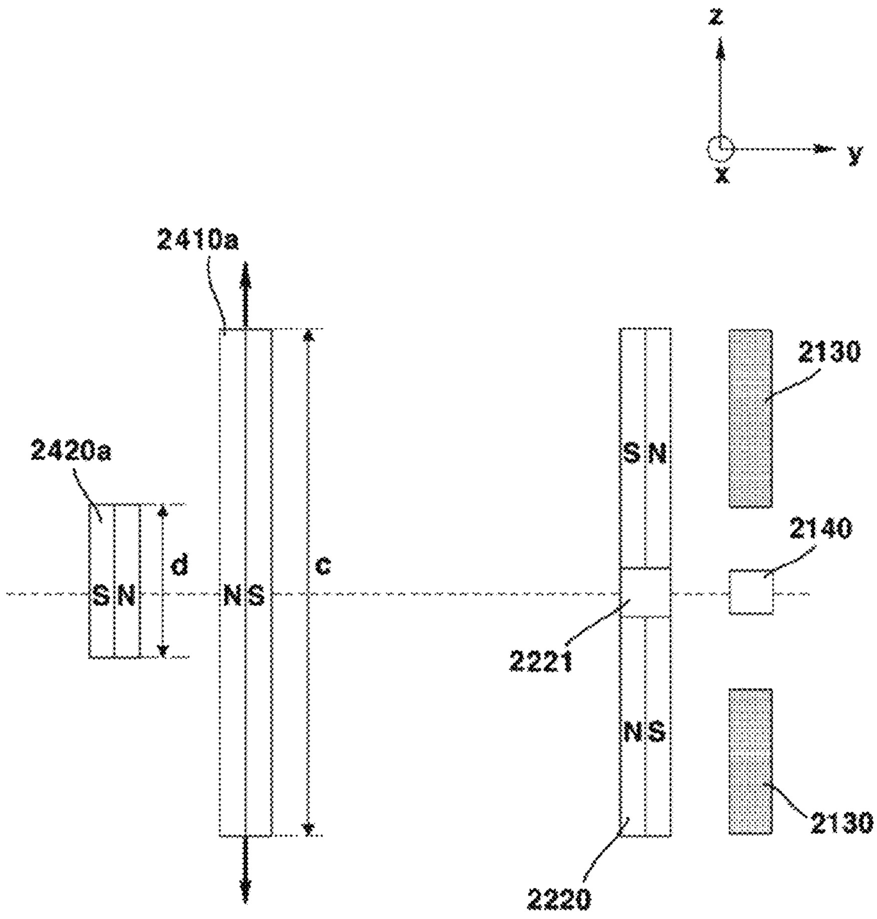
FIG. 32 is a view illustrating disposition of the coil, the Hall sensor, and the first to third magnets of the lens moving apparatus according to a modification.

FIG. 32 is a view illustrating arrangement of the coil, the Hall sensor, and the first to third magnets of the lens moving apparatus 2010 according to the modification.

Hereinafter, the difference between the embodiment and the modification will mainly be described. Here, the description of the embodiment will be applied to details of the modification, which are not described, with or without modification.

In the modification, a second magnet 2410*a* may be formed so as to be larger than a third magnet 2420*a*. The volume of the second magnet 2410*a* may be larger than the volume of the third magnet 2420*a*. The second magnet 2410*a* may include a first surface, and the third magnet 2420*a* may include a first surface that faces the first surface of the second magnet 2410*a*. Here, the surface area of the first surface of the third magnet 2420*a* may be smaller than the surface area of the first surface of the second magnet 2410*a*. The length of the second magnet 2410*a* may be larger than the length of the third magnet 2420*a* in the optical-axis direction. The length of the second magnet 2410*a* may be larger than the length of the third magnet 2420*a* in the first direction perpendicular to the optical-axis direction. By virtue of this structure, it is possible to prevent tilting of the bobbin 2210 even when the second magnet 2410*a* is moved during AF operation.

Figure 33:
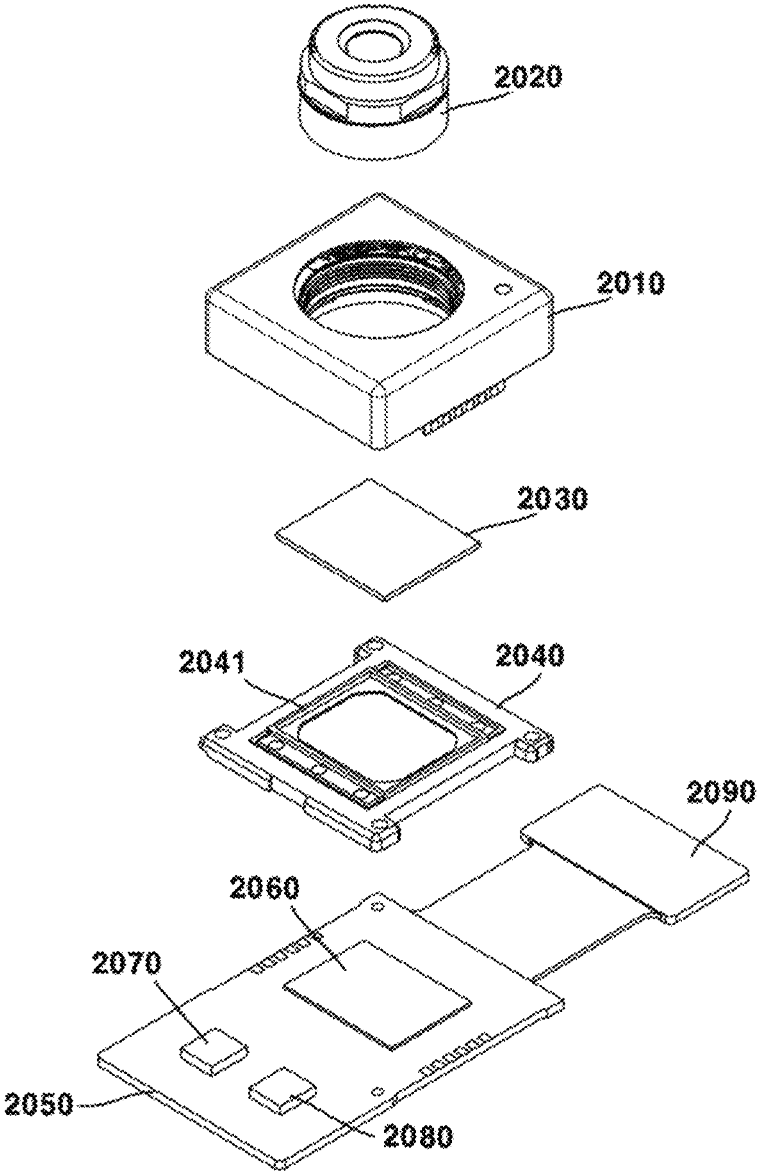
FIG. 33 is an exploded perspective view illustrating a camera module according to another embodiment.

FIG. 33 is an exploded perspective view of a camera module according to another embodiment.

The camera module may be a camera device.

The camera module may include the lens module 2020. The lens module 2020 may include at least one lens. The lens may be disposed at a position corresponding to the image sensor 2060. The lens module 2020 may include the lens and the barrel. The lens module 2020 may be coupled to the bobbin 2210 of the lens moving apparatus 2010. The lens module 2020 may be coupled to the bobbin 2210 using a screw and/or an adhesive. The lens module 2020 and the bobbin 2210 may be integrally moved.

The camera module may include a filter 2030. The filter 2030 may serve to prevent light of a specific frequency band in the light passing through the lens module 2020 from entering the image sensor 2060. The filter 2030 may be disposed parallel to the x-y plane. The filter 2030 may be disposed between the lens module 2020 and the image sensor 2060. The filter 2030 may be disposed on a sensor base 2040. The filter 2030 may include an infrared filter. The infrared filter may prevent infrared light from entering the image sensor 2060. The infrared filter may include an infrared reflection filter or an infrared absorption filter.

The camera module may include the sensor base 2040. The sensor base 2040 may be disposed between the lens moving apparatus 2010 and the printed circuit board 2050. The sensor base 2040 may include a projection 2041 on which the filter 2030 is disposed. A bore may be formed through the portion of the sensor base 2040, on which the filter 2030 is disposed, so as to allow light passing through the filter 2030 to enter the image sensor 2060. An adhesive member may be disposed between the base 2040 and the lens moving apparatus 2010. The adhesive member may attach the lens moving apparatus 2010 to the upper surface of the sensor base 2040. The adhesive member may serve to prevent contaminants from entering the lens moving apparatus 2010. The adhesive member may include at least one of epoxy, thermohardening adhesive, or ultraviolet hardening adhesive.

The camera module may include the printed circuit board (PCB) 2050. The printed circuit board 2050 may be a board or a circuit board. The lens moving apparatus 2010 may be disposed on the printed circuit board 2050. The sensor base 2040 may be disposed between the printed circuit board 2050 and the lens moving apparatus 2010. The printed circuit board 2050 may be conductively connected to the lens moving apparatus 2010. The image sensor 2060 may be disposed on the printed circuit board 2050. The printed circuit board 2050 may further include various circuits, devices, controllers and the like in order to convert the image formed on the image sensor 2060 into an electric signal and to transmit the signal to an external device.

The camera module may include the image sensor 2060. The image sensor 2060 may be a component on which the light having passed through the lens and the filter 2030 is incident to form an image. The image sensor 2060 may be mounted on the printed circuit board 2050. The image sensor 2060 may be conductively connected to the printed circuit board 2050. For example, the image sensor 2060 may be coupled to the printed circuit board 2050 through surface-mounting technology (SMT). Alternatively, the image sensor 2060 may be coupled to the printed circuit board 2050 through flip-chip technology. The image sensor 2060 may be disposed so as to be aligned with the optical axis. In other words, the optical axis of the image sensor 2060 may be aligned with the optical axis of the lens. The image sensor 2060 may convert light incident on the effective image area thereof into an electric signal. The image sensor 2060 may be any one of a charge-coupled device (CCD), a metal oxide semiconductor (MOS), a CPD and a CID.

The camera module may include a motion sensor 2070. The motion sensor 2070 may be surface-mounted on the printed circuit board 2050. The motion sensor 2070 may be conductively connected to a controller 2080 via a circuit pattern provided at the printed circuit board 2050. The motion sensor 2070 may output rotational angular velocity information of movement of the camera module. The motion sensor 2070 may include a biaxial or triaxial gyro sensor or an angular velocity sensor.

The camera module may include the controller 2080. The controller 2080 may be disposed at the printed circuit board 2050. The controller 2080 may be conductively connected to the coil 2130 of the lens moving apparatus 2010. The controller 2080 may separately control the direction, intensity, amplitude, and the like of current supplied to the coil 2130. The controller 2080 may control the lens moving apparatus 2010 to perform an autofocus function. The controller 2080 may be conductively connected to the Hall sensor 2140. The controller 2080 may perform autofocus feedback control for the lens moving apparatus 1010 by detecting the position of the movable unit 2200 through the Hall sensor 2140.

The camera module may include a connector 2090. The connector 2090 may be conductively connected to the printed circuit board 2050. The connector 2090 may include a port, which is to be conductively connected to an external device.

The description of the embodiment shown in FIGS. 28 to 32 may be applied to the embodiment shown in FIGS. 17 to 27 with or without modification.

Figure 34:
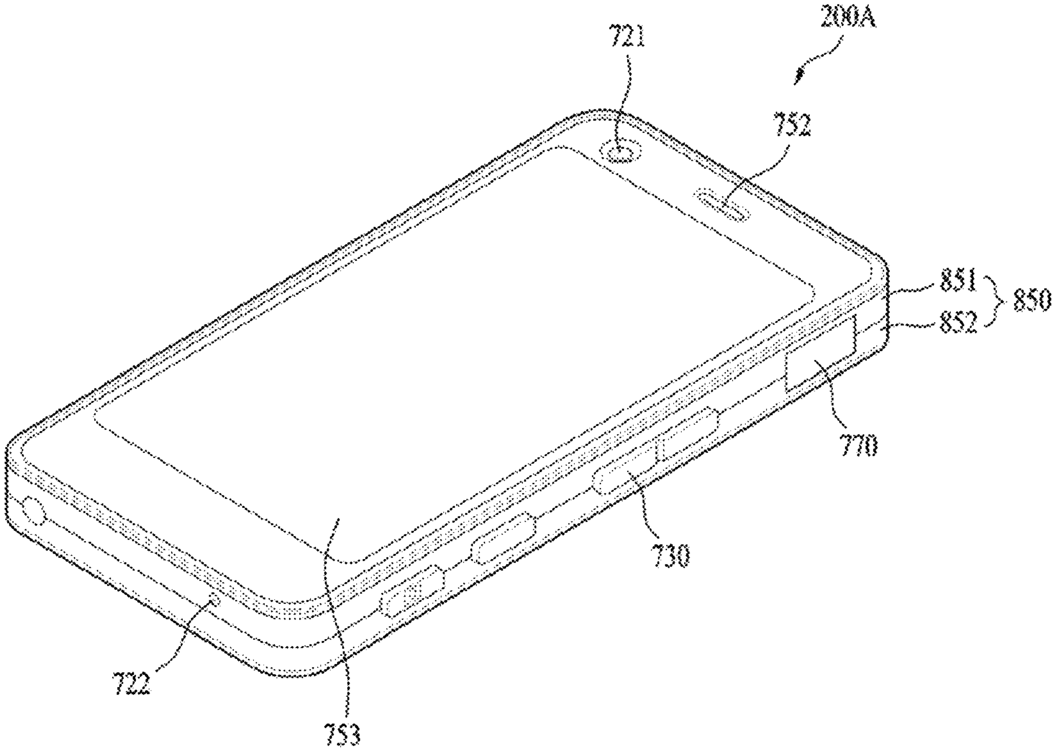
FIG. 34 is a perspective view of a portable terminal according to an embodiment.
Figure 35:
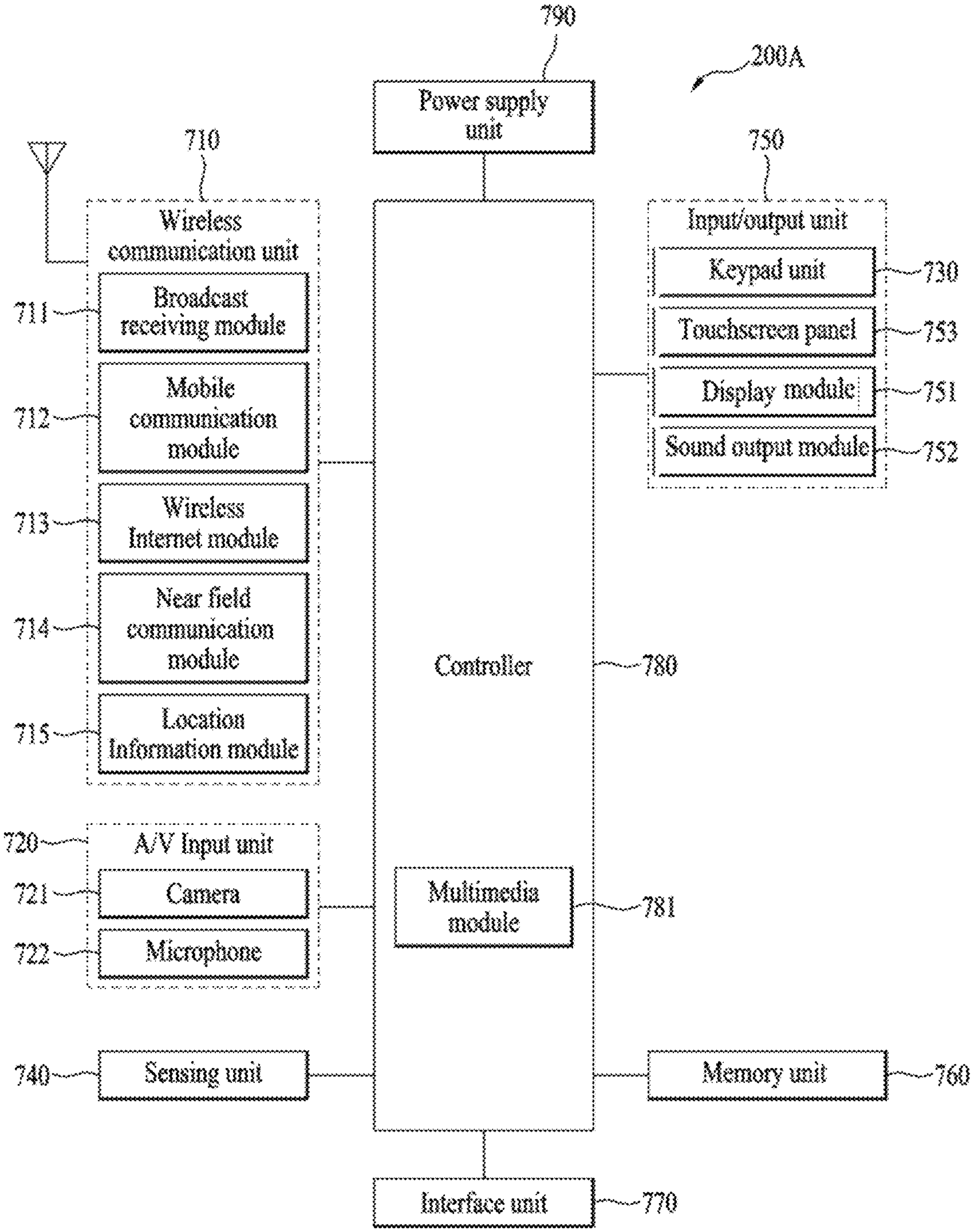
FIG. 35 is a view illustrating the configuration of the portable terminal shown in FIG. 34.

FIG. 34 is a perspective view illustrating an optical device 200A according to an embodiment. FIG. 35 is a view illustrating the configuration of the optical device 200A illustrated in FIG. 34.

Referring to FIGS. 34 and 35, the optical device (hereinafter, referred to as a "terminal") 200A may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 34 has a bar shape, without being limited thereto, and may be any of various types, such as, for example, a slide type, a folder type, a swing type, or a swivel type, in which two or more sub-bodies are coupled so as to be movable relative to each other.

The body 850 may include a case (a casing, housing, cover or the like) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may include the camera device 200, 200-1 and 200-3 according to the embodiment.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad.

The display module 751 may include a plurality of pixels, the color of which varies depending on the electrical signals applied thereto. For example, the display module 751 may include at least one among a liquid crystal display, a thin-film transistor liquid crystal display, an organic light-emitting diode, a flexible display and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 780, or may be embodied separately from the controller 780.

The controller 780 may perform a pattern recognition process capable of recognizing writing input or drawing input carried out on a touch screen as a character and an image, respectively.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the disclosure.

INDUSTRIAL APPLICABILITY

The embodiments are applicable to a lens moving apparatus, a camera module, and an optical device, which enable easy and free design of the frictional force between a bobbin, a housing, and a ball member to stably support an AF moving unit.

The invention claimed is:

1. An autofocus apparatus comprising:

a housing a bobbin movably disposed with respect to the housing;

a first magnet disposed on a first side portion of the bobbin;

a coil disposed on the housing, the coil facing the first magnet and interacting with the first magnet to move the bobbin along an optical axis;

a second magnet disposed on a second side portion of the bobbin different from the first side portion of the bobbin, the second magnet being spaced apart from the first magnet;

a yoke disposed on a side portion of the housing corresponding to the second side portion of the bobbin, the yoke and the second magnet being located to directly face each other with no coil therebetween; and a ball member disposed between the second side portion of the bobbin and the side portion of the housing, the ball member maintaining a distance between the second side portion of the bobbin and the side portion of the housing in a first direction perpendicular to the optical axis under a preload provided by magnetic attraction between the second magnet and the yoke.

2. The autofocus apparatus according to claim 1, wherein the second magnet is disposed between the yoke and the first magnet, and the first magnet is disposed between the second magnet and the coil.

3. The autofocus apparatus according to claim 1, further comprising a circuit board disposed on the housing, wherein the coil is conductively connected to the circuit board.

4. The autofocus apparatus according to claim 1, wherein the ball member is disposed between a side portion of the bobbin on which the second magnet is disposed and a side portion of the housing on which the yoke is disposed.

5. The autofocus apparatus according to claim 1, wherein the ball member is disposed between a side portion of the bobbin on which the first magnet is disposed and a side portion of the housing on which the coil is disposed, and a repulsive force acts between the yoke and the second magnet.

6. The autofocus apparatus according to claim 1, wherein the yoke is a magnetic body, and a length of the yoke in an optical-axis direction is different from a length of the second magnet in the optical-axis direction.

7. The autofocus apparatus according to claim 1, wherein a drive signal is supplied to the coil, and the bobbin is movable in an optical-axis direction by virtue of an interaction with the first magnet.

8. The autofocus apparatus according to claim 1, wherein a length of the yoke in an optical-axis direction is greater than a length of the second magnet in the optical-axis direction, and wherein a distance between an upper end of the second magnet and an upper end of the yoke in the optical-axis direction is one or more times and three or less times a total stroke distance of the bobbin in the optical-axis direction when the bobbin is positioned at a lowest point in the optical-axis direction.

9. The autofocus apparatus according to claim 8, wherein a distance between a lower end of the second magnet and a lower end of the yoke in the optical-axis direction is 0 or greater and is two or less times the total stroke distance of the bobbin when the bobbin is positioned at the lowest point.

10. The autofocus apparatus according to claim 1, wherein a length of the second magnet in an optical-axis direction is greater than a length of the yoke in the optical-axis direction, wherein a distance between a lower end of the second magnet and a lower end of the yoke in the optical-axis direction is one or more times and three or less times a total stroke distance of the bobbin in the optical-axis direction when the bobbin is positioned at the lowest point in the optical-axis direction.

11. The autofocus apparatus according to claim 10, wherein a distance between an upper end of the second magnet and an upper end of the yoke in the optical-axis direction is 0 or more and is two or less times the total stroke distance of the bobbin in the optical-axis direction when the bobbin is positioned at the lowest point.

12. The autofocus apparatus according to claim 1, further comprising:

a base; and a position sensor disposed on the base so as to face either the first magnet or the second magnet in an optical-axis direction.

13. The autofocus apparatus according to claim 12, further comprising a conductive member conductively connected to the position sensor.

14. The autofocus apparatus according to claim 13, further comprising a circuit board disposed on the housing, wherein the conductive member is disposed on the base and comprises at least one terminal conductively connecting the position sensor to the circuit board.

15. The autofocus apparatus according to claim 13, wherein the conductive member comprises a circuit member disposed on the base, and the circuit member comprises at least one terminal conductively connected to the position sensor.

16. The autofocus apparatus according to claim 12, wherein the position sensor does not overlap the first magnet or the second magnet in a direction perpendicular to the optical-axis direction.

17. The autofocus apparatus according to claim 12, wherein the position sensor does not overlap the yoke in a direction perpendicular to the optical-axis direction.

18. A camera device comprising:

a housing;

a bobbin movably disposed with respect to the housing;

a first magnet disposed on a first side portion of the bobbin;

a coil disposed on the housing, the coil facing the first magnet and interacting with the first magnet to move the bobbin along an optical axis;

a second magnet disposed on a second side portion of the bobbin different from the first side portion of the bobbin, the second magnet being spaced apart from the first magnet;

a yoke disposed on a side portion of the housing corresponding to the second side portion of the bobbin, the yoke and the second magnet being located to directly face each other with no coil therebetween; and a ball member disposed between the second side portion of the bobbin and the side portion of the housing, the ball member maintaining a distance between the second side portion of the bobbin and the side portion of the housing in a first direction perpendicular to the optical axis under a preload provided by magnetic attraction between the second magnet and the yoke;

a first circuit board disposed below the housing;

an image sensor disposed on the first circuit board; and a position sensor disposed on the first circuit board so as to face the first magnet or the second magnet in an optical-axis direction.

19. The camera device to claim 18, wherein the second magnet is disposed between the yoke and the first magnet, and the first magnet is disposed between the second magnet and the coil.

20. A camera device comprising:

a housing;

a bobbin movably disposed with respect to the housing;

a first magnet disposed on a first side portion of the bobbin and a second magnet disposed on a second side portion of the bobbin different from the first side portion of the bobbin;

a coil disposed on the housing, the coil facing the first magnet and interacting with the first magnet to move the bobbin along an optical axis;

a yoke disposed on a side portion of the housing corresponding to the second side portion of the bobbin; and a ball member disposed between the second side portion of the bobbin and the side portion of the housing, the ball member maintaining a distance between the second side portion of the bobbin and the side portion of the housing in a first direction perpendicular to the optical axis under a preload provided by magnetic attraction between the second magnet and the yoke, wherein the second magnet is disposed between the yoke and the first magnet, the yoke and the second magnet being located to directly face each other with no coil therebetween.

* * * * *